US010435767B2

(12) United States Patent
Albrecht et al.

(10) Patent No.: US 10,435,767 B2
(45) Date of Patent: Oct. 8, 2019

(54) LOW-FLUX CONVERTING PROCESS FOR PGM COLLECTOR ALLOY

(71) Applicant: Techemet, LP, Pasadena, TX (US)

(72) Inventors: Edward W. Albrecht, Pearland, TX (US); Steven McCullough, Houston, TX (US)

(73) Assignee: Techemet, LP, Pasadena, TX (US)

( * ) Notice: Subject to any disclaimer, the term of this patent is extended or adjusted under 35 U.S.C. 154(b) by 0 days.

(21) Appl. No.: 16/397,441

(22) Filed: Apr. 29, 2019

(65) Prior Publication Data

US 2019/0256949 A1    Aug. 22, 2019

(51) Int. Cl.
| | | |
|---|---|---|
| *C22B 11/02* | (2006.01) | |
| *C22B 9/10* | (2006.01) | |
| *C22B 9/16* | (2006.01) | |
| *C22B 9/05* | (2006.01) | |
| *C22B 7/04* | (2006.01) | |

(Continued)

(52) U.S. Cl.
CPC ............ *C22B 11/026* (2013.01); *C22B 1/005* (2013.01); *C22B 7/04* (2013.01); *C22B 9/05* (2013.01); *C22B 9/10* (2013.01); *C22B 9/16* (2013.01); *C22C 1/02* (2013.01)

(58) Field of Classification Search
CPC .. C22B 1/005; C22B 7/04; C22B 9/05; C22B 9/10; C22B 9/16; C22B 11/026; C22C 1/02
See application file for complete search history.

(56) References Cited

U.S. PATENT DOCUMENTS

| | | |
|---|---|---|
| 4,428,768 A | 1/1984 | Day |
| 4,451,289 A | 5/1984 | Van Hecke et al. |
| 4,581,064 A | 4/1986 | Morrison et al. |

(Continued)

FOREIGN PATENT DOCUMENTS

| | | |
|---|---|---|
| CN | 102649999 | 8/2012 |
| CN | 104178634 | 12/2014 |

(Continued)

OTHER PUBLICATIONS

McCullough, S.D. et al., Pyhrometallurgical iron removal from a PGM-containing alloy; Third International Platinum Conference 'Platinum in Transformation', The Southern African Institute of Mining and Metallurgy, 2008.

(Continued)

*Primary Examiner* — Tima M. McGuthry-Banks
(74) *Attorney, Agent, or Firm* — Daniel N. Lundeen; Lundeen & Lundeen PLLC

(57) ABSTRACT

A low-flux converting process for PGM collector alloy. The process includes feed introduction into a molten alloy pool, oxygen injection into the pool, tapping the slag, and tapping the PGM-enriched alloy. The collector alloy contains no less than 0.5 wt % PGM, 40 wt % iron, and 0.5 wt % nickel. If added flux material contains more than 10 wt % silica and 10 wt % CaO/MgO, the feed contains no more than 20 parts by weight added flux per hundred collector alloy. The process can also include using a refractory protectant in the converter; melting partially pre-oxidized collector alloy to form the initial molten alloy pool; magnetic separation of slag; recycling part of the slag to the converter; smelting catalyst material in a primary furnace to produce the collector alloy; and/or smelting the converter slag in a secondary furnace with slag from the primary furnace.

29 Claims, 12 Drawing Sheets

(51) Int. Cl.
*C22C 1/02* (2006.01)
*C22B 1/00* (2006.01)

(56) References Cited

U.S. PATENT DOCUMENTS

| | | | |
|---|---|---|---|
| 5,252,305 | A | 10/1993 | Ezawa et al. |
| 9,249,477 | B2 | 2/2016 | Dobbelaere et al. |
| 10,202,669 | B2 | 2/2019 | Ritschel |
| 2009/0071289 | A1 | 3/2009 | Fekete et al. |
| 2011/0274580 | A1 | 11/2011 | Deegan et al. |
| 2014/0026713 | A1 | 1/2014 | Bezuidenhout et al. |
| 2017/0002441 | A1 | 1/2017 | Ritschel et al. |
| 2018/0142327 | A1 | 5/2018 | Stoffner et al. |
| 2018/0142328 | A1 | 5/2018 | Stoffner et al. |
| 2018/0142329 | A1 | 5/2018 | Stoffner et al. |
| 2018/0142330 | A1 | 5/2018 | Stoffner et al. |
| 2018/0238542 | A1 | 8/2018 | Peters et al. |

FOREIGN PATENT DOCUMENTS

| | | |
|---|---|---|
| EP | 0173425 | 5/1986 |
| EP | 0512959 | 11/1992 |
| EP | 2666876 | 11/2013 |
| GB | 2086941 | 5/1982 |
| WO | 2005031013 | 4/2005 |
| WO | 2014154945 | 10/2014 |
| WO | 2017001081 | 5/2017 |

OTHER PUBLICATIONS

R.T. Jones et al., "Recovery of Cobalt, Nickel, and Copper from Slags, Using DC-Arc Furnace Technology," International Symposium on Challenges of Process Intensification, 35th Annual Conference of Metallurgists, Montreal, Canada (1996).

Aspola et al.; Outotec smelting solutions for the PGM industry; The Southern African Institute of Mining and Metallurgy; Platinum (2012) p. 235-250.

LOW-FLUX CONVERTING PROCESS FOR PGM COLLECTOR ALLOY

CROSS-REFERENCE TO RELATED APPLICATION

None.

BACKGROUND OF THE INVENTION

The platinum group metals, i.e., ruthenium, rhodium, palladium, osmium, iridium, and platinum ("PGM"), are often recovered from used catalyst materials such as, for example, automotive catalytic converters. The catalyst materials are smelted in a furnace, typically with a flux material such as CaO, and the PGM are preferentially collected in an alloy pool below the slag. While the PGM are dilute in the furnace slag, nevertheless these losses can be significant due to the high volume of slag and a general inability to economically recover the dilute values. The PGM collector alloys may contain up to 12 wt % PGM, and usually contain more than 40 wt % iron. Enrichment is necessary if a higher PGM content is desired.

PGM enrichment of iron-rich, sulfide-lean collector alloy by pyrometallurgical converting was disclosed in S. D. McCullough, "Pyrometallurgical iron removal from a PGM-containing alloy," *Third International Platinum Conference 'Platinum in Transformation,'* The Southern African Institute of Mining and Metallurgy (2008). PGM enrichment of sulfur-free or low-sulfur (<1 wt %) PGM collector alloy was more recently proposed in patent documents U.S. Pat. No. 10,202,669 B2 and US 2018/0142330 A1. The PGM-enriched alloys generally contain a relatively high proportion of iron (>10 wt %).

There are a number of drawbacks associated with known converters and converting processes preventing them from being practically implemented to process PGM collector alloy generated from smelting catalyst materials. The converting process can be relatively slow. In the patent documents mentioned above, the collector alloy and slag-forming materials were melted for 10 hours prior to oxygen injection. Moreover, the converting process is exothermic, and the rate of oxygen addition is generally limited to avoid excessive temperatures. Further, the severe conditions in the converter, especially at high oxygen injection rates, lead to corrosion and short lifespans for refractory lining.

The industry has generally accepted that, similar to smelting, relatively high levels of added flux materials such as $SiO_2$ and MgO/CaO are needed for the formation of a low melting, light density slag to adequately remove impurities and improve the PGM content of the PGM-enriched alloy product from a converter. For example, the aforementioned patent documents disclose the addition of sulfur- and copper-free slag-forming material in minimum proportions of 0.2 or 1 part by weight per 1 part by weight collector alloy, where the slag-forming materials contain 70-90 wt % $SiO_2$ and 10-30 wt % MgO/CaO, or 40-90 wt % MgO/CaO and 10-60 wt % $SiO_2$.

The industry needs technology that can address one or more of the shortcomings of conventional converting processes for PGM collector alloys. Such technology would desirably achieve one or more of the following: improve the alloy melting rate, oxygen addition rate, and/or the processing rate or capacity of the converter; provide lower levels of iron and/or deleterious materials in the PGM-enriched collector alloy; reduce PGM losses in converter slag; improve reliability and/or durability of converter components; reduce converter maintenance requirements and/or operating interruptions; and/or improve the efficiency and practicality of using converters incorporated as part of an overall process to recover and enrich PGM collector alloy, e.g., from catalyst or other PGM-containing materials.

SUMMARY OF THE INVENTION

This summary is provided to introduce a selection of concepts that are further described below in the detailed description. This summary is not intended to identify key or essential features of the claimed subject matter, nor is it intended to be used as an aid in limiting the scope of the claimed subject matter.

The present disclosure is directed to a converting process for recovering platinum group metals ("PGM") that addresses drawbacks of known converting processes. Applicant has observed that the high levels of added flux materials comprising more than 10 wt % CaO/MgO and 10 wt % $SiO_2$ in known PGM collector alloy converting processes can be reduced or avoided in the converting processes disclosed herein, and that limiting the amount of such flux in this manner leads to a reduced volume of converter slag, reduced alloy melting time, and increases converting capacity and/or throughput.

Applicant has also observed that a relatively small amount of refractory protectant can be added after melting the alloy pool to inhibit refractory corrosion and extend refractory life, and that furnace slag from smelting catalyst material can be conveniently used as the protectant. Additionally, applicant has observed that partially pre-oxidizing a portion (or all) of the collector alloy for the initial melt and/or converter feed can further reduce the time periods required for melting the initial alloy pool and converting the collector alloy. Further, applicant has observed that recycling a portion of the converter slag to the converter between cycles also provides a way to reduce PGM losses; and that high-grade slag can be selectively recovered for recycling to the converter, e.g., by magnetic separation of the converter slag. Moreover, recycling the slag in this manner can return readily reducible pre-oxidized metal values such as nickel to the converter, and thus effectively increase oxygen addition rates.

Applicant has further found that the converter can be integrated into an overall PGM recovery process by smelting catalyst material in a primary furnace to produce the collector alloy and/or by smelting the converter slag in a secondary furnace with slag from the primary furnace. The slag from either of the furnaces, preferably from the primary furnace, can be used as refractory protectant.

In one aspect of the present invention, embodiments provide a process for converting platinum group metal (PGM) collector alloy, comprising the steps of: (a) introducing a converter feed into a pot of a converter holding a molten alloy pool; (b) injecting oxygen-containing gas into the alloy pool to convert iron and one or more other oxidizable elements from the collector alloy to corresponding oxides and enrich PGM in the alloy pool; (c) allowing a slag comprising the iron oxide to collect in a low-density layer above the alloy pool; (d) tapping the low-density layer to recover the slag from the converter; and (e) tapping the alloy pool to recover the PGM-enriched alloy.

The converter feed preferably comprises a collector alloy comprising no less than 0.5 wt % PGM, no less than 40 wt % iron, and no less than 0.5 wt % nickel, based on the total weight of the collector alloy. The process enables conversion with low added flux, such as less than 20 parts by weight of the added flux material per 100 parts by weight collector alloy, including no added flux material. An added flux material in the converter feed is optional, but if it is used and comprises both more than 10 weight percent silica and more than 10 weight percent of calcium oxide, magnesium oxide, or a combination of calcium oxide and magnesium oxide, by weight of the added flux material, then the converter feed preferably comprises no more than 20 parts by weight of the added flux material per 100 parts by weight collector alloy, more preferably no more than 15 parts by weight of the added flux material per 100 parts by weight collector alloy, and especially no more than 10 parts by weight of the added flux material per 100 parts by weight collector alloy.

In any embodiment, the process can further comprise lining the pot with a refractory material; and supplying a refractory protectant to the pot holding the alloy pool. The refractory protectant can be supplied at a rate up to 20 parts by weight refractory protectant per hundred parts by weight of the collector alloy in the converter feed. Preferably, the refractory protectant is added at a rate not more than 18 parts by weight per 100 parts by weight of the collector alloy, more preferably at a rate between 5 and 15 parts by weight refractory protectant per 100 parts by weight of the collector alloy. The refractory protectant preferably comprises a component in common with the refractory material. Alumina is a preferred component in common.

In any embodiment, the process can comprise jacketing the pot and circulating a coolant, preferably an aqueous coolant, e.g., water and/or water/glycol, through the jacket, especially during oxygen-containing gas injection in step (b). In any embodiment, the process can include monitoring refractory lining temperature, preferably by sensing temperature in the refractory lining with one or more sensors mounted in the refractory lining, communicating temperature sensing information from the one or more sensors to one or more transmitters, and transmitting signals containing the temperature sensing information from the one or more transmitters to a receiver. The one or more transmitters are preferably mounted externally on the pot and wirelessly transmit the signals to the receiver.

In any embodiment, the process can further comprise, prior to step (a), the step of: (I) partially pre-oxidizing a portion of the collector alloy. Preferably, the partial pre-oxidation in step (I) comprises from 10 to 90 percent conversion of iron, more preferably from 25 to 75 percent iron conversion, and even more preferably from 30 to 60 percent iron conversion, based on the iron in the collector alloy portion prior to step (I). In any embodiment, the process can further comprise the steps of: (II) melting the partially pre-oxidized collector alloy in the pot to form a sufficient volume of the alloy pool for the injection of the oxygen-containing gas in step (b); and (III) then commencing the converter feed introduction into the pot in step (a) and the oxygen-containing gas injection into the alloy pool in step (b). The slag is optionally wholly or partially separated from the partially pre-oxidized collector alloy prior to step (II), but is preferably supplied with the partially pre-oxidized collector alloy to the pot for melting in step (II).

In any embodiment, the converting process can further comprise the steps of: (A.1) separating the slag recovered in step (d) into a plurality of portions; (A.2) recycling at least one of the recovered slag portions from step (A.1) to the converter feed introduced to the pot in step (a), wherein the converter feed comprises the recycled slag in an amount of from about 5 to 100 parts by weight per 100 parts by weight of the collector alloy, preferably wherein the converter feed comprises the recycled slag in an amount of from 10 to 50 parts by weight per 100 parts by weight of the collector alloy. For example, the slag recovered from one operating cycle of the converter can be cooled, solidified, comminuted, and recycled in a subsequent operating cycle. The separation step (A.1) preferably comprises separation into a high grade fraction having a relatively high PGM content for recycle and a low grade fraction, e.g., magnetic separation and recycling the magnetically susceptible fraction, and/or recycling all or part of the slag recovered from a final slag tapping regardless of magnetic susceptibility.

In any embodiment, the converting process can comprise the steps of: (C.1) prior to steps (a) to (e), beginning a converter operation cycle by melting a partially pre-oxidized collector alloy in the pot to form the alloy pool; (C.2) then, prior to step (e), repeating a sequence of steps (a), (b), (c), and (d) a plurality of times, wherein step (d) in each sequence follows steps (b) and (c); (C.3) recycling the slag recovered from a final tapping of the low-density layer in step (d) in a last one of the sequences of step (C.2) to the converter feed in step (A.2) regardless of magnetic susceptibility, and/or recycling all or part of a non-magnetically susceptible fraction separated from the final tapping in step (d) to the converter feed in step (A.2); and (C.4) after the final tapping of the low-density layer in step (d) in a last one of the sequences of step (C.2), tapping the alloy pool in step (e). Preferably, for the tapping(s) of the low-density layer preceding the final tapping, alloy entrained in the low-density layer is allowed to substantially settle into the alloy pool before the tapping of the respective low-density layer(s). For the final tapping, the low density layer is tapped quickly to avoid freezing and alloy may optionally be entrained in the low-density layer.

In any embodiment, the process can further comprise the steps of: (E.1) smelting a catalyst material in a primary furnace; (E.2) recovering a primary furnace slag and a first collector alloy from the primary furnace; (E.3) smelting the primary furnace slag in a secondary furnace; (E.4) recovering a secondary furnace slag and a second collector alloy from the secondary furnace; (E.5) supplying the first and second collector alloys to converter feed in step (a); and (E.6) supplying at least a portion of the slag recovered from the converter in step (d) to the secondary furnace for smelting with the primary furnace slag in step (E.3).

DETAILED DESCRIPTION OF THE PREFERRED EMBODIMENTS

Figure 1A:
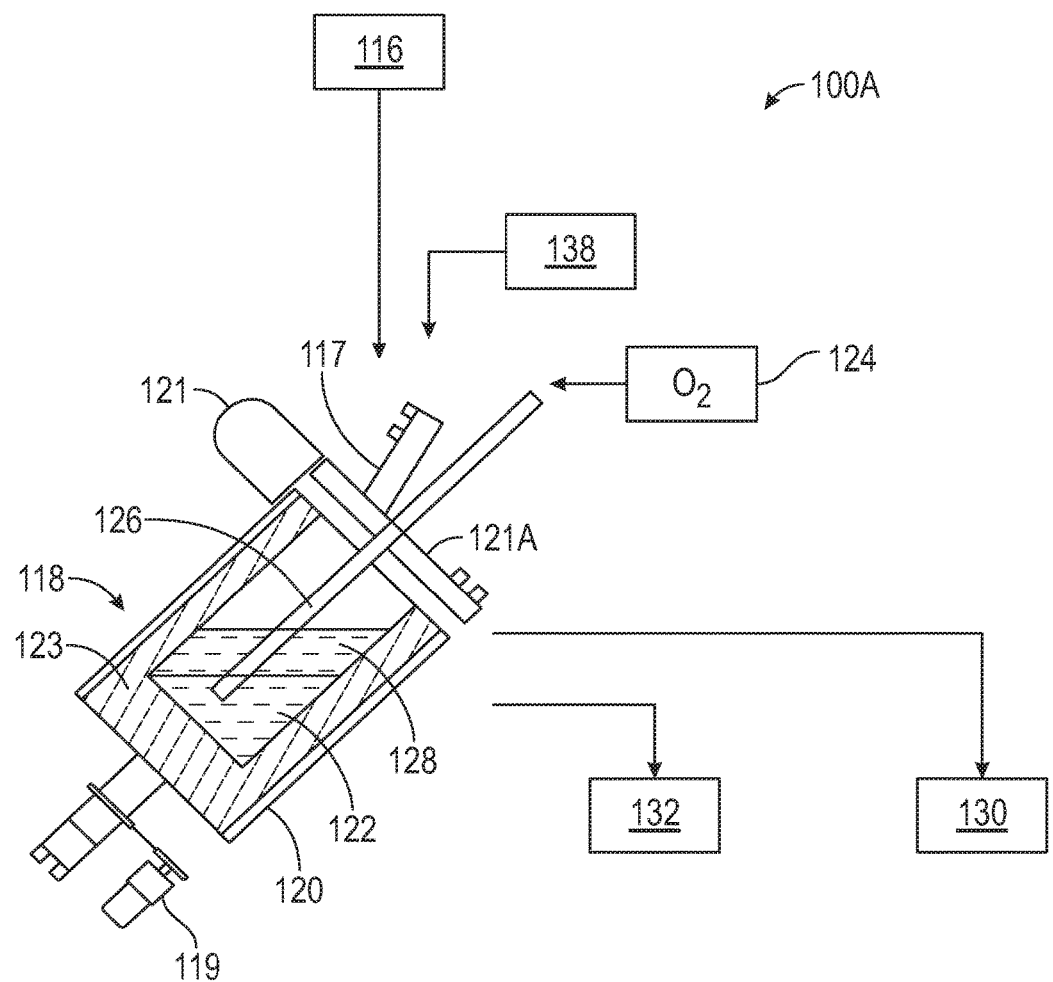
FIG. 1A is a simplified schematic process flow diagram of a converter process according to embodiments of the present invention.

Throughout the entire specification, including the claims, the following terms shall have the indicated meanings.

An "added" material as used herein in reference to a process refers to an imported ingredient or component that is added as an additional ingredient or component supplementary to that which is already present in the process.

The term "and/or" refers to both the inclusive "and" case and the exclusive "or" case, and such term is used herein for brevity. For example, a composition comprising "A and/or B" may comprise A alone, B alone, or both A and B.

The term "alloy" refers to a substance having metallic properties and being composed of two or more chemical elements of which at least one is a metal.

The term "catalyst material" refers to metal on or in a support material, such as, for example, a metal washcoat on silica, alumina, or another ceramic, used to increase the rate of a chemical reaction without itself undergoing any permanent chemical change. Catalyst material can be spent, partially spent, or new, or active or inactive.

The term "collector alloy" refers to an alloy containing dilute quantities of one or more precious metals, which may optionally be partially oxidized. If the collector alloy is partially oxidized, "collector alloy" also refers to any oxidized material that may be present with the alloy. The term "raw collector alloy" refers to a collector alloy from a furnace that is untreated and comprises less than 10 wt % of oxides.

The term "comminute" refers to the reduction in average particle size of a solid material, e.g., by crushing, grinding, milling, cutting, vibrating, and so on.

The term "converter" refers to an apparatus used to oxidize elements in an alloy; the term "converting" refers to the conversion of oxidizable elements in an alloy to the corresponding oxides, and may be used interchangeably with the term "oxidation."

The term "feed" as used herein refers to any reactant, reagent, diluent, additive, and/or other component supplied to a reactor or other vessel during the process.

The term "flux" is used in its metallurgical sense to refer to a material added to a meltable or molten material to facilitate the agglomeration, separation, and removal of undesirable substances, like sand, ash, or dirt. For purposes of this invention, the term "flux" is specifically limited to materials comprising more than 10 weight percent silica and more than 10 weight percent of calcium oxide, magnesium oxide, or a combination of calcium oxide and magnesium oxide, by weight of the flux material.

The term "in" refers to a first material or component that is within, on, or adjacent to a second material or component.

A "jacket" refers to a cavity external to a vessel for heat exchange between a fluid circulating through the jacket and the walls of the vessel. The jacket can be a shell creating an annular space around the vessel, a half-pipe coil jacket, a dimple jacket, plate coils, and so on.

The term "lance" refers to a pipe for supplying oxygen to a furnace, flame, or another high temperature area or region.

As used herein, "mesh size" refers to the US Standard Sieve Series where "−" indicates passing through and "+" indicates retained on.

The term "metal" refers to an opaque lustrous elemental chemical substance that is a good conductor of heat and electricity and, when polished, a good reflector of light.

The term "metallic" refers to a metal or another substance with the properties of a metal.

The term "pot" refers to a vessel for holding a molten material.

The "partial pre-oxidation" refers to conversion of some but not all, e.g., up to 90 percent by weight, of the oxidizable species in an alloy in a separate step prior to a main converting step.

The term "protectant" refers to a substance that provides protection.

The term "recovering" as used herein refers to the collection or isolation of a material.

The term "recycling" as used herein refers to returning a material already present in a cyclic process to a previous stage in the process; "recycle" refers to the material recycled.

The term "refractory" refers to a substance that is resistant to heat. A "ramming refractory" is one that is applied as a mix of aggregate, powder, binder, and/or other additives, and compacted using a ramming method, e.g., with an air rammer or masonry hammer.

The term "slag" refers to the oxidized material separated from metals and/or alloys during smelting or refining. "High grade slag" refers to a slag having a relatively higher PGM content than a "low grade slag." For purposes herein, "high grade slag" has a PGM concentration of greater than 800 ppm, e.g., greater than 1000 ppm PGM, and "low grade slag" has a PGM concentration of less than or equal to about 800 ppm. For example, slag having a 2000-3000 ppm PGM content is a high grade slag with respect to a low grade slag with 800 ppm PGM. High grade slag preferably comprises no less than 2000 ppm PGM.

The term "smelting" refers to the extraction of metal from a material such as an ore by a process involving heating and melting.

The term "tapping" refers to the act of causing a fluid to flow from a pipe or container.

A "top blown rotary converter" or "TBRC" refers to a converter that can blow or inject a gas from above into or onto a molten phase in a rotatable pot.

According to embodiments of the present invention, a process for converting platinum group metal (PGM) collector alloy comprises the steps of: (a) introducing a converter feed into a pot of a converter holding a molten alloy pool, wherein the converter feed comprises: (i) 100 parts by weight of a collector alloy comprising no less than 0.5 wt % PGM, no less than 40 wt % iron, and no less than 0.5 wt % nickel, based on the total weight of the collector alloy; and (ii) if an added flux material comprises more than 10 weight percent silica and more than 10 weight percent of calcium oxide, magnesium oxide, or a combination of calcium oxide and magnesium oxide, by weight of the added flux material, no more than 20 parts by weight of the added flux material; (b) injecting oxygen-containing gas into the alloy pool to convert iron and one or more other oxidizable elements from the collector alloy to corresponding oxides and enrich PGM in the alloy pool; (c) allowing a slag comprising the iron oxide to collect in a low-density layer above the alloy pool; (d) tapping the low-density layer to recover the slag from the converter; and (e) tapping the alloy pool to recover the PGM-enriched alloy.

In any embodiment, the process can further comprise lining the pot with a refractory material; and supplying a refractory protectant to the pot holding the alloy pool at a rate not more than 20 parts by weight of the collector alloy, preferably no more than 18 parts by weight per 100 parts by weight of the collector alloy, more preferably at a rate between 5 and 15 parts by weight refractory protectant per 100 parts by weight of the collector alloy. In any embodiment, the refractory protectant can be supplied to the pot (i) after initially melting the alloy pool and prior to commencing step (b), (ii) during one or both of steps (a) and (b), and/or (iii) after stopping one or both of steps (a) and (b) to tap the low-density layer in step (d), prior to resuming said one or both of steps (a) and (b). The refractory protectant can be supplied to the pot together with the collector alloy introduced in step (a), or preferably is supplied to the pot separately from the collector alloy introduced in step (a), more preferably wherein the supply of refractory protectant to the pot is periodic.

The refractory protectant preferably comprises a component in common with the refractory material, such as alumina, for example. In any embodiment, the process can further comprise injecting the oxygen-containing gas into the alloy pool in step (b) through a lance extended into the alloy pool, wherein the lance comprises a consumable refractory material and is advanced into the pool as a tip of the lance is consumed. The consumable refractory material preferably comprises a component in common with the lining, preferably wherein the component in common comprises alumina. In any embodiment, the refractory material of the lining can comprise a ramming refractory comprising alumina, preferably wherein the ramming refractory comprises at least 90 wt % alumina.

In any embodiment, the process can further comprise sensing temperature in the refractory lining with radially spaced sensors mounted in the refractory lining; communicating temperature sensing information from the sensors to one or more transmitters; and transmitting signals containing the temperature sensing information from the one or more transmitters to a receiver. Preferably, the one or more transmitters are mounted externally on the pot and wirelessly transmit the signals to the receiver.

In any embodiment, the process can further comprise jacketing the pot and circulating a coolant, preferably an aqueous heat transfer medium, e.g., water/ethylene glycol/propylene glycol, and the like, through the jacket during step (b).

In any embodiment, the oxygen-containing gas can be injected into the converter alloy pool at a sufficient rate to maintain the alloy pool in a molten state at a temperature no higher than 1800° C., preferably at a temperature in a range from about 1250° C. to 1700° C., more preferably 1450° C. to 1700° C.

In any embodiment, the process can further comprise, prior to step (a), the step of: (I) partially pre-oxidizing a portion of the collector alloy from a raw state. Preferably, the partial pre-oxidation in step (I) comprises from 10 to 90 percent conversion of iron, more preferably from 25 to 75 percent iron conversion, and even more preferably from 30 to 60 percent iron conversion, based on the iron in the collector alloy portion prior to step (I). The collector alloy can be pre-oxidized by passing comminuted particles through an oxygen-rich flame; by partially converting the collector alloy and tapping the partially oxidized alloy, e.g., in an earlier converter cycle; by contacting particles of the collector alloy with an oxygen-containing gas at a temperature of at least 800° C., for example between 800° C. and 950° C., e.g., in a rotary kiln; fluidized bed roaster; and so on.

Preferably, the process can further comprise the steps of: (II) melting the partially pre-oxidized collector alloy in the pot to form a sufficient volume of the alloy pool for the injection of the oxygen-containing gas in step (b); and (III) then commencing the converter feed introduction into the pot in step (a) and the oxygen-containing gas injection into the alloy pool in step (b). As desired, the oxidized components in the partially pre-oxidized collector alloy from step (I) may be separated and removed in whole or in part prior to melting in step (II), or they can be allowed to remain in the partially pre-oxidized collector alloy melted in step (II).

In any embodiment, the pre-oxidizing step can comprise (I.A) passing comminuted collector alloy (e.g., a mesh size from about −16, preferably −18 to +200) through an oxygen-rich flame, preferably wherein the flame exhibits a flame temperature of not less than 2000° C., more preferably 2000° C. to 3500° C., and especially 2000° C. to 2800° C. The oxygen rich flame is preferably produced by a burner for heating the pot, and the process can further comprise (I.B) depositing at least partially melted collector alloy particles from the flame into the pot. Preferably the process comprises (I.C) cooling and solidifying the particles to form a coating of the pre-oxidized collector alloy on an interior surface of a refractory lining of the pot, e.g., where step (II) comprises melting the coating. In this pre-oxidizing procedure the oxidized components in the partially pre-oxidized collector alloy from step (I) are preferably allowed to remain in the partially pre-oxidized collector alloy melted in step (II).

In any embodiment, the pre-oxidizing step can comprise operating the converter through a pre-oxidation cycle of steps (II), (III), (a), (b), (c), (d), and (e) to prepare a partially oxidized starter alloy, where a partially pre-oxidized collector alloy from an earlier cycle is preferably melted in step (II) and the alloy recovered from step (e) is used as the partially pre-oxidized starter. The starter alloy preparation cycle can further comprise melting a previously prepared charge of the partially oxidized starter alloy in the emptied pot to form the alloy pool; periodically or continuously supplying the converter feed to the alloy pool in step (a) concurrently with the injection of the oxygen-containing gas in step (b); continuing the injection of the oxygen-containing gas to partially oxidize the alloy pool, preferably wherein from 10 to 90 percent, more preferably from 25 to 75 percent, of iron in the converter feed is oxidized, based on the weight of iron in the converter feed supplied to the converter alloy pool; tapping the slag from the converter pot, preferably a plurality of times; then recovering and solidifying the partially oxidized alloy pool. Preferably the solidified, partially oxidized collector alloy from the starter alloy preparation cycle is divided into a plurality of starter alloy charges for a like plurality of converter operating cycles and/or starter alloy preparation cycles.

In this pre-oxidizing converter cycle procedure the oxidized components in the partially pre-oxidized collector alloy from step (I) are preferably separated in step (c) and removed in step (d), and the partially pre-oxidized collector alloy can be recovered in step (e) of the pre-oxidizing cycle, cooled, and solidified prior to step (II). If desired, the slag recovered in step (d) of the pre-oxidizing cycle can be combined with and/or melted with the partially pre-oxidized alloy from step (e) in a subsequent step (I) of a collector alloy converting or pre-oxidation cycle.

In any embodiment, the pre-oxidizing step can comprise contacting particles of the collector alloy (e.g., a mesh size from about −16, preferably −18 to +200) with an oxygen-containing gas at a temperature above 800° C., e.g., between 800° C. and 950° C., preferably by roasting in a rotary kiln, fluidized bed roaster, or any other roasting mechanism taking care not to melt and excessively aggregate the particles together.

In any embodiment, the process can further comprise the steps of: (A.1) separating the slag recovered in step (d) into a plurality of portions; (A.2) recycling a first one of the recovered slag portions from step (A.1) to the converter feed introduced to the pot in step (a). The converter feed preferably comprises the recycled slag in an amount of from about 5 to 100 parts by weight per 100 parts by weight of the collector alloy, more preferably from 10 to 50 parts by weight per 100 parts by weight of the collector alloy in the converter feed. The process preferably comprises (A.2) combining the collector alloy and the recycle slag for concurrent introduction in the converter feed in step (a), preferably from a single feed unit. The recycled slag in step (A.2) preferably comprises a high-grade portion of the recovered slag from step (d), i.e., a higher PGM content than an average overall PGM content of the recovered slag from step (d), and/or the recycled slag has a nickel oxide content greater than about 2 percent by weight of the recycled slag.

In any embodiment, the process can comprise the steps of: (B.1) cooling, solidifying, and comminuting the recovered slag from step (d) (e.g., crushing to a mesh size of −4.8 mm (³⁄₁₆ in.) may be suitable); (B.2) magnetically separating the crushed slag into a magnetically susceptible fraction and a non-magnetically susceptible fraction; (B.3) recycling the magnetically susceptible fraction to the converter feed in step (A.2); and (B.4) optionally recycling a portion of the non-magnetically susceptible fraction to the converter feed in step (A.2).

In any embodiment, the process can comprise the steps of: (C.1) prior to steps (a) to (e), beginning a converter operation cycle by melting a partially pre-oxidized collector alloy in the pot to form the alloy pool; (C.2) then, prior to step (e), repeating a sequence of steps (a), (b), (c), and (d) a plurality of times, wherein step (d) in each sequence follows step (c); and (C.3) after a final tapping of the low-density layer in step (d) in a last one of the sequences of step (C.2), tapping the alloy pool in step (e). Preferably in a step (C.4) all or part of the slag recovered from the final tapping in step (d) is recycled to the converter feed in step (A.2) regardless of magnetic susceptibility, and/or all or part of the non-magnetically susceptible fraction separated in step (B.2) from the final tapping in step (d) is recycled to the converter feed in step (A.2). The process preferably comprises the steps of: (D.1) for the tapping(s) of the low-density layer preceding the final tapping in step (C.2), allowing alloy entrained in the low-density layer to substantially settle into the alloy pool before the tapping of the respective low-density layer(s); and (D.2) for the final tapping in step (C.2), tapping the low-density layer within five minutes, optionally entraining alloy in the low-density layer.

In any embodiment, the process can comprise the steps of: (E.1) smelting a catalyst material in a primary furnace, preferably a non-converting furnace; (E.2) recovering a primary furnace slag and a first collector alloy from the primary furnace; (E.3) smelting the primary furnace slag in a secondary furnace, preferably a non-converting furnace; (E.4) recovering a secondary furnace slag and a second collector alloy from the secondary furnace; (E.5) supplying the first and second collector alloys to converter feed in step (a); and (E.6) supplying at least a portion of the slag recovered from the converter in step (d) to the secondary furnace for smelting with the primary furnace slag in step (E.3). The pot of the converter is preferably lined with a refractory material, and a portion of the primary furnace slag from step (E.2) can be supplied to the pot as a refractory protectant for steps (a) and (b), preferably at a rate not more than 20 parts by weight of the primary furnace slag per 100 parts by weight of the collector alloy, more preferably 18 parts by weight of the primary furnace slag per 100 parts by weight of the collector alloy, more preferably at a rate between 5 and 15 parts by weight of the primary furnace slag per 100 parts by weight of the collector alloy.

In any embodiment, the process can comprise any one or more or all of the following: (F.1) the oxygen-containing gas injection in step (b) is preferably continued until the alloy pool comprises no more than about 10 wt % iron, preferably no more than 5 wt % iron; and/or (F.2) the PGM-enriched alloy preferably comprises no less than 25 wt % PGM, preferably from 25 to 60 wt % PGM; (F.3) the PGM-enriched alloy preferably comprises no less than 25 wt % nickel, more preferably from 25 to 70 wt % nickel; and/or (F.4) the PGM-enriched alloy preferably comprises no more than 10 wt % iron; and/or (F.5) the PGM-enriched alloy preferably comprises no more than 2 wt % silicon, no more than 2 wt % phosphorus, no more than 10 wt % copper, and/or no more than 2 wt % sulfur; and/or (F.6) the collector alloy preferably comprises from 0.5 to 12 wt % PGM; and/or (F.7) the collector alloy preferably comprises no less than 40 wt % iron, preferably 40 to 80 wt % iron; and/or (F.8) the collector alloy preferably comprises no less than 0.5 wt % nickel, preferably 1 to 15 wt % nickel; and/or (F.9) the collector alloy preferably comprises no more than 3 wt % sulfur, more preferably 0.1 to 3 wt % sulfur; and/or (F.10) the collector alloy preferably comprises: no more than 3 wt % copper, more preferably 0.1 to 3 wt % copper; and/or no more than 2 wt % chromium, preferably 0.1 to 2 wt % chromium; and/or no more than 20 wt % silicon, more preferably 1 to 20 wt % silicon.

With reference to the drawings in which like parts are indicated by like numerals, FIG. 1A schematically shows a converting process 100A for converting PGM collector alloy according to embodiments of the present invention. A converter feed 116 is introduced into a pot 120 of a converter 118 holding a molten alloy pool 122. The converter 118 can be any suitable converter for oxidizing the iron and other elements in the feed 116, e.g., using oxygen in a gas bubbled into the alloy pool from the top or side or bottom (not shown), which results in the formation of a light-density slag phase 128. The converter 118 is preferably a top blown rotary converter ("TBRC") having an inclined, generally cylindrical pot 120 holding the alloy pool 122 as shown that can be rotated by motor 119, e.g., at 1 rotation per hour up to 20 rotations per minute, e.g., 30 rotations per hour, to facilitate mixing and agitation. The pot 120 is often lined with a refractory material 123. TBRCs are known, for example, from patent document U.S. Pat. No. 4,581,064, and they are typically custom-designed and built for specific applications by a number of engineering firms specializing in metallurgical processing.

In any embodiment, converter feed 116 can be a collector alloy obtained from smelting catalyst material, including the raw collector alloy and/or a partially pre-oxidized collector alloy, and preferably comprises no less than 0.5 wt % PGM, for example from 0.5 to 12 wt %; no less than 30 wt % iron, for example from 40 to 80 wt % iron; and no less than 0.5 wt % nickel, for example from 1 to 15 wt % nickel, based on the total weight of the converter feed 116. The converter feed 116 may also comprise at least about 0.1 weight percent of each of copper, sulfur, and chromium; for example, from 0.1 to 3 weight percent copper, from 0.1 to 3 weight percent sulfur, and from 0.1 to 2 weight percent chromium, based on the total weight of the converter feed 116. The converter feed 116 and/or its components can also comprise up 20 wt % silicon, for example, from 1 to 20 wt % silicon; and up to 15 wt % phosphorus, for example from 1 to 15 wt % phosphorus, all based on the weight of the converter feed 116. Other elements may also be present, usually in amounts up to 5 wt %.

The converter feed 116 may optionally comprise an added flux material, but if the added flux material comprises more than 10 weight percent silica and more than 10 weight percent of calcium oxide, magnesium oxide, or a combination of calcium oxide and magnesium oxide, by weight of the added flux material, the converter feed 116 comprises no more than 20 parts by weight of the added flux material per 100 parts by weight of the collector alloy, more preferably no more than 18 parts by weight of the added flux material per 100 parts by weight of the collector alloy.

The converter 118 can be provided with a preferably water cooled burner assembly 117 to melt the alloy pool 122. The alloy pool 122 can be converter feed 116 and/or a collector alloy, which is preferably initially at least partially oxidized or converted, and can become increasingly oxidized or converted as the converting process progresses through a cycle of operation.

Oxidant gas such as oxygen 124 is preferably injected into the pot 120 via lance 126 as the pot is rotated about a longitudinal axis. The oxygen converts iron and other oxidizable elements in the alloy pool 122 to the corresponding iron and other oxides, e.g., iron to iron oxide, silicon to silica, phosphorus to phosphorous pentoxide, chromium to chromium oxide, copper to copper oxide, titanium to titanium oxide, and so on. The rotation and gas injection provide agitation and mixing as the iron and other impurities are depleted from the alloy pool 122 by oxidation and collect as a floating, low density layer 128, thereby enriching PGM in the alloy pool 122. The low-density layer 128 is tapped periodically or continuously and recovered as slag 130, for example, from a tap or by tipping the pot 120. Nickel and PGM are generally not as easily oxidized, and these are enriched in the alloy pool 122 and similarly recovered from a tap or by tipping the pot 120 as a PGM-enriched nickel alloy 132, which is often solidified in a mold to form ingots. Slag 130 is often cooled, solidified, comminuted, e.g., by crushing and/or milling, to facilitate handling. For example, a mesh size of −4 (−4.8 mm, −3/16 in.) may be suitable.

Preferably, a refractory protectant 138 is supplied to the converter 118 in an effective amount. The protectant 138 can retard loss of the refractory material from the lining 123, thus extending the refractory life and reducing the frequency of replacement of the refractory lining 123. The protectant 138 can contain a material common to the refractory lining 123, e.g., alumina where the refractory 123 is alumina-based. Where the refractory 123 is alumina-based, the protectant 138 is preferably an aluminosilicate that melts at a lower temperature than the refractory, i.e., an aluminosilicate glass, which may conveniently be supplied from the furnace slags 106 and/or 112 (see FIG. 1B), preferably from the primary furnace slag 106, for example, where the slags 106 and/or 112 also contain alumina. Where the refractory 123 is alumina-based, the amount of alumina in the protectant 138 should preferably not be less than 10 wt %, and the protectant 138 preferably comprises alumina in an amount of from 25 to 75 wt %, based on the total weight of the protectant.

An amount of protectant 138 needed to be effective is typically small in proportion to the converter feed 116. Preferably the protectant is added at less than 20 wt %, based on the weight of the converter feed 116, e.g., from 1 to 10 wt % of the converter feed. The protectant 138 can be added continuously, but is preferably added periodically, e.g., onto the top of the alloy pool 122, following initial melting of the pool, and after each tapping of the slag 128. Excessive amounts of protectant 138 provide limited additional protection and lead to higher volumes of slag 130, whereas insufficient protectant 138 leads to higher refractory losses.

The lance 126 is frequently in a region of high temperature due to the oxygen addition and the exothermic nature of the converting reactions in close proximity, and is often consumable. Where the lance 126 is made of a consumable material, such as refractory material in common with the lining 123, for example alumina, it may likewise benefit from the refractory protectant 138. When the lance 126 is consumable, it is often advanced, periodically or continuously, as the tip of the lance is consumed, to maintain oxygen injection below an upper level of the alloy pool 122 and minimize unreacted oxygen escaping from the alloy pool 122 and/or slag 128. In general, the rate of oxygen-containing gas injection is preferably as high as possible to rapidly complete the conversion, but not so high as to exceed the operating temperature limits of the TBRC 118 or as to cause unreacted oxygen to bubble up through the upper surface of the alloy pool 122 and/or low density layer 128.

Figure 1B:
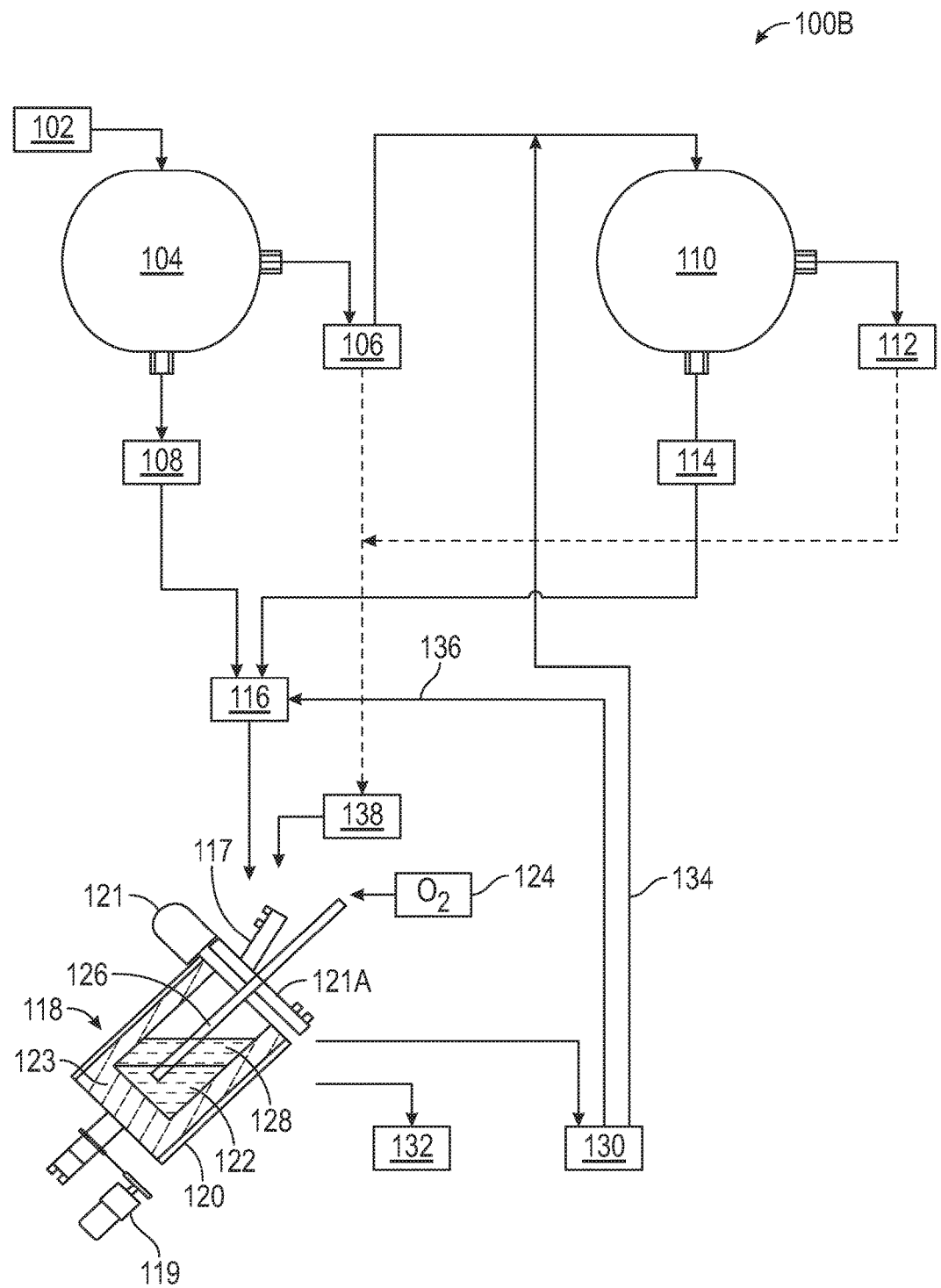
FIG. 1B is a simplified schematic flow diagram of a PGM recovery process integrating the converter of FIG. 1A according to embodiments of the present invention.

FIG. 1B schematically shows a PGM recovery process 100B incorporating a converter 118, preferably the converter process 100A (see FIG. 1A), according to embodiments of the present invention. The PGM collector alloy is preferably obtained from smelting a catalyst material 102 in primary furnace 104. The catalyst material 102 often comprises PGM on or in a support such as silica, alumina, clay, zeolite, cordierite, and the like, e.g., a washcoat of PGM-containing material on a ceramic support. The catalyst material 102 can be any PGM-containing material such as waste catalyst, for example, catalytic converters for automotive exhaust, catalyst from a refinery or chemical process industry, and the like.

If desired, the catalyst material can be conventionally processed to prepare it for smelting, e.g., by size reduction, removal of deleterious materials and/or inert materials that contain little or no PGM, such as by comminution, chemical treatment, magnetic separation, etc. Patent document U.S. Pat. No. 5,279,464, for example, discloses comminution and magnetic separation of the catalyst material from automotive catalytic converters.

Smelting catalyst material such as in furnace 104 is well known, and uses a conventional furnace, e.g., a non-converting furnace such as an electric arc furnace, induction furnace, plasma arc furnace, fired furnace, and so on. For example, patent document U.S. Pat. No. 5,030,274 discloses processing catalyst material in an electric arc furnace to recover PGM, and patent documents U.S. Pat. No. 4,295,881 and WO 2014154945A1 disclose smelting of chromite-bearing ores to recover PGM. The catalyst material, often with the addition of slag, flux, or collector metal, is generally continuously fed and when heated in the furnace forms slag 106 and a PGM-containing collector alloy. The collector alloy is relatively dense compared to the lighter slag, and collects in an alloy pool 108 below an upper layer of the slag 106.

Slag 106 and collector alloy 108 are recovered, periodically or continuously, and often cooled and solidified for further processing. For example, collector alloy 108 is often poured into molds, and slag 106 is often granulated, dried in a rotary kiln, and packaged in bags or a suitable container. The slag 106 from the primary furnace 104 can contain residual PGM, often 1-5 wt % of the PGM in the catalyst material 102, and is in turn preferably smelted in a secondary furnace 110, which can be a furnace similar to furnace 104, e.g., a non-converting furnace such as an electric arc furnace, induction furnace, plasma arc furnace, fired furnace, or the like, with the addition of metallurgical coke. The slag 112 recovered from furnace 110 is further depleted in PGM, and may be similarly cooled, solidified, granulated, dried, packaged, etc. The slag 112 can be disposed of as a byproduct or waste material. The PGM are concentrated and recovered in the collector alloy 114 from the secondary furnace 110, and poured into molds and solidified in a manner similar to the collector alloy 108.

Figure 8:
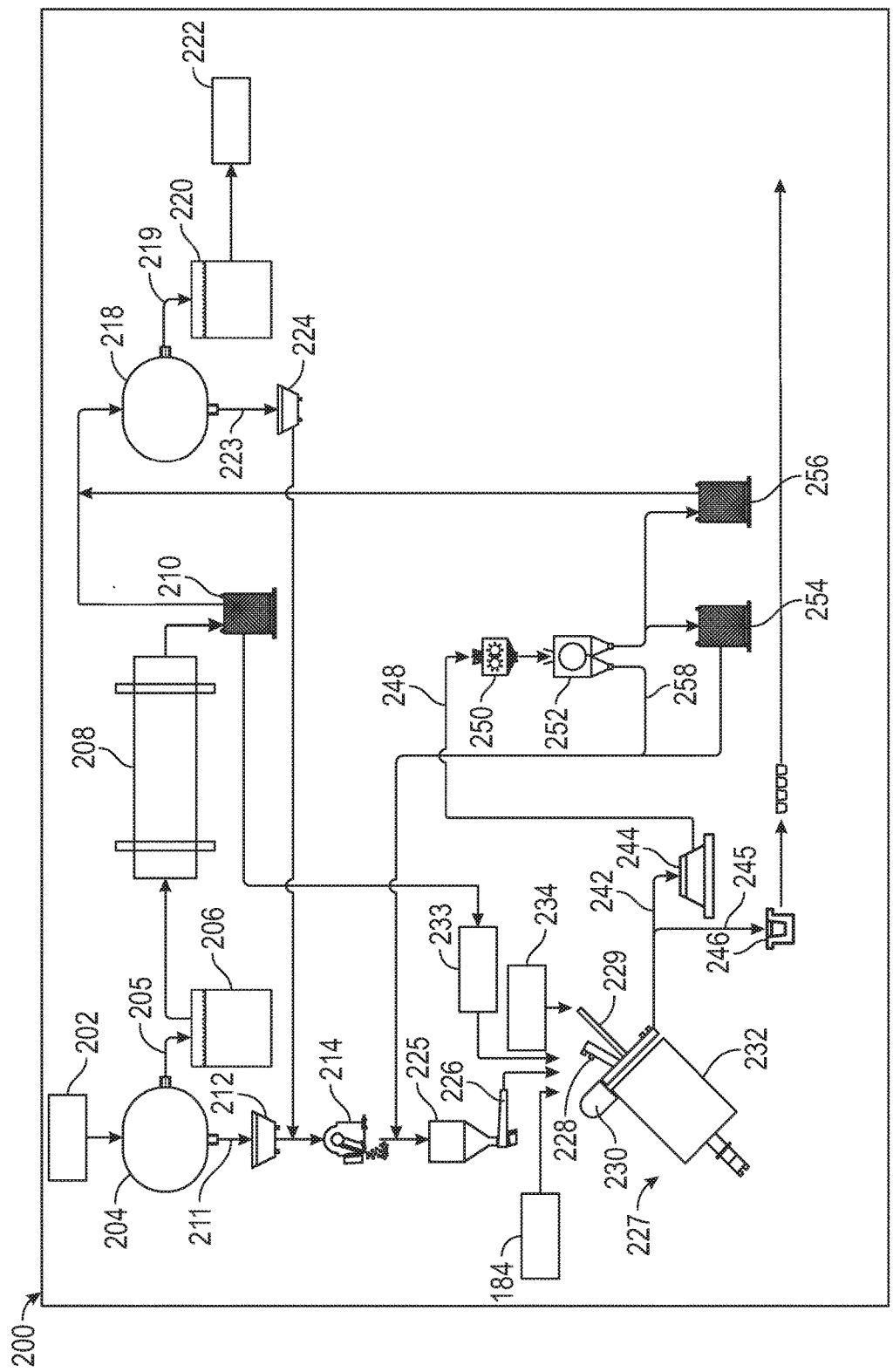
FIG. 8 schematically shows a simplified process flow diagram of a PGM recovery process according to embodiments of the present invention.

In any embodiment, the first PGM collector alloy 108, the second PGM collector alloy 114, or preferably both, are introduced as converter feed 116 to converter 118. The converter 118 shown in FIG. 1B can be any suitable converter for oxidizing the iron and other elements in the feed 116, and preferably comprises the converter 118 as described above in process 100A in connection with FIG. 1A. The PGM collector alloys 108, 114 are often comminuted, e.g., by crushing and/or milling, and fed to the converter 118 from a hopper 225 via a vibrating feeder 226 as shown in FIG. 8.

Collector alloy 108 and collector alloy 114, separately and/or collectively in converter feed 116, preferably comprise no less than 0.5 wt % PGM, for example from 0.5 to 12 wt %; no less than 30 wt % iron, for example from 40 to 80 wt % iron; and no less than 0.5 wt % nickel, for example from 1 to 15 wt % nickel, based on the total weight of the converter feed 116, collector alloy 108, and/or collector alloy 114. The first and/or second collector alloys 108, 114, may also comprise at least about 0.1 weight percent of each of copper, sulfur, and chromium; for example, from 0.1 to 3 weight percent copper, from 0.1 to 3 weight percent sulfur, and from 0.1 to 2 weight percent chromium, based on the total weight of the first and/or second collector alloys. The converter feed 116 and/or its components can also comprise up 20 wt % silicon, for example, from 1 to 20 wt % silicon; and up to 15 wt % phosphorus, for example from 1 to 15 wt % phosphorus, all based on the weight of the PGM-enriched nickel alloy. Other elements may also be present, usually in amounts up to 5 wt %.

Slag 130 from the converter 118 is often cooled, solidified, comminuted, e.g., by crushing and/or milling, to facilitate handling. Nickel and PGM are generally not as easily oxidized, and these are enriched in the alloy pool 122 and recovered as a PGM-enriched nickel alloy 132, e.g., solidified in a mold to form ingots.

In any embodiment, the converter slag 130 can be smelted in the furnaces 104 and/or 110. The slag 130 may contain residual PGM, and these values can be substantially recovered into the collector alloys 108 and/or 114. Preferably, at least a first portion 134 of the converter slag 130 is processed in the secondary furnace 110 with the primary furnace slag 106, since this may aid in limiting the accumulation of deleterious elements in the collector alloy 108 that can occur if the converter slag 130 is processed only in the primary furnace 104.

In any embodiment, a second portion 136 of the converter slag 130 may be recycled to the converter feed 116.

Figure 1C:
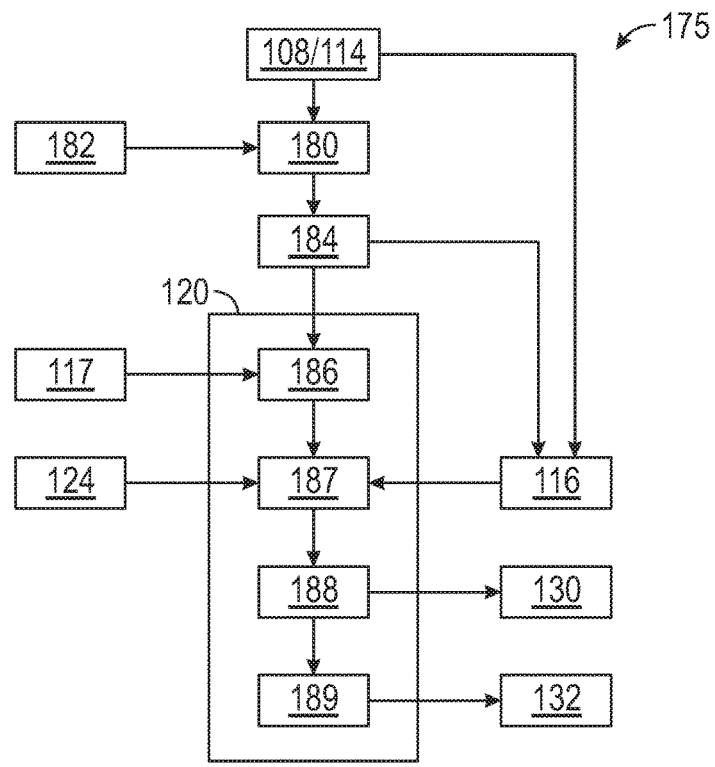
FIG. 1C is a schematic block flow diagram of a PGM recovery process employing partial pre-oxidation of a collector alloy according to embodiments of the present invention.

With reference to FIG. 1C, embodiments of the present invention provide a converter process 175 that partially pre-oxidizes collector alloy to speed up the converting process. In the converter process 175, raw collector alloy 108 and/or 114 (FIG. 1B) are contacted in step 180 with an oxidant 182 at elevated temperature to obtain a partially pre-oxidized PGM collector alloy 184. The oxidant 182 can be an oxygen-containing gas such as air, oxygen-enriched air, oxygen, oxygen-rich combustion gas, or the like. The elevated temperature is preferably not less than 800° C., and more preferably not less than 2000° C.

In step 186, the partially pre-oxidized alloy 184 is often melted in the pot 120 of the converter 118 (FIG. 1A or 1B) using, for example, burner assembly 117 (FIG. 1A), to form the alloy pool 122. In the converting step 187, converter feed 116 is introduced to the alloy pool 122 in the pot 120 and oxygen-containing gas 124 is injected. The converter feed 116 preferably comprises the partially pre-oxidized alloy 184, the raw collector alloy 108, 114, or a combination thereof. Then in step 188, the converter slag 130 can be tapped as needed, preferably a plurality of times, and in step 189, the alloy pool 122 (FIG. 1A) is tapped, and PGM-enriched alloy 132 is recovered.

Pre-oxidation as shown in FIG. 1C solves problems in known converting technology. For example, directly melting the PGM collector alloys 108, 114 from the furnaces 104, 110, may produce an initial slag 128B (FIG. 4) with undesirable melting characteristics. Also, the PGM collector alloys may be undesirably reactive with oxygen, resulting in an excessive exotherm, and/or requiring a relatively low rate of oxygen addition and an extended period of time for suitable conversion. Preferably, the partial pre-oxidation in step 180 achieves from 10 to 90 percent conversion of the iron to iron oxide in the collector alloy, more preferably from 25 to 75 percent iron conversion, and especially from 30 to 60 percent iron conversion. If desired, the oxidized iron can be removed from the partially pre-oxidized PGM collector alloy 184, e.g., where prepared as a starter alloy in an earlier converter cycle from which slag is separated; or preferably the oxidized iron can remain in the partially pre-oxidized PGM collector alloy 184, as in air oxidation in a kiln or especially by flame oxidation.

With reference again to FIG. 1C, the process 175 can provide a converter startup procedure. In any embodiment, a partially pre-oxidized collector alloy charge is often used to speed up the converting process, e.g., the initial melting, and/or produce an initial slag with a low melting temperature. In any embodiment, any metal that melts more quickly and/or at a lower temperature relative to the converter feed 116 (FIGS. 1A and 1B) can be used as or in lieu of the partially pre-oxidized collector alloy 184. In the converter startup procedure 175, raw collector alloy 108 and/or 114 (FIG. 1B) are contacted in step 180 with an oxygen-containing gas 182 at elevated temperature to obtain a partially pre-oxidized PGM collector alloy 184, which in turn is melted in step 186 using, for example, burner assembly 117 (FIG. 1A), to form the alloy pool 122 in the pot 120 of the converter 118 (FIG. 1A or 1B).

For example, the pre-oxidation 180 can be effected (1) by contacting particles of the raw collector alloy 108/114 (e.g., crushing to a mesh size of −16 may be suitable, for example, −16 or −18/+200) with an oxygen-containing gas at a temperature of at least 800° C., for example between 800° C. and 950° C., e.g., in a rotary kiln or fluidized bed roaster; (2) by partially converting the raw collector alloy in converter 118 (FIG. 1A) with oxygen-containing gas 124 at a temperature no less than 1250° C., preferably at least 1450° C., e.g., 1450° C. to 1700° C., and tapping the partially oxidized alloy, e.g., in an earlier or previous converter cycle (see FIG. 1D); (3) by flame oxidation comprising passing comminuted particles 157 (e.g., crushing to a mesh size of −16 may be suitable, for example, −16 or −18/+200) through an oxygen-rich flame 156 (FIG. 2C), preferably at a temperature not less than 2000° C., more preferably 2000° C. to 3500° C., and especially 2000° C. to 2800° C.; and so on. Some preferred embodiments of flame pre-oxidation are described in more detail in reference to FIG. 2C below.

Figure 1D:
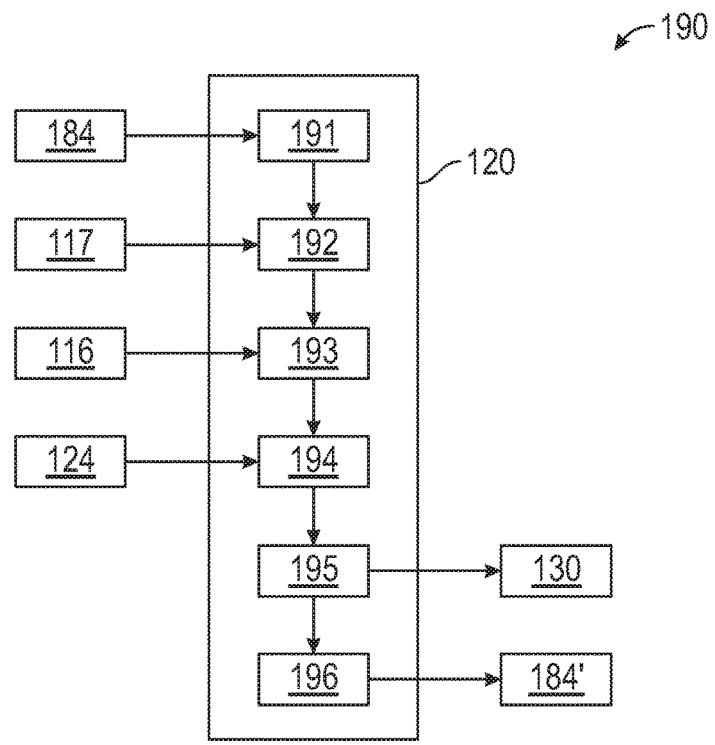
FIG. 1D is a schematic block flow diagram of an exemplary starter alloy preparation procedure according to embodiments of the present invention.

With reference to FIG. 1D, there is schematically shown an example of starter alloy preparation procedure 190 to prepare partially pre-oxidized starter alloy in an amount sufficient for a plurality of batches. In step 191, a charge of partially pre-oxidized collector alloy 184 (FIG. 1C), e.g., from an earlier starter alloy batch, is placed in the optionally emptied pot 120. In step 192, the starter alloy 186 is melted, e.g., using burner assembly 117 (FIG. 1A) to form the converter alloy pool 122. In step 193, converter feed 116 comprising the PGM collector alloy is supplied (periodically or continuously), and in step 194, oxygen-containing gas 124 is injected into the alloy pool 122. The oxygen injection is continued to partially oxidize the converter feed, preferably wherein from 10 to 90 percent of the iron is converted to iron oxide, more preferably where the iron conversion is from 25 to 75 percent, and especially from 30 to 60 percent iron conversion, based on the weight of iron in the total converter feed 116 and starter alloy supplied to the alloy pool 122. In step 195, the converter slag 130 can be tapped as needed to avoid over-filling the pot 120, preferably a plurality of times.

Then in step 196, the alloy pool 122 (FIG. 1A) is tapped, and starter alloy 184' is recovered. The recovered starter alloy 184' is often solidified and broken up into pieces, or it can be comminuted, e.g., by crushing, milling, etc., as desired, although this is not generally a requirement. For example, the solidified, partially oxidized collector alloy from the starter alloy preparation cycle can be divided into a plurality of generally equal-sized starter alloy charges for a like plurality of converter operating cycles and/or starter alloy preparation cycles. For example, one batch of starter alloy 184' may provide sufficient starter alloy for a plurality of batches, e.g., 3-10, and thus a starter batch prepared for seven batches might be prepared every seventh batch, i.e., using the seventh one of the starter batches after the sixth batch of PGM-enriched nickel alloy product.

Figure 2A:
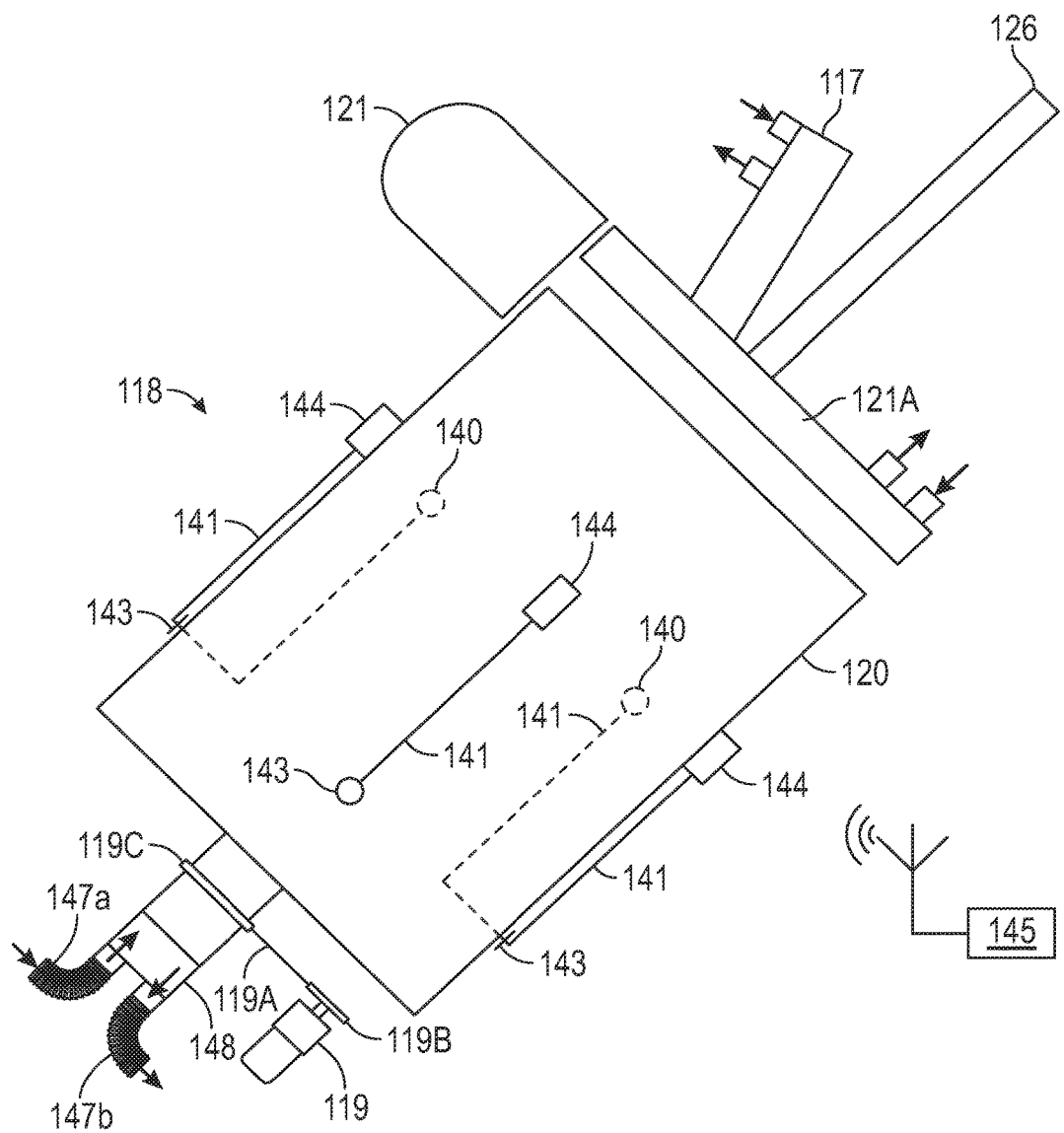
FIG. 2A is a simplified side view of a top blown rotary converter (TBRC) pot according to embodiments of the present invention.

With reference to FIG. 2A, there is schematically shown a simplified side view of a preferred TBRC 118 equipped with a water-cooled oxy-fuel burner assembly 117, motor 119, fume hood 121, water cooled heat shield 121A, oxygen injection lance 126, and rotary coupling 148. The TBRC 118 has a fume hood 121 and a water cooled heat shield 121A that has openings to allow positioning of the burner 117 and lance 126, entry of feed 116 (FIG. 1A) and protectant 138 (FIG. 1A), and tapping of the alloy pool 122 (FIG. 1A) and low density layer 128 (FIG. 1A). The motor 119 can be geared, e.g., via a chain 119A and sprockets 119B, 119C, and is capable of rotating the pot 120 at a suitable rate to provide agitation, e.g., ½ rotation per minute. Externally mounted transmitters 144 can be connected via wire 141 through conduit 143 to temperature sensors 140 (see FIG. 2B) mounted in or near the refractory 123 (see FIG. 2B) can send a temperature signal to a remote receiver 145. A cooling fluid inlet and outlet can be in the form of flex hoses 147a and 147b to supply and return the cooling fluid via a dual flow rotary coupling 148 to a jacket 146 (see FIG. 2B).

Figure 2B:
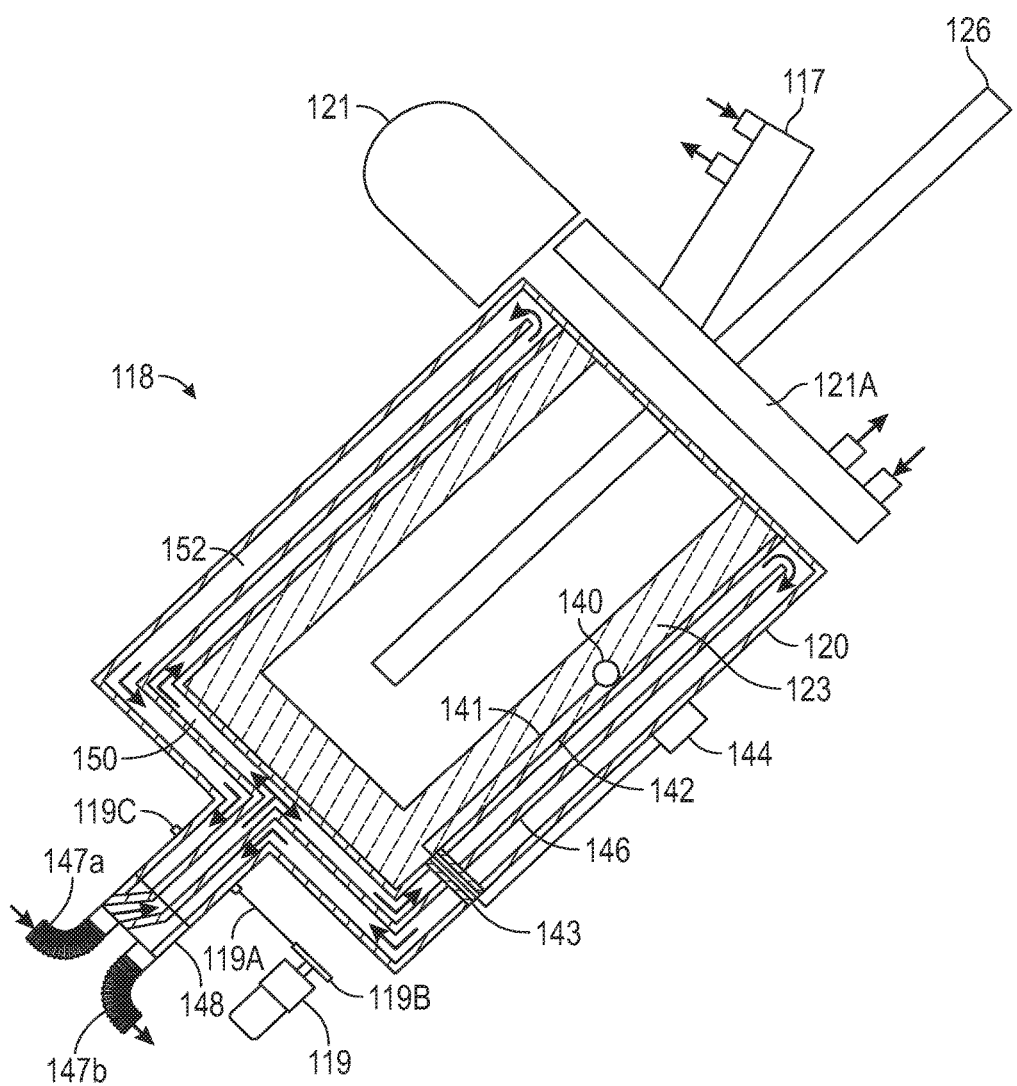
FIG. 2B is a simplified side sectional view of the TBRC pot of FIG. 2A.

With reference to FIG. 2B there is shown a side sectional view of the TBRC 118 comprising the pot 120. A temperature sensor 140 such as a thermocouple is located in the refractory 123, preferably adjacent an interior wall 142 of the pot 120, and connected via wire 141 passing through conduit 143 to the externally mounted temperature transmitter 144, which can transmit temperature information wirelessly to the remote receiver 145 (FIG. 2A). In any embodiment, the oxygen-containing gas is injected into the converter alloy pool at a sufficient rate to maintain the alloy pool in a molten state at a temperature no higher than 1800° C., e.g., a temperature in the alloy pool not less than 1250° C., preferably from about 1450° C. to 1700° C. Lower temperatures risk premature solidification of the alloy pool 122, whereas excessively high temperatures risk failure of TBRC 118 components. In any embodiment, the temperature of the refractory 123 can be monitored, e.g., for process control and/or to detect premature thinning.

In any embodiment, the pot 120 can be provided with a jacket 146 to circulate coolant fluid such as an aqueous heat transfer medium, e.g., water/ethylene glycol/propylene glycol, and the like. For example, the fluid from a flex hose 147a can enter the jacket 146 through a central passage of a rotary coupling 148, flow into an inner annular channel 150 adjacent the wall 142, and out through an outer annular channel 152 to exit via the coupling 148 from flex hose 147b. In this manner, the life of the refractory 123 can be extended and/or the oxygen can be injected at a higher rate to facilitate faster processing and/or a greater converter throughput. If desired, the bottom of the pot 120 and jacket 146 can comprise a bottom flange (not shown) to facilitate assembly/disassembly.

Figure 2C:
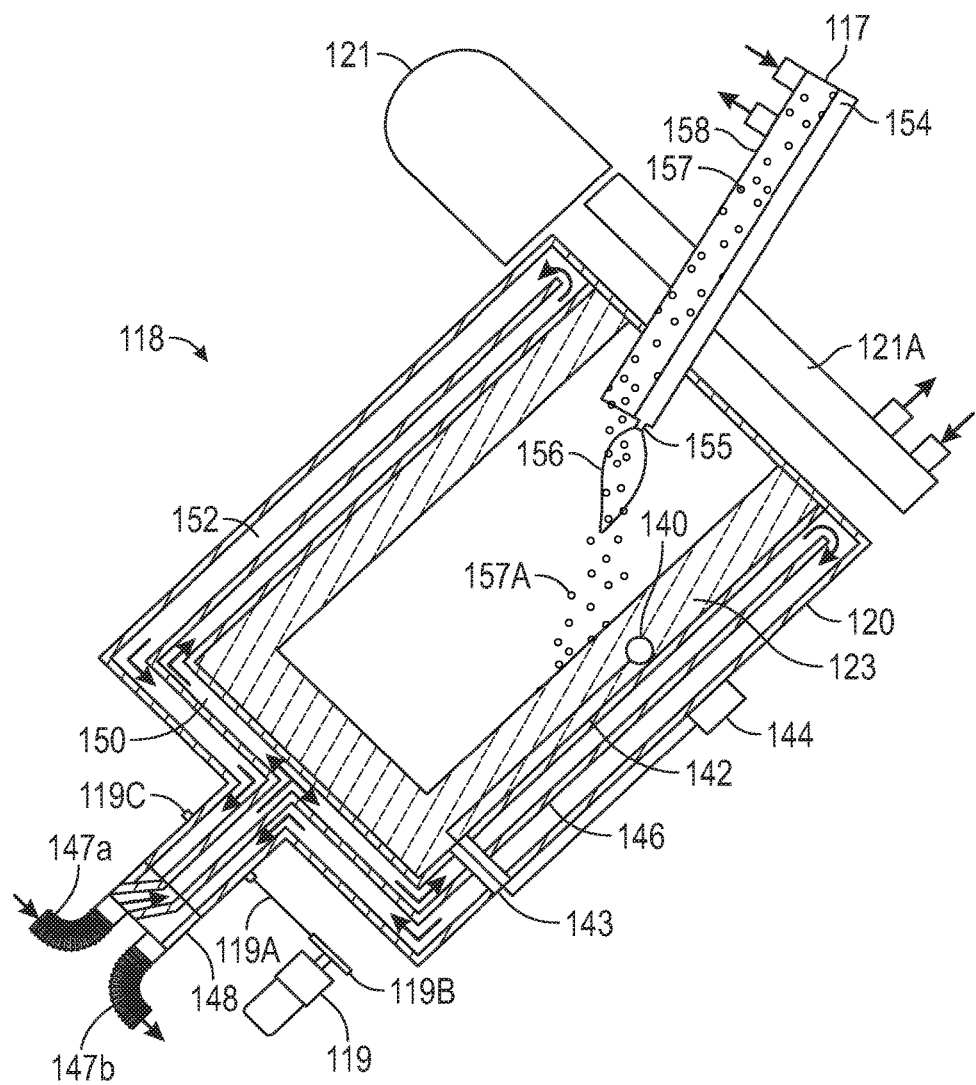
FIG. 2C is a simplified side sectional view of the TBRC pot of FIG. 2B showing flame pre-oxidation prior to the start of a converter cycle according to embodiments of the present invention.

With reference to FIG. 2C, there is shown a simplified side sectional view of the TBRC 118 of FIGS. 2A and 2B schematically illustrating an embodiment of a burner assembly 117 for in situ pre-oxidation according to embodiments of the present invention. The burner assembly 117 is provided with a fuel/oxygen supply line(s) 154 to burner nozzle 155 to generate an oxygen-rich flame 156. Collector alloy particles 157 are supplied through an adjacent feeding tube 158, e.g., from an overhead vibrating feed unit (not shown). The collector alloy particles 157 fall from the feed tube 158 through the flame 156 where they are partially oxidized. The partially oxidized particles 157A then fall and accumulate in the pot 120. Rotation of the pot 120 during operation distributes the particles 157A onto a surface of the refractory lining 123. If the particles 157A are melted or partially melted in the flame 156, they can form a coating on the refractory lining 123 when they cool and solidify. Free-flowing and/or fused particles 157A can then be melted when desired by increasing the firing rate of burner 156. If the burner 156 is fired at a higher rate during pre-oxidation, the partially oxidized particles 157A can collect in a molten alloy pool 122A (see FIG. 3).

The collector alloy particles 157 are often ground or milled into a particulated form to increase the surface area exposed to the flame 156, but are preferably sufficiently large to pass through the flame 156 and settle on the pot 120. The alloy particles 157 are also preferably sufficiently large to facilitate separation, e.g., by cyclone (not shown) or gravity, and avoid excessive entrainment in the discharged combustion gas. For example, a mesh size of −16 or −18/+200 may be suitable for gravity separation. Excessive fines, e.g., −200 mesh, are preferably minimized or avoided. The flame 156 is preferably oxygen-rich to provide an oxidizing environment to partially oxidize the particles 157, e.g., the burner 155 can be fired with a fuel gas such as natural gas or propane and a 10% excess of oxygen relative to theoretical for complete combustion, preferably 15-30% excess oxygen, more preferably 20-25% excess oxygen. The combustion oxidizing gas is preferably oxygen-enriched air or more preferably >99 volume percent oxygen so that the combustion temperature in the flame 156 is no less than 2000° C. The partial pre-oxidation should be sufficient to convert from 10 to 90 percent of the iron in the particles 157 to iron oxide in the particles 157A, preferably to convert from 25 to 75 percent of the iron, and more preferably to convert from 30 to 60 percent of the iron.

The collector alloy particles 157 can conveniently be pre-oxidized during an off shift, e.g., overnight, using a relatively low feed rate and a low burner rate, relative to operation. A charge of collector alloy particles 157 sufficient to form the desired alloy pool 122A (FIG. 3) at the start of an operating cycle can be loaded in the feed unit (not shown). The particles 157 can accumulate in a bed, a coating, or as a molten pool inside of the pot 120, which is kept hot by the flame 156. After the charge is finished pre-oxidizing, continued firing of the burner 155 facilitates keeping the pot 120 and partially pre-oxidized collector alloy particles 157 warm, e.g., 500° C. to 1200° C., preferably 800° C. to 1200° C., so that a converting operating cycle can be quickly started. At the start of the day shift, the accumulated particles 157 can be molten or quickly melted to form the alloy pool 122A (see FIG. 3) by increasing the firing rate of the burner 155 to quickly start a converting cycle.

Figure 3:
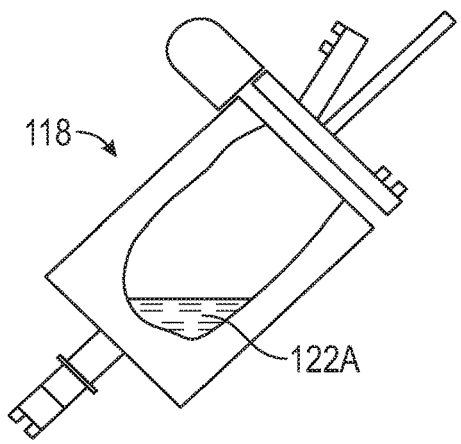
FIG. 3 is a simplified side view of a TBRC pot partially cut away to show the molten alloy pool at the beginning of a fill in a converter cycle according to embodiments of the present invention.

A preferred operational cycle of the converter 118 is shown in FIGS. 3-7. An operating cycle often begins by melting a charge of partially pre-oxidized collector alloy in the converter pot 120 to form the converter alloy pool 122A as shown in FIG. 3. The pool 122A is preferably just sufficient to inject the oxygen below the surface, e.g., approximately 10-15 vol % of the available volume of the pot 120, where the available volume is the volume of the pot 120 that can be filled without overflowing material out of the top at the angle at which the pot 120 is inclined for operation. However, because the PGM collector alloys 108, 114 from the furnaces 104, 110 may produce a slag (128B) with undesirable melting characteristics when melted, a partially pre-oxidized collector alloy charge is preferably used to speed up the initial melting and produce an initial slag with a low melting point. In any embodiment, any metal that melts more quickly and/or at a lower temperature relative to the converter feed 116 can be used as or in lieu of the partially pre-oxidized collector alloy.

Figure 4:
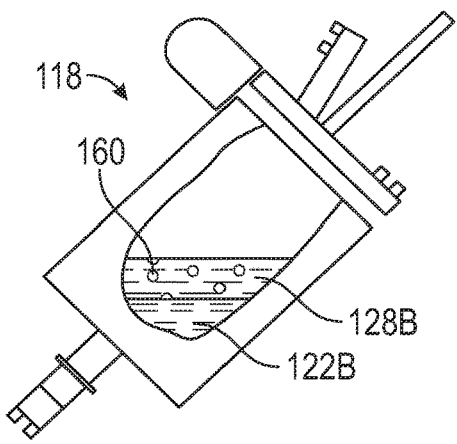
FIG. 4 shows the TBRC pot of FIG. 3 partially filled with alloy and slag early in a converter cycle.

After melting the initial pre-oxidized alloy charge 122A in FIG. 3, the converter feed 116 is introduced and the oxygen is injected. The feed material 116 is melted and the volume of the alloy pool 122B is enlarged as shown in FIG. 4. Reaction of the oxygen converts iron and other materials into a slag phase 128B, which reduces the alloy pool volume. The slag phase 128B is less dense than the alloy pool 122B, and floats on top. Agitation from oxygen-containing gas injection and/or rotation of the pot 120 entrains particles or droplets 160 of the alloy into the slag phase 128B.

Figure 5:
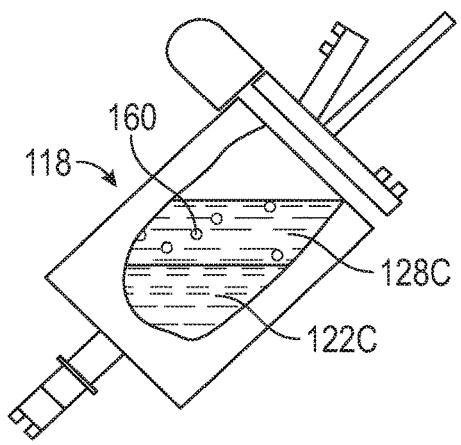
FIG. 5 schematically shows the alloy and slag in the pot of FIG. 4 at the end of an oxygen injection cycle in the converter cycle.
Figure 6:
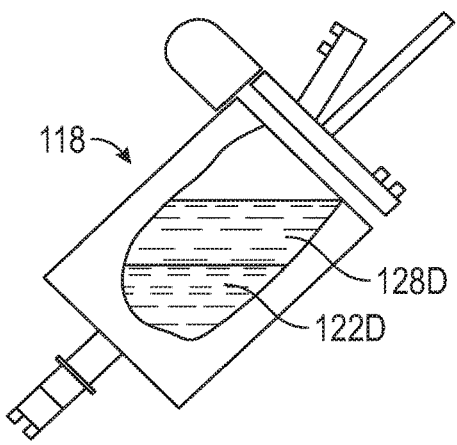
FIG. 6 schematically shows the alloy and slag in the pot of FIG. 5 following alloy disentrainment from the slag layer prior to a non-final slag tapping in the converter cycle.

Introduction of the feed 116 and oxygen-containing gas injection are continued until the pot 120 is filled to desired capacity with enlarged alloy pool 122C and slag phase 128C, as shown in FIG. 5. The slag phases 128B and 128C during the pot fill stage generally contain some entrained alloy 160 dispersed in the slag phases 128B, 128C due to agitation and mixing by the oxygen injection and rotation of the pot 120. The feed introduction and oxygen injection are often stopped for slag tapping. When the oxygen injection and rotation are stopped, the entrained alloy droplets or particles 160 are allowed to settle out of the slag phase 128D and return to the alloy pool 122D, as seen in FIG. 6. After a quiescence period effective to promote the gravity settling and disentrainment of dispersed metal 160 from the slag 128C (FIG. 5), and coalescence into the alloy pool 122D (FIG. 6), preferably at least 2 minutes, the slag 128D can be removed with substantially less entrained alloy. The slag 128D is often tapped by tilting the pot 120 to pour out the slag phase 128D into molds (not shown), with minimal entrainment or tapping of the alloy pool 122D, i.e., with a clean margin for the slag phase 128D.

With the slag 128D removed, the pot 120 has additional volume to resume the feed supply and/or oxygen injection as in FIGS. 3 and 4. The cycle of filling the pot as in FIGS. 4 and 5 and tapping the slag 128D, after a brief alloy disentrainment period as shown in FIG. 6, is preferably repeated a plurality of times. After the desired charge of the converter feed 116 has been added, the oxygen-containing gas injection may continue until the level of desired conversion is achieved, e.g., at least 90% conversion of the iron from the converter feed 116, or preferably at least 95% iron conversion, or more preferably 98% iron conversion. After a final cycle of filling and/or oxygen injection, the alloy pool 122E is at its desired volume and level of converting as in FIG. 7, and the final slag layer 128E and alloy pool 122E are successively tapped and poured into respective molds.

Figure 7:
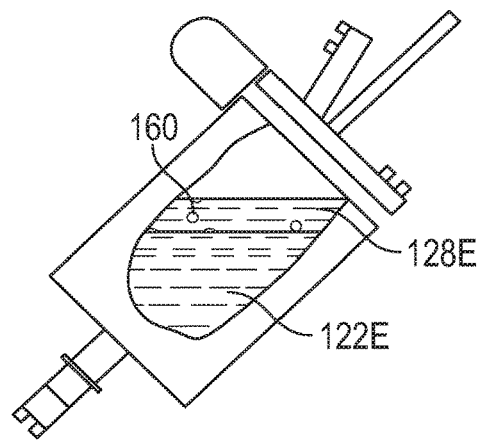
FIG. 7 schematically shows the alloy and slag in the pot of FIG. 4 just prior to the final slag tapping in the converter cycle.

When it is desired to tap the alloy 122E and final slag 128E as in FIG. 7, however, it is preferred to immediately tap the slag 128E without waiting for the alloy phase 160 to substantially separate from the slag 128E. At the end of the oxygen injection, the converting reaction is more complete and the exotherm may moderate, tending to reduce the temperature of the alloy pool 122E. At the same time, the melting temperature of the PGM-enriched alloy has increased. Thus, it is preferred to tap the alloy 122E promptly to avoid premature solidification, e.g., by commencing final tapping of the slag 128E less than 5 minutes following termination of the oxygen injection. To avoid contaminating the alloy pool 122E with slag 128E, it is often preferred to tap the final slag 128E to provide the alloy pool 122E with a clean margin, i.e., by tapping an upper portion or surface at the upper margin of the alloy pool 122E with the slag 128E. However, as described above, this final slag tapping 128E represents a high grade slag that is preferably recycled to the converter feed 116 in a subsequent converter cycle, so that the PGM values can be recovered.

In a preferred embodiment as shown schematically in FIG. 8, process 200 includes smelting catalyst material 202 in primary electric arc furnace 204. Slag 205, comprising mainly aluminosilicate, is recovered from the furnace 204, granulated in water in granulator 206, dried in rotary kiln 208, and repackaged in bag-filling station 210. The PGM collector alloy 211 is cast into molds 212, solidified, and crushed in crusher 214.

The dried slag 210 from the primary furnace 204 is smelted in second, finishing electric arc furnace 218. Slag 219 recovered from the furnace 218 is granulated in granulator 220 and recycled as byproduct 222 for an appropriate use, e.g., as aggregate. The PGM collector alloy 223 from the secondary furnace 218 is cast into molds 224, solidified and crushed in crusher 214.

Milled collector alloys 211 and 223 from crusher 214 are placed in hopper 225 which supplies feed material to vibrating feeder 226 to TBRC 227. The TBRC 227 is equipped with a burner assembly 228, oxygen injection lance 229, fume hood 230, and motor (see FIG. 2A) to rotate the pot 232 of the TBRC 227. If desired, the pot 232 can be provided with a water-cooling jacket, lined with an alumina-based ramming refractory, and provided with any of the other features of the TBRC 118 as described above in connection with FIGS. 2A, 2B, 2C.

To start a converting cycle, as the TBRC 227 is rotated, a portion of the converter feed from the hopper 225 is fed through the feeder 226 to fall through an oxygen-rich flame (cf flame 156 in FIG. 2C) of the burner assembly 228 and is partially pre-oxidized. The pre-oxidation is continued until accumulating a charge of the partially pre-oxidized collector alloy that when melted would create an alloy pool of sufficient size to allow oxidation to begin, generally filling about 10-20% of the available volume of the pot. Cf. alloy pool 122A in FIG. 3. Alternatively, a previously prepared starter alloy, a kiln-oxidized collector alloy, a fluidized bed oxidized collector alloy, or the like could be used as the partially pre-oxidized collector alloy. If necessary, the partially pre-oxidized collector alloy charge is melted using the burner 228 to a temperature of at least 1250° C., preferably at least 1450° C. A portion of the total protectant comprising the dried aluminosilicate slag 210 from the primary furnace 204 is preferably placed on top of the alloy pool as slag protectant 233.

While the pot of the TBRC 227 is rotated, the burner is typically shut off and oxygen 234 is injected into the alloy pool using lance 229 at a rate to maintain a temperature sufficient to avoid solidification of the alloy pool but at a sufficient rate to maintain the temperature in the alloy pool no higher than 1800° C., e.g., 1450° C. to 1700° C. PGM collector alloys 211, 223 from the furnaces 204, 218 are placed in hopper 225, and fed into the TBRC 227 at a generally steady rate via vibrating feeder 226. The TBRC 227 filled with material as slag is formed and the alloy pool grown by the feed into the TBRC. Cf alloy pool 122B and slag 128B in FIG. 4. When the volume of the pot was filled sufficiently (cf alloy pool 122C and slag 128C in FIG. 5), the pot rotation, oxygen injection, and alloy feed can be stopped. After waiting several minutes, typically at least 5 minutes, to allow phase separation (cf. alloy pool 122D and slag 128D in FIG. 4), slag 242 is tapped into molds 244 by tipping the TBRC 227, taking care to maintain a clear margin in the slag 242 and avoid tapping excessive amounts of the alloy.

The oxygen injection and converter feed into the remaining alloy pool are then resumed until the TBRC 227 is again filled, and slag 242 tapped as described above. The cycle is repeated several times until the alloy pool has grown to a desired volume for tapping. The last slag 242 tapped just before tapping the alloy is preferably performed promptly after stopping the oxygen injection and collector alloy feed to avoid freezing, taking care that substantially all of the slag 242 is tapped, e.g., providing a clear margin for the alloy pool. Minor amounts of alloy may optionally be entrained in the slag. Cf alloy pool 122E, slag 128E, and alloy 160 in FIG. 7. However, the final slag tapping is preferably recycled to the converter feed 116 in a subsequent cycle to minimize PGM losses. The PGM-enriched alloy 245 is then tapped into ingot molds 246, cooled, and solidified.

After the slag molds 244 are cooled, the solidified slag 248 is often fed through slag crusher 250 and magnetic separator 252. The non-magnetic fractions from the final slag tapping and the earlier tappings can be sorted into containers 254 and 256, respectively. The non-magnetic fraction 256 can be smelted in the secondary furnace 218 with the slag 210 from the primary furnace.

The magnetic fractions 258 from all of the converter slag and the non-magnetic fraction 254 from the final slag tapping are preferably placed in the feed hopper 225 for a subsequent TBRC batch. Alternatively, the entirety of the final slag tapping can be placed directly in the hopper 225 with the collector alloy(s) 211, 223, bypassing the magnetic separator 252.

Figure 9:
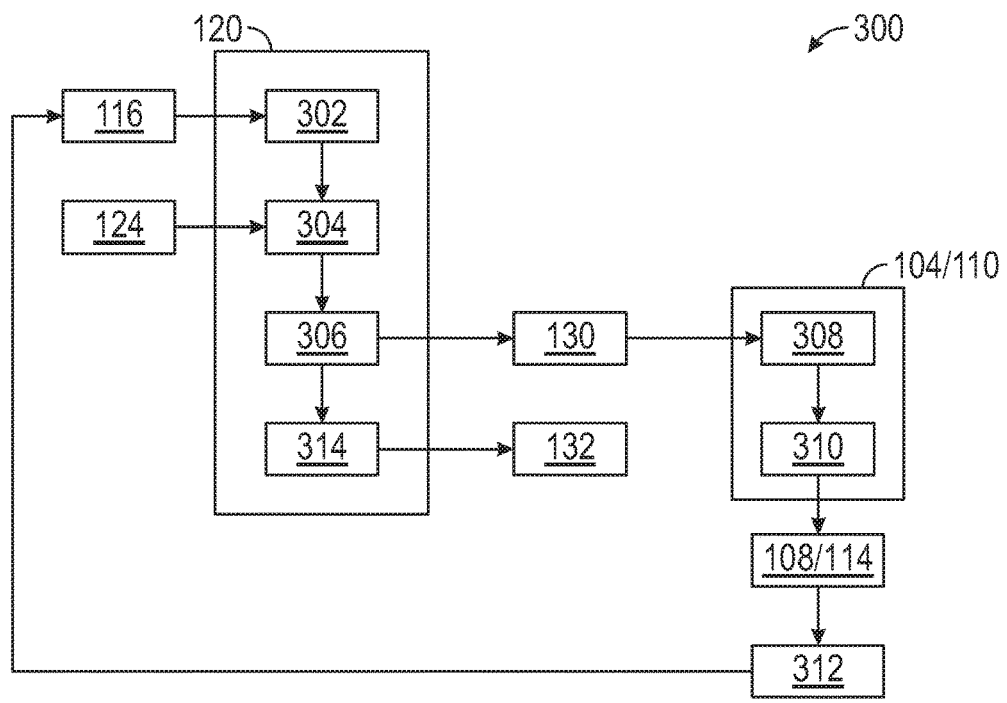
FIG. 9 is a schematic block flow diagram of a PGM recovery process employing a converter and a finishing furnace according to embodiments of the present invention.

In another aspect, in reference to FIG. 9, embodiments of the present invention provide a PGM collector alloy converting process 300 comprising: in step 302, introducing a converter feed 116 (FIG. 1A) comprising PGM collector alloy 108 and/or 114 (FIG. 1B) into a pot 120 of a converter 118 (FIG. 1A) holding an alloy pool 122 (FIG. 1A); in step 304, injecting oxygen-containing gas 124 (FIG. 1A) into the alloy pool; in step 306, recovering slag 130 (FIG. 1A) from the pot 120; in step 308, smelting the recovered slag 130 in a furnace 104 and/or 110 (FIG. 1B), preferably a secondary furnace 110; in step 310, recovering collector alloy 108 and/or 114 (FIG. 1B) from the furnace 104 and/or 110; optionally in step 312, introducing the collector alloy 108 and/or 114 recovered from the furnace 104 and/or 110 in step 308 to the converter feed 116 to the pot 120 with the alloy pool 122; and in step 314, recovering PGM-enriched alloy 132 (FIG. 1A) from the pot 120. The converter feed 116 preferably comprises the collector alloys 108 and/or 114 which comprise no less than 0.5 wt % PGM, no less than 40 wt % iron, and no less than 0.5 wt % nickel, based on the total weight of the collector alloy. The converter feed 116 may optionally comprise an added flux material, but if an added flux material comprises more than 10 weight percent silica and more than 10 weight percent of calcium oxide, magnesium oxide, or a combination of calcium oxide and magnesium oxide, by weight of the added flux material, the converter feed preferably comprises no more than 20 parts by weight of the added flux material per 100 parts by weight of the collector alloy. Preferably, the PGM-enriched alloy comprises no less than 25 wt % PGM, no less than 25 wt % nickel, and no more than 10 wt % iron, more preferably from 25 to 60 wt % PGM and from 25 to 70 wt % nickel.

Figure 10:
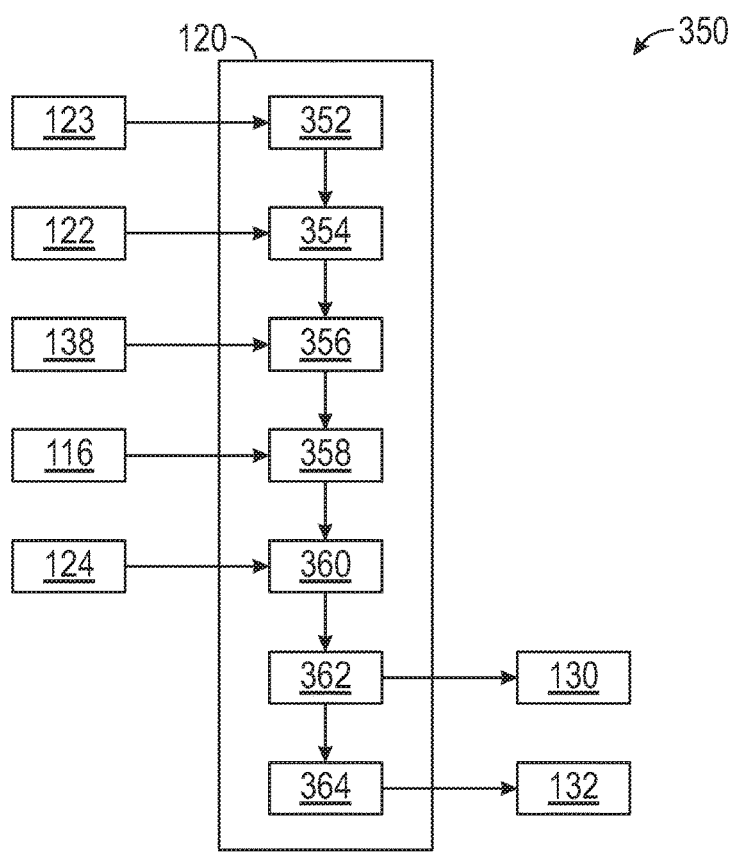
FIG. 10 is a schematic block flow diagram of a PGM recovery process employing a refractory-lined converter and refractory protectant according to embodiments of the present invention.

In another aspect, in reference to FIG. 10, embodiments of the present invention provide a PGM collector alloy converting process 350 comprising: in step 352, lining a converter pot 120 with a refractory material 123 (FIG. 1A); in step 354, holding an alloy pool 122 (FIG. 1A) in the pot 120; in step 356, supplying a refractory protectant 138 (FIG. 1A) to the pot 120 with the converter alloy pool 122; in step 358, introducing a converter feed 116 (FIG. 1A) comprising PGM collector alloy 108 and/or 114 (FIG. 1B) into the pot 120 with the alloy pool 122; in step 360, injecting oxygen-containing gas 124 (FIG. 1A) into the alloy pool 122; in step 362, recovering slag 130 (FIG. 1A) from the pot 120; and in step 364, recovering PGM-enriched alloy 132 from the pot 120. The refractory protectant 138 preferably comprises a refractory component in common with the refractory material 123. The component in common can comprise alumina, for example. The converter feed 116 preferably comprises the collector alloys 108 and/or 114 which comprise no less than 0.5 wt % PGM, no less than 40 wt % iron, and no less than 0.5 wt % nickel, based on the total weight of the collector alloy. The converter feed 116 may optionally comprise an added flux material, but if an added flux material comprises more than 10 weight percent silica and more than 10 weight percent of calcium oxide, magnesium oxide, or a combination of calcium oxide and magnesium oxide, by weight of the added flux material, the converter feed preferably comprises no more than 20 parts by weight of the added flux material per 100 parts by weight of the collector alloy. Preferably, the PGM-enriched alloy comprises no less than 25 wt % PGM, no less than 25 wt % nickel, and no more than 10 wt % iron, more preferably from 25 to 60 wt % PGM and from 25 to 70 wt % nickel.

Figure 11:
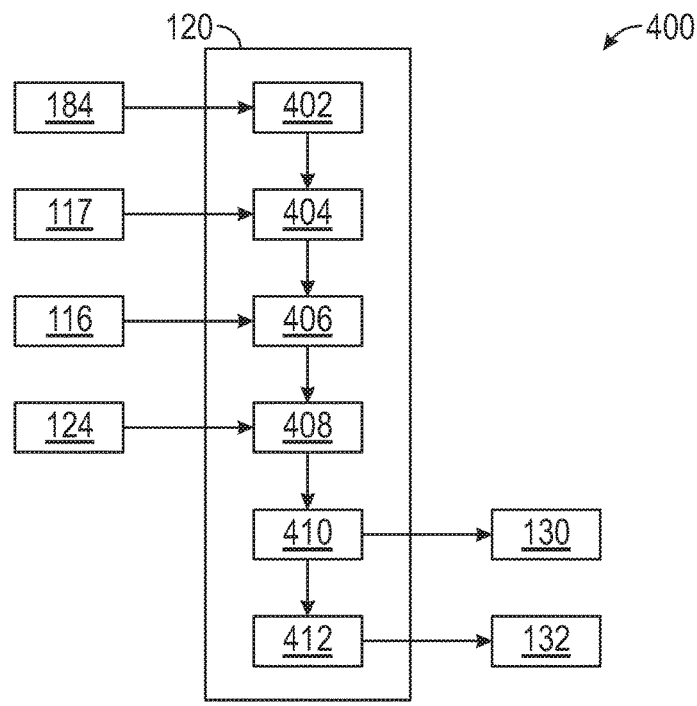
FIG. 11 is a schematic block flow diagram of a PGM recovery process employing a partially pre-oxidized PGM collector alloy according to embodiments of the present invention.

In another aspect, in reference to FIG. 11, embodiments of the present invention provide a PGM collector alloy converting process 400 comprising: in step 402, placing a charge of partially pre-oxidized PGM collector alloy 184 (see FIG. 1C) in a pot 120 of a converter 118 (FIG. 1A); in step 404, melting the charge of the partially pre-oxidized PGM collector alloy 184 to form an initial alloy pool 122A (FIG. 3), e.g., using a burner assembly 117; in step 406, introducing a feed 116 (FIG. 1A) comprising PGM collector alloy into the pot 120 with the alloy pool 122A; in step 408, injecting oxygen-containing gas 124 (FIG. 1A) into the alloy pool; in step 410, recovering slag 130 (FIG. 1A) from the pot 120; and in step 412 recovering PGM-enriched alloy 132 from the pot 120. The converter feed 116 preferably comprises the collector alloys 108 and/or 114 which comprise no less than 0.5 wt % PGM, no less than 40 wt % iron, and no less than 0.5 wt % nickel, based on the total weight of the collector alloy. The converter feed 116 may optionally comprise an added flux material, but if an added flux material comprises more than 10 weight percent silica and more than 10 weight percent of calcium oxide, magnesium oxide, or a combination of calcium oxide and magnesium oxide, by weight of the added flux material, the converter feed preferably comprises no more than 20 parts by weight of the added flux material per 100 parts by weight of the collector alloy. Preferably, the starter charge forms an alloy pool comprising a volume of from 5 to 20 vol % of available pot volume, or the depth is otherwise sufficient to receive a lance for the oxygen-containing gas injection. Preferably, the PGM-enriched alloy comprises no less than 25 wt % PGM, no less than 25 wt % nickel, and no more than 10 wt % iron, more preferably from 25 to 60 wt % PGM and from 25 to 70 wt % nickel.

Figure 12:
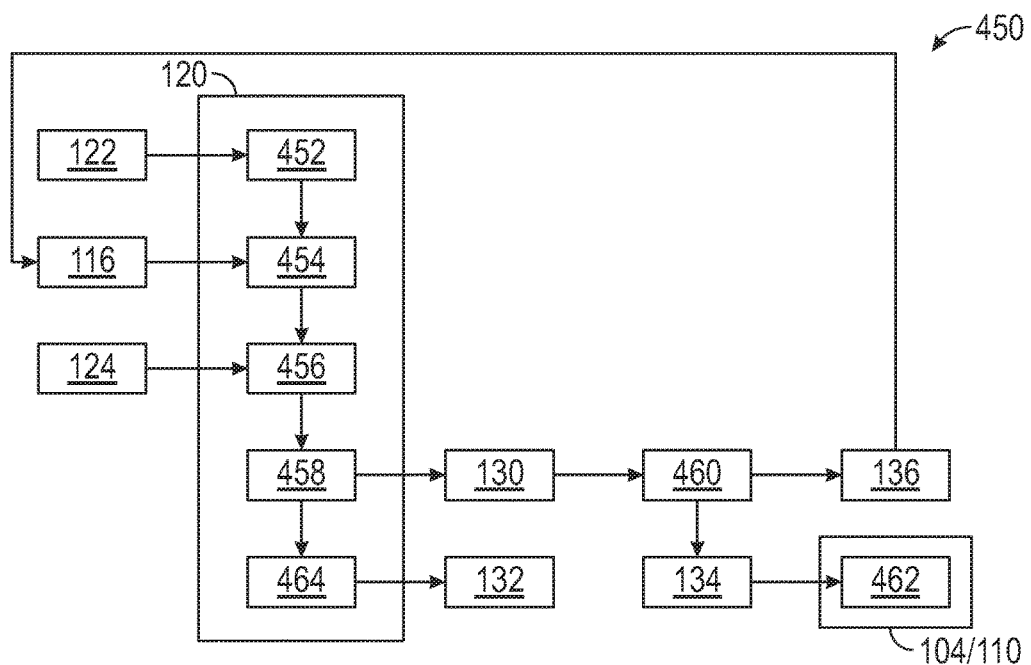
FIG. 12 is a schematic block flow diagram of a PGM recovery process employing a converter, converter slag recycle to the converter and an optional finishing furnace according to embodiments of the present invention.

In yet another aspect, in reference to FIG. 12, embodiments of the present invention provide a PGM collector alloy converting process 450 comprising: in step 452, holding an alloy pool 122 in a pot 120 (FIG. 1A); in step 454, introducing a converter feed 116 (FIG. 1A) comprising PGM collector alloy into the pot 120 with the alloy pool 122; in step 456, injecting oxygen-containing gas 124 (FIG. 1A) into the alloy pool 122; in step 458, recovering slag 130 from the pot 120; in step 460, separating the slag 130 into first and second portions 134, 136; optionally, in step 462, smelting the first portion 134 in a furnace 104 and/or 110 (FIG. 1B); introducing the second portion 136 to the converter feed 116 to the pot 120; and in step 464, recovering PGM-enriched alloy 132 from the pot 120.

In any embodiment of the process 450, the converter feed 116 can comprise a weight ratio of recycled slag 136 to collector alloy 108 and/or 114 (see FIG. 1B) of from 1:20 to 1:2, preferably from 1:10 to 3:10. Preferably, all or part of the second portion 136 of the recovered slag has a higher PGM and/or nickel content relative to a PGM and/or nickel content of the first portion 134, and/or the second portion 136 of the recovered slag has a nickel content greater than about 2 wt %. For example, the separation in step 460 can be according to magnetic susceptibility where the first portion 134 comprises the non-magnetically susceptible fraction and the second portion 136 comprises the magnetically susceptible fraction. As another example, the second portion 136 can comprise a slag 128D with entrained alloy 160 as shown and discussed in connection with FIG. 7. The converter feed 116 preferably comprises the collector alloys 108 and/or 114 which comprise no less than 0.5 wt % PGM, no less than 40 wt % iron, and no less than 0.5 wt % nickel, based on the total weight of the collector alloy. The converter feed 116 may optionally comprise an added flux material, but if an added flux material comprises more than 10 weight percent silica and more than 10 weight percent of calcium oxide, magnesium oxide, or a combination of calcium oxide and magnesium oxide, by weight of the added flux material, the converter feed preferably comprises no more than 20 parts by weight of the added flux material per 100 parts by weight of the collector alloy.

Figure 13:
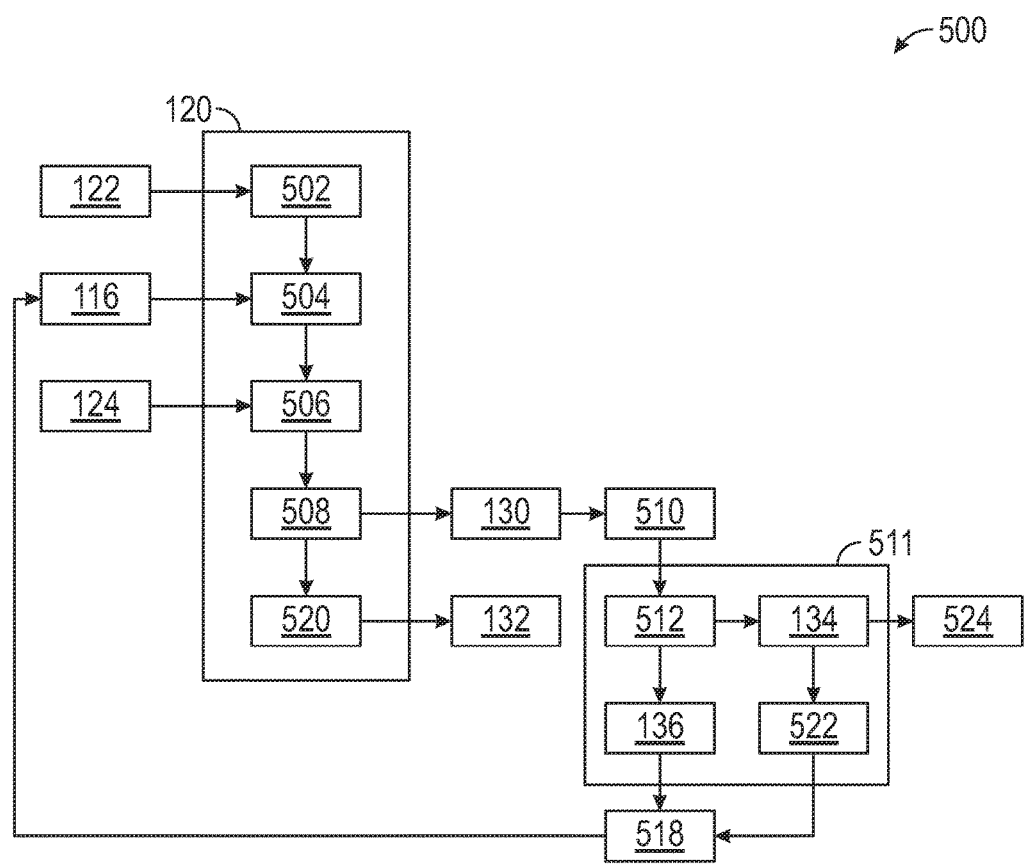
FIG. 13 is a schematic block flow diagram of a PGM recovery process employing a converter, magnetic separation of converter slag, and converter slag recycle to the converter according to embodiments of the present invention.

In a further aspect, with reference to FIG. 13, embodiments of the present invention provide a PGM collector alloy converting process 500 comprising: in step 502, holding an alloy pool 122 in a pot 120 (FIG. 1A); in step 504, introducing a converter feed 116 comprising PGM collector alloy 108 and/or 114 (see FIG. 1B) comprising iron and nickel into the pot 120 with the alloy pool 122; in step 506, injecting oxygen-containing gas 124 (FIG. 1A) into the alloy pool 122; in step 508, recovering slag 130 from the pot 120; in step 510, solidifying and comminuting the recovered slag 130; in step 511, separating the slag 130 into a high grade fraction for a recycling step 518 and a low grade fraction 524, where the high grade fraction has a higher PGM content than the low grade fraction 524; in step 518, introducing a recycle portion of the recovered slag comprising the magnetically susceptible fraction 136 to the converter feed 116 for introduction into the pot 120; and in step 520, recovering PGM-enriched alloy 132 from the pot 120. In any embodiment, the separation step 511 can optionally comprise a magnetic separation step 512 to magnetically separate the comminuted slag into a non-magnetically susceptible fraction 134 and a magnetically susceptible fraction 136 comprising high grade slag. In any embodiment, the recycle portion of the recovered slag in step 518 can optionally include a first, high grade portion 522 of the non-magnetically susceptible fraction 516. For example, the high grade portion 522 can comprise slag 128E (FIG. 7) from a final tapping. A second, low grade part 524 of the non-magnetically susceptible fraction 516 is not recycled, and can be removed from the converting process, e.g., for smelting in the secondary furnace 110. In any embodiment, the converter feed 116 can comprise a weight ratio of slag 136 and 522 to collector alloy of from 1:20 to 1:2, preferably from 1:10 to 3:10. Preferably, the total recycle portion 136 and 522 of the recovered slag 512 has a higher PGM content and/or nickel content relative to a non-recycled portion 524. Often, the recycle portion of the recovered slag has a total nickel content not less than about 2 wt %.

Figure 14:
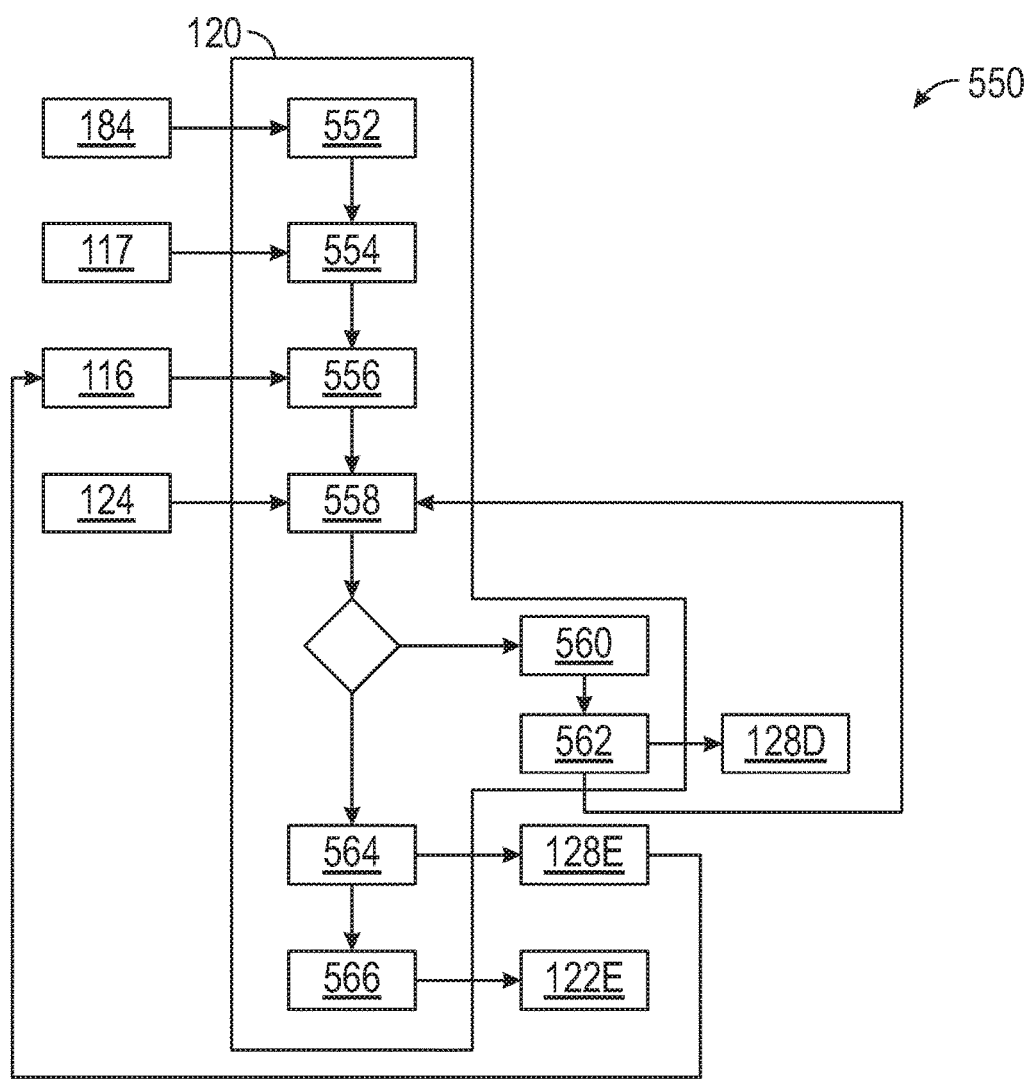
FIG. 14 is a schematic block flow diagram of a PGM recovery process employing a converter, alloy disentrainment prior to non-final slag tapping, a final slag tapping without complete alloy disentrainment, and optional recycle of the final slag tapping to the converter according to embodiments of the present invention.

In a further aspect, with reference to FIG. 14, embodiments of the present invention provide a converting process 550 for converting a converter feed 116 comprising a collector alloy comprising no less than 0.5 wt % PGM, no less than 40 wt % iron, and no less than 0.5 wt % nickel, based on the total weight of the collector alloy. The converter feed 116 may optionally comprise an added flux material, but if an added flux material comprises more than 10 weight percent silica and more than 10 weight percent of calcium oxide, magnesium oxide, or a combination of calcium oxide and magnesium oxide, by weight of the added flux material, the converter feed preferably comprises no more than 20 parts by weight of the added flux material per 100 parts by weight of the collector alloy.

The process 550 comprises: (a) in step 552, placing a charge of a partially pre-oxidized PGM collector alloy 184 (FIG. 1C) in a converter pot 120 (FIG. 1A); (b) in step 554, melting the charge of the partially pre-oxidized PGM collector alloy 184 in the pot 120, e.g., using a burner assembly 117 (FIG. 1A), to form an alloy pool 122A (FIG. 3); (c) in step 556, periodically or continuously introducing a charge of converter feed 116 into the pot 120; (d) in step 558, injecting oxygen-containing gas 124 into the alloy pool to form slag 128B (FIG. 4); (e) in preparation for one or more periodic non-final slag tappings, in step 560, allowing alloy 160 entrained in the slag 128C to substantially settle into the alloy pool 122D as seen in FIG. 5, e.g., for a period of no less than 5 minutes; (f) then in step 562, tapping slag 128D from the pot 120; (g) repeating step 558 in (d) one or more times followed by steps 560 and 562 until a final time; (h) following the final step 558, in step 564, tapping the slag 128E with entrained alloy 160 as seen in FIG. 7.

The converter feed introduction step 556 in (c) and the oxygen-containing gas injection step 558 in (d) are preferably stopped for the periodic slag tapping steps 562 in (e) and 564 in (h). Preferably, the oxygen-containing gas injection step 558 is continued until the alloy pool 122E comprises 10 wt % iron or less, more preferably 5 wt % iron or less, by weight of the alloy pool. In any embodiment, all or part of the converter slag 128E recovered from the final slag tapping in (h) can be introduced to the converter feed 116, e.g., in a later batch.

In a still further aspect, with reference to FIG. 1B, embodiments of the present invention provide a process 100B for recovering PGM from catalyst material, comprising: smelting a catalyst material 102 in a primary furnace 104 to form slag 106 and a first collector alloy 108; recovering slag 106 from the primary furnace 104; smelting the primary furnace slag 106 in a secondary furnace 110 to form a second collector alloy 114 in the secondary furnace 110; recovering slag 112 from the secondary furnace 110; recovering the first and second collector alloys 108, 114 from the respective first and secondary furnaces 104, 110; introducing converter feed 116 comprising the first and second collector alloys 108, 114 into a pot 120 holding a converter alloy pool 122, wherein the first and second collector alloys 108, 114 preferably comprise at least 0.5 wt % PGM, at least 40 wt % iron, and at least 0.5 wt % nickel, based on the total weight of the converter feed 116; injecting oxygen-containing gas 124 into the converter alloy pool 122; recovering converter slag 130 from the pot 120; smelting at least a first portion 134 of the converter slag 130 in the secondary furnace 110 together with the primary furnace slag 106; and recovering PGM-enriched nickel alloy 132 from the pot 120. Optionally, a second portion 136 of the converter slag 130 is introduced to the converter feed 116 with the first and second PGM collector alloys 108, 114 to the pot 120. Preferably, the oxygen-containing gas injection is continued until the converter alloy pool 122 comprises 10 wt % iron or less, more preferably 5 wt % iron or less, by weight of the converter alloy pool.

Further still in another aspect, in reference to FIGS. 2A, 2B, and 2C, embodiments of the present invention provide a TBRC 118 comprising an inclinable pot 120; a burner assembly 117 for heating the pot 120; fluid inlet and outlet connections 147a, 147b to circulate cooling fluid through a jacket 146; a refractory lining 123 in the pot 120 for holding an alloy pool 122 (FIG. 1A); a motor 119 to rotate the pot 120; and a lance 126 for injecting oxygen into the alloy pool 122. Preferably, the TBRC 118 further comprises a plurality of temperature transmitters 144 operably connected to a plurality of temperature sensors 140 positioned in radially spaced relationship in the refractory lining 123 adjacent an interior wall 142 of the pot 120. Preferably, the TBRC 118 further comprises a feed channel 158 to supply particles to a flame 156 from a burner 155 of the burner assembly 117. In any embodiment, the TBRC 118 may further comprise a fume hood 121 and/or a water-cooled heat shield 121A.

EMBODIMENTS LISTING

Accordingly, the present invention provides the following nonlimiting embodiments:

1. A process for converting platinum group metal (PGM) collector alloy, comprising the steps of:
   (a) introducing a converter feed into a pot of a converter holding a molten alloy pool, wherein the converter feed comprises:
   (i) 100 parts by weight of a collector alloy comprising no less than 0.5 wt % PGM, no less than 40 wt % iron, and no less than 0.5 wt % nickel, based on the total weight of the collector alloy; and
   (ii) if an added flux material comprises more than 10 weight percent silica and more than 10 weight percent of calcium oxide, magnesium oxide, or a combination of calcium oxide and magnesium oxide, by weight of the added flux material, no more than 20 parts by weight of the added flux material;

(b) injecting oxygen-containing gas into the alloy pool to convert iron and one or more other oxidizable elements from the collector alloy to the corresponding oxides and enrich PGM in the alloy pool;

(c) allowing a slag comprising the iron oxide to collect in a low-density layer above the alloy pool;

(d) tapping the low-density layer to recover the slag from the converter; and (e) tapping the alloy pool to recover the PGM-enriched alloy.

2. The process of embodiment 1, further comprising:
lining the pot with a refractory material; and
supplying a refractory protectant to the pot holding the alloy pool at a rate up to 20 parts by weight refractory protectant per hundred parts by weight of the collector alloy in the converter feed, preferably not more than 18 parts by weight per 100 parts by weight of the collector alloy, and more preferably at a rate between 5 and 15 parts by weight refractory protectant per 100 parts by weight of the collector alloy.

3. The process of embodiment 2, wherein the refractory protectant is supplied to the pot (i) after initially melting the alloy pool and prior to commencing step (b), (ii) during one or both of steps (a) and (b), and/or (iii) after stopping one or both of steps (a) and (b) to tap the low-density layer in step (d), prior to resuming said one or both of steps (a) and (b).

4. The process of embodiment 2 or embodiment 3, wherein the refractory protectant is supplied to the pot together with the collector alloy introduced in step (a).

5. The process of embodiment 2 or embodiment 3, wherein the refractory protectant is supplied to the pot separately from the collector alloy introduced in step (a), preferably wherein the supply of refractory protectant to the pot is periodic.

6. The process of any of embodiments 2 to 5, wherein the refractory protectant comprises a component in common with the refractory material, preferably wherein the component in common comprises alumina.

7. The process of any of embodiments 2 to 6, wherein the converter feed comprises less than 20 parts by weight of any added flux material, regardless of content of silica, calcium oxide, and/or magnesium oxide, per 100 parts by weight collector alloy.

8. The process of any of embodiments 2 to 7, further comprising injecting the oxygen-containing gas into the alloy pool in step (b) through a lance extended into the alloy pool, wherein the lance comprises a consumable refractory material and is advanced into the pool as a tip of the lance is consumed, wherein the consumable refractory material comprises a component in common with the lining, preferably wherein the component in common comprises alumina.

9. The process of any of embodiments 2 to 8, wherein the refractory material of the lining comprises a ramming refractory comprising alumina, preferably wherein the ramming refractory comprises at least 90 wt % alumina.

10. The process of any of embodiments 2 to 9, further comprising:
sensing temperature in the refractory lining with radially spaced sensors mounted in the refractory lining;
communicating temperature sensing information from the sensors to one or more transmitters; and
transmitting signals containing the temperature sensing information from the one or more transmitters to a receiver;
preferably wherein the sensors are mounted adjacent a metal wall of the pot and/or the one or more transmitters are mounted externally on the pot and wirelessly transmit the signals to the receiver.

11. The process of any of embodiments 2 to 10, further comprising jacketing the pot and circulating a coolant, preferably water, through the jacket during step (b).

12. The process of any of embodiments 2 to 11, wherein the oxygen-containing gas is injected into the converter alloy pool at a sufficient rate to maintain the alloy pool in a molten state at a temperature no higher than 1800° C., preferably at a temperature in a range from about 1250° C. to 1700° C., more preferably 1450° C. to 1700° C.

13. The process of any preceding embodiment, further comprising, prior to step (a), the step of (I) partially pre-oxidizing a portion of the collector alloy from a raw state, preferably wherein the partial pre-oxidation in step (I) comprises from 10 to 90 percent conversion of iron, more preferably from 25 to 75 percent iron conversion, and even more preferably from 30 to 60 percent iron conversion, based on the iron in the raw collector alloy portion prior to step (I).

14. The process of embodiment 13, wherein the pre-oxidizing in step (I) comprises (I.A) passing particles of the raw collector alloy through an oxygen-rich flame, preferably wherein the flame exhibits a flame temperature of not less than 2000° C., more preferably 2000° C. to 3500° C., and especially 2000° C. to 2800° C.

15. The process of embodiment 14, wherein the oxygen rich flame is produced by a burner for heating the pot, and further comprising (I.B) depositing at least partially melted and/or pre-oxidized collector alloy particles from the flame into the pot.

16. The process of embodiment 14 or embodiment 15, further comprising (I.C) cooling and solidifying the particles to form a coating of the pre-oxidized collector alloy on an interior surface of a refractory lining of the pot, wherein step (II) comprises melting the coating.

17. The process of any of embodiments 13 to 16, further comprising, prior to step (a), the steps of:
(II) melting the partially pre-oxidized collector alloy in the pot to form a sufficient volume of the alloy pool for the injection of the oxygen-containing gas in step (b); and
(III) then commencing the converter feed introduction into the pot in step (a) and the oxygen-containing gas injection into the alloy pool in step (b).

18. The process of embodiment 17, wherein the pre-oxidizing in step (I) comprises operating the converter through a cycle of steps (II), (III), (a), (b), (c), (d), and (e) to prepare a partially oxidized starter alloy, wherein the starter alloy preparation cycle comprises:
melting a previously prepared charge of the partially oxidized starter alloy in the emptied pot to form the alloy pool;
periodically or continuously supplying the converter feed to the alloy pool in step (a) concurrently with the injection of the oxygen-containing gas in step (b);
continuing the injection of the oxygen-containing gas to partially oxidize the alloy pool, preferably wherein from 10 to 90 percent, more preferably from 25 to 75 percent, of iron in the converter feed is oxidized, based on the weight of iron in the converter feed supplied to the converter alloy pool;
tapping the slag from the converter pot, preferably a plurality of times;
then recovering and solidifying the partially oxidized alloy pool; and
preferably dividing the solidified, partially oxidized collector alloy from the starter alloy preparation cycle into a plurality of starter alloy charges for a like plurality of converter operating cycles and/or starter alloy preparation cycles.

19. The process of embodiment 13, wherein the pre-oxidizing in step (I) comprises contacting particles of the collector alloy with an oxygen-containing gas at a temperature of at least 800° C., for example between 800° C. and 950° C., preferably in a rotary kiln or fluidized bed roaster.

20. The process of any preceding embodiment, further comprising the steps of:
(A.1) separating the slag recovered in step (d) into a plurality of portions;
(A.2) recycling a first one of the recovered slag portions from step (A.1) to the converter feed introduced to the pot in step (a), wherein the converter feed comprises the recycled slag in an amount of from about 5 to 100 parts by weight per 100 parts by weight of the collector alloy, preferably wherein the converter feed comprises the recycled slag in an amount of from 10 to 50 parts by weight per 100 parts by weight of the collector alloy.

21. The process of embodiment 20, further comprising (A.3) combining the collector alloy and the recycle slag for concurrent introduction in the converter feed in step (a), preferably from a single feed unit.

22. The process of embodiment 20 or embodiment 21, wherein the recycled slag in step (A.2) comprises a high-grade portion of the recovered slag from step (d) having a higher PGM content than an average overall PGM content of the recovered slag from step (d) and/or a nickel content greater than about 2 percent by weight of the recycled slag.

23. The process of any of embodiments 18 to 22, further comprising the steps of:
(B.1) cooling, solidifying, and comminuting the recovered slag from step (d);
(B.2) magnetically separating the comminuted slag into a magnetically susceptible fraction and a non-magnetically susceptible fraction;
(B.3) recycling the magnetically susceptible fraction to the converter feed in step (A.2); and
(B.4) optionally recycling a portion of the non-magnetically susceptible fraction to the converter feed in step (A.2).

24. The process of any of embodiments 20 to 23, further comprising the steps of:
(C.1) prior to steps (a) to (e), beginning a converter operation cycle by melting a partially pre-oxidized collector alloy in the pot to form the alloy pool;
(C.2) then, prior to step (e), repeating a sequence of steps (a), (b), (c), and (d) a plurality of times, wherein step (d) in each sequence follows steps (b) and (c);
(C.3) recycling the slag recovered from a final tapping of the low-density layer in step (d) in a last one of the sequences of step (C.2) to the converter feed in step (A.2) regardless of magnetic susceptibility, and/or recycling all or part of the non-magnetically susceptible fraction separated in step (B.2) from the final tapping in step (d) to the converter feed in step (A.2); and
(C.4) after the final tapping of the low-density layer in step (d) in the last one of the sequences of step (C.2), tapping the alloy pool in step (e).

25. The process of embodiment 24, further comprising the steps of:
(D.1) for the tapping(s) of the low-density layer preceding the final tapping in step (C.2), allowing alloy entrained in the low-density layer to substantially settle into the alloy pool before the tapping of the respective low-density layer(s); and
(D.2) for the final tapping in step (C.2), quickly commencing the tapping to avoid freezing of the alloy pool, optionally resulting in entrainment of alloy in the low-density layer for the final tapping in step (C.2).

26. The process of any preceding embodiment, further comprising the steps of:
(1) prior to steps (a) to (e), beginning a converter operation cycle by melting a partially pre-oxidized collector alloy in the pot to form the alloy pool for step (a);
(2) then, prior to step (e), repeating a sequence of steps (a), (b), (c), and (d) a plurality of times, wherein step (d) in each sequence follows steps (b) and (c);
(3) for the tapping(s) of the low-density layer in step (d) in each sequence of step (2) preceding a final tapping of the low-density layer in step (d) in a final sequence of step (2), allowing alloy entrained in the low-density layer to substantially settle into the alloy pool before the tapping of the respective low-density layer(s), preferably for a period of no less than 5 minutes following termination of the oxygen-containing gas injection in the respective step (b) of the respective sequence of step (2);
(4) for the final tapping of the low-density layer in the step (d) of the final sequence of step (2), conducting the final tapping promptly to avoid freezing of the alloy pool and optionally entraining alloy in the low-density layer of the final tapping in step (d) of the final sequence of step (2), preferably by starting the final tapping of the low-density layer in step (d) within a period of no more than 5 minutes following termination of the oxygen-containing gas injection in step (b) of the final sequence of step (2); and
(5) after the final tapping of the low-density layer in step (d) in the last one of the sequences of step (2), tapping the alloy pool in step (e).

27. The process of embodiment 26, further comprising the steps of:
(6) cooling, solidifying, and comminuting the recovered slag from step (d) in each sequence of step (2); and
(7) recycling the slag recovered from the final tapping of the low-density layer in step (d) in the final sequences of step (2) to the converter feed in step (a).

28. The process of any preceding embodiment, further comprising the steps of:
(E.1) smelting a catalyst material in a (preferably non-converting) primary furnace;
(E.2) recovering a primary furnace slag and a first collector alloy from the primary furnace;
(E.3) smelting the primary furnace slag in a (preferably non-converting) secondary furnace;
(E.4) recovering a secondary furnace slag and a second collector alloy from the secondary furnace;
(E.5) supplying the first and second collector alloys to converter feed in step (a); and (E.6) supplying at least a portion of the slag recovered from the converter in step (d) to the secondary furnace for smelting with the primary furnace slag in step (E.3).

29. The process of embodiment 28, wherein the pot of the converter is lined with a refractory material, and further comprising supplying a portion of the primary furnace slag from step (E.2) to the pot as a refractory protectant for steps (a) and (b), preferably at a rate not more than 20 parts by weight of the primary furnace slag per 100 parts by weight of the collector alloy, more preferably 18 parts by weight of the primary furnace slag per 100 parts by weight of the collector alloy, more preferably at a rate between 5 and 15 parts by weight of the primary furnace slag per 100 parts by weight of the collector alloy.

30. The process of any preceding embodiment, wherein the oxygen-containing gas injection in step (b) is continued until the alloy pool comprises no more than about 10 wt % iron, preferably no more than 5 wt % iron, by total weight of the alloy pool.

31. The process of any preceding embodiment, wherein the collector alloy comprises:
from 0.5 to 12 wt % PGM;
no less than 40 wt % iron, preferably 40 to 80 wt % iron;
no less than 0.5 wt % nickel, preferably 1 to 15 wt % nickel;
no more than 3 wt % sulfur, preferably no less than 0.1 wt % sulfur;
preferably no more than 3 wt % copper, more preferably 0.1 to 3 wt % copper; preferably no more than 2 wt % chromium, more preferably 0.1 to 2 wt % chromium; and preferably no more than 20 wt % silicon, more preferably 1 to 20 wt % silicon.

32. The process of any preceding embodiment, wherein the PGM-enriched alloy comprises:
no less than 25 wt % PGM, preferably from 25 to 60 wt % PGM;
no less than 25 wt % nickel, preferably from 25 to 70 wt % nickel; and
preferably no more than 2 wt % silicon, no more than 2 wt % phosphorus, no more than 10 wt % copper, and no more than 2 wt % sulfur.

Low Flux Converter Process Embodiments

A1. A process for converting platinum group metal (PGM) collector alloy, comprising the steps of:
(a) introducing a converter feed into a pot of a converter holding a molten alloy pool, wherein the converter feed comprises:
 (i) 100 parts by weight of a collector alloy comprising no less than 0.5 wt % PGM, no less than 40 wt % iron, and no less than 0.5 wt % nickel, based on the total weight of the collector alloy; and
 (ii) if an added flux material comprises more than 10 weight percent silica and more than 10 weight percent of calcium oxide, magnesium oxide, or a combination of calcium oxide and magnesium oxide, by weight of the added flux material, no more than 20 parts by weight of the added flux material;
(b) injecting oxygen-containing gas into the alloy pool to convert iron from the collector alloy to iron oxide and enrich PGM in the alloy pool;
(c) allowing a slag comprising the iron oxide to collect in a low-density layer above the alloy pool;
(d) tapping the low-density layer to recover the slag from the converter; and
(e) tapping the alloy pool to recover the PGM-enriched alloy.

A2. The process of embodiment A1, further comprising:
lining the pot with a refractory material; and
supplying a refractory protectant to the pot holding the alloy pool at a rate up to 20 parts by weight refractory protectant per hundred parts by weight of the collector alloy in the converter feed, preferably not more than 18 parts by weight per 100 parts by weight of the collector alloy, and more preferably at a rate between 5 and 15 parts by weight refractory protectant per 100 parts by weight of the collector alloy.

A3. The process of embodiment A2, wherein the refractory protectant is supplied to the pot (i) after initially melting the alloy pool and prior to commencing step (b), (ii) during one or both of steps (a) and (b), and/or (iii) after stopping one or both of steps (a) and (b) to tap the low-density layer in step (d), prior to resuming said one or both of steps (a) and (b).

A4. The process of embodiment A3, wherein the refractory protectant is supplied to the pot together with the collector alloy introduced in step (a).

A5. The process of embodiment A3, wherein the refractory protectant is supplied to the pot separately from the collector alloy introduced in step (a), preferably wherein the supply of refractory protectant to the pot is periodic.

A6. The process of any of embodiments A2 to A5, wherein the refractory protectant comprises a component in common with the refractory material, preferably wherein the component in common comprises alumina.

A7. The process of embodiment A6, further comprising injecting the oxygen-containing gas into the alloy pool in step (b) through a lance extended into the alloy pool, wherein the lance comprises a consumable refractory material and is advanced into the pool as a tip of the lance is consumed, wherein the consumable refractory material comprises a component in common with the lining, preferably wherein the component in common comprises alumina.

A8. The process of any of embodiments A2 to A7, wherein the refractory material of the lining comprises a ramming refractory comprising alumina, preferably wherein the ramming refractory comprises at least 90 wt % alumina.

A9. The process of any of embodiments A2 to A8, further comprising:
sensing temperature in the refractory lining with radially spaced sensors mounted in the refractory lining;
communicating temperature sensing information from the sensors to one or more transmitters; and
transmitting signals containing the temperature sensing information from the one or more transmitters to a receiver;
preferably wherein the sensors are mounted adjacent a metal wall of the pot and/or the one or more transmitters are mounted externally on the pot and wirelessly transmit the signals to the receiver.

A10. The process of any of embodiments A2 to A9, further comprising jacketing the pot and circulating a coolant, preferably water and/or an aqueous heat transfer medium, through the jacket during step (b).

A11. The process of any of embodiments A2 to A10, wherein the oxygen-containing gas is injected into the converter alloy pool at a sufficient rate to maintain the alloy pool in a molten state at a temperature no higher than 1800° C., preferably at a temperature in a range from about 1250° C. to 1700° C., more preferably 1450° C. to 1700° C.

A12. The process of any of embodiments A1 to A11, wherein the oxygen-containing gas injection in step (b) is continued until the alloy pool comprises no more than about 10 wt % iron, preferably no more than 5 wt % iron, based on the total weight of the alloy pool.

A13. The process of any of embodiments A1 to A12, wherein the collector alloy comprises:
from 0.5 to 12 wt % PGM;
no less than 40 wt % iron, preferably 40 to 80 wt % iron;
no less than 0.5 wt % nickel, preferably 1 to 15 wt % nickel;
no more than 3 wt % sulfur, preferably no less than 0.1 wt % sulfur;
preferably no more than 3 wt % copper, more preferably 0.1 to 3 wt % copper; and preferably no more than 20 wt % silicon, more preferably 1 to 20 wt % silicon.

A14. The process of embodiment A13, wherein the PGM-enriched alloy comprises:
no less than 25 wt % PGM, preferably from 25 to 60 wt % PGM;
no less than 25 wt % nickel, preferably from 25 to 70 wt % nickel; and
preferably no more than 2 wt % silicon, no more than 2 wt % phosphorus, no more than 10 wt % copper, and no more than 2 wt % sulfur.

A15. The process of any of embodiments A1 to A14, further comprising partially pre-oxidizing at least a portion of the collector alloy from a raw state, wherein of the 100 parts by weight of the collector alloy introduced in the converter feed to the pot, the converter feed comprises at least 20 parts by weight of the partially pre-oxidized collector alloy, preferably, wherein the partial pre-oxidizing comprises passing particles of the collector alloy through an oxygen-rich flame, preferably wherein the flame exhibits a flame temperature of not less than 2000° C., more preferably 2000° C. to 3500° C., and especially 2000° C. to 2800° C.

A16. The process of any of embodiments A1 to A15, wherein the converter feed further comprises recycled converter slag in an amount of from about 5 to 100 parts by weight per 100 parts by weight of the collector alloy.

A17. The process of any of embodiments A1 to A16, wherein the converter has an operating cycle comprising the steps of:

(I) partially pre-oxidizing at least a portion of the collector alloy;

(II) melting a charge of the partially pre-oxidized collector alloy from step (I) in the pot of the converter to form an alloy pool to start the converter operating cycle;

(III) introducing the converter feed into the pot with the alloy pool, wherein the converter feed comprises: (i) partially pre-oxidized collector alloy product from step (I), (ii) the collector alloy without pre-oxidation, or (iii) a combination thereof, wherein the converter feed may optionally further comprise recycle slag from a previous converter cycle;

(IV) injecting the oxygen-containing gas into the alloy pool for the conversion of the iron to iron oxide and the enrichment of the PGM in the alloy pool;

(V) allowing the slag comprising the iron oxide to collect in the low-density layer above the alloy pool;

(VI) terminating steps (III) and (IV) and tapping the low-density layer to recover the slag from the converter;

(VII) repeating a sequence of steps (III), (IV), (V), and (VI) a plurality of times, including one or more non-final sequences and a final sequence, wherein step (VI) in each sequence follows steps (IV) and (V);

(VIII) prior to the tapping of the low-density layer in step (VI) of each non-final sequence, allowing alloy entrained in the low-density layer to substantially settle into the alloy pool following termination of the oxygen-containing gas injection;

(IX) promptly commencing the tapping of the low-density layer following termination of the oxygen-containing gas injection in step (VI) in the final sequence wherein freezing of the alloy pool is avoided; and (X) at an end of the converter cycle, tapping the alloy pool to recover the PGM-enriched alloy wherein freezing of the alloy pool is avoided.

A18. The process of any of embodiments A1 to A17, further comprising the steps of:

(1) smelting a catalyst material in a (preferably non-converting) primary furnace;

(2) recovering a primary furnace slag and a first collector alloy from the primary furnace;

(3) smelting the primary furnace slag in a (preferably non-converting) secondary furnace, preferably with the addition of metallurgical coke;

(4) recovering a secondary furnace slag and a second collector alloy from the secondary furnace;

(5) wherein the converter feed comprises the first and second collector alloys; and (6) supplying at least a portion of the slag recovered from the converter in step (d) to the secondary furnace for smelting with the primary furnace slag in step (3).

A19. The process of any of embodiments A1 to A18, further comprising:

(A) lining the pot with a refractory;

(B) holding the molten alloy pool in the refractory-lined pot;

(C) jacketing the pot; and (D) circulating a coolant through the jacket.

A20. The process of any of embodiments A1 to A19, wherein the converter comprises a rotary converter, wherein the rotary converter comprises:

wherein the pot comprises an inclined pot mounted for rotation about a longitudinal axis;

a refractory lining in the pot for holding a molten alloy pool;

an opening in a top of the pot to introduce a converter feed into the pot with the alloy pool;

a lance for injecting oxygen-containing gas into the alloy pool;

a heat transfer jacket for the pot;

a coolant system to circulate a heat transfer medium through the jacket; and a tap to recovery the slag and the alloy from the pot.

Partial Pre-Oxidation Converter Process Embodiments

B1. A process for converting platinum group metal (PGM) collector alloy, comprising the steps of:

(I) partially pre-oxidizing at least a portion of a raw collector alloy comprising no less than 0.5 wt % PGM, no less than 40 wt % iron, and no less than 0.5 wt % nickel, based on the total weight of the collector alloy;

(II) introducing a converter feed into a pot of a converter, wherein the converter feed comprises:

(i) at least 20 parts by weight of the partially pre-oxidized collector alloy product of step (I); and (ii) up to 80 parts by weight of the raw collector alloy, wherein the sum of the parts by weight of the raw collector alloy and the partially pre-oxidized collector alloy product of step (I) equals 100;

(III) melting the converter feed to form an alloy pool in the pot;

(IV) injecting oxygen-containing gas into the alloy pool to convert iron to iron oxide and enrich PGM in the alloy pool;

(V) allowing a slag comprising the iron oxide to collect in a low-density layer above the alloy pool;

(VI) tapping the low-density layer to recover the slag from the converter; and (VII) tapping the alloy pool to recover the PGM-enriched alloy.

B2. The process of embodiment B1, wherein the partial pre-oxidation in step (I) comprises from 10 to 90 percent conversion of iron, more preferably from 25 to 75 percent iron conversion, and even more preferably from 30 to 60 percent iron conversion, based on the iron in the raw collector alloy prior to step (I).

B3. The process of embodiment B1 or embodiment B2, wherein the pre-oxidizing in step (I) comprises (I.A) passing particles of the raw collector alloy through an oxygen-rich flame, preferably wherein the flame exhibits a flame temperature of not less than 2000° C., more preferably 2000° C. to 3500° C., and especially 2000° C. to 2800° C.

B4. The process of embodiment B3, wherein the oxygen rich flame is produced by a burner for heating the pot, and further comprising (I.B) depositing at least partially melted pre-oxidized collector alloy particles from the flame into the pot.

B5. The process of embodiment B4, further comprising the steps of:

(I.C) cooling and solidifying the particles to form a coating of the pre-oxidized collector alloy on an interior surface of a refractory lining of the pot;

wherein step (III) comprises melting the coating in the pot to form a sufficient volume of the alloy pool for the injection of the oxygen-containing gas in step (IV); and wherein step (II) comprises introducing the converter feed into the alloy pool.

B6. The process of any of embodiments B1 to B5, further comprising:

wherein step (III) comprises melting the partially pre-oxidized collector alloy in the pot to form a sufficient volume of the alloy pool for the injection of the oxygen-containing gas in step (IV); and wherein step (II) comprises introducing the converter feed into the alloy pool.

B7. The process of embodiment B6, wherein the pre-oxidizing in step (I) comprises operating the converter through a cycle of steps (III), (II), (IV), (V), (VI), and (VII) to prepare a partially oxidized starter alloy, wherein the starter alloy preparation cycle comprises:

melting a previously prepared charge of the partially oxidized starter alloy in the emptied pot to form the alloy pool;

periodically or continuously supplying the converter feed to the alloy pool in step (II) concurrently with the injection of the oxygen-containing gas in step (IV);

continuing the injection of the oxygen-containing gas to partially oxidize the alloy pool, preferably wherein from 10 to 90 percent, more preferably from 25 to 75 percent, of iron in the converter feed is oxidized, based on the weight of iron in the converter feed supplied to the converter alloy pool;

tapping the slag from the converter pot, preferably a plurality of times;

then recovering and solidifying the partially oxidized alloy pool; and preferably dividing the solidified, partially oxidized collector alloy from the starter alloy preparation cycle into a plurality of starter alloy charges for a like plurality of converter operating cycles and/or starter alloy preparation cycles.

B8. The process of any of embodiments B1 to B7, wherein the pre-oxidizing in step (I) comprises contacting particles of the raw collector alloy with an oxygen-containing gas at a temperature above 800° C., preferably between 800° C. and 950° C., preferably in a rotary kiln or fluidized bed roaster.

B9. The process of any of embodiments B1 to B8, wherein the oxygen-containing gas injection in step (IV) is continued until the alloy pool comprises no more than about 10 wt % iron, preferably no more than 5 wt % iron, based on the total weight of the alloy pool.

B10. The process of any of embodiments B1 to B9, wherein the raw collector alloy comprises:

from 0.5 to 12 wt % PGM;

no less than 40 wt % iron, preferably 40 to 80 wt % iron;

no less than 0.5 wt % nickel, preferably 1 to 15 wt % nickel;

no more than 3 wt % sulfur, preferably no less than 0.1 wt % sulfur;

preferably no more than 3 wt % copper, more preferably 0.1 to 3 wt % copper; and preferably no more than 20 wt % silicon, more preferably 1 to 20 wt % silicon.

B11. The process of embodiment B10, wherein the PGM-enriched alloy comprises:

no less than 25 wt % PGM, preferably from 25 to 60 wt % PGM;

no less than 25 wt % nickel, preferably from 25 to 70 wt % nickel; and preferably no more than 2 wt % silicon, no more than 2 wt % phosphorus, no more than 10 wt % copper, and no more than 2 wt % sulfur.

B12. The process of any of embodiments B1 to B11, wherein the converter feed comprises:

(i) 100 parts by weight total of the raw collector alloy and the partially pre-oxidized collector alloy; and (ii) no more than 20 parts by weight of an added flux material comprising more than 10 weight percent silica and more than 10 weight percent of calcium oxide, magnesium oxide, or a combination of calcium oxide and magnesium oxide, by weight of the added flux material. B13. The process of embodiment B12, further comprising:

lining the pot with a refractory material; and supplying a refractory protectant to the pot holding the alloy pool at a rate up to 20 parts by weight refractory protectant per hundred parts by weight of the raw collector alloy and partially pre-oxidized collector alloy in the converter feed, preferably not more than 18 parts by weight per 100 parts by weight of the raw collector alloy and partially pre-oxidized collector alloy, and more preferably at a rate between 5 and 15 parts by weight refractory protectant per 100 parts by weight of the raw collector alloy and partially pre-oxidized collector alloy.

B14. The process of embodiment B13, wherein the refractory protectant comprises a component in common with the refractory material, preferably wherein the component in common comprises alumina.

B15. The process of any of embodiments B1 to B15, wherein the converter feed further comprises recycled converter slag in an amount of from about 5 to 100 parts by weight per 100 parts by weight total of the raw collector alloy and the partially pre-oxidized collector alloy product of step (I) in the converter feed.

B16. The process of any of embodiments B1 to B15, wherein the converter has an operating cycle comprising the steps of:

(1) melting a charge of the partially pre-oxidized collector alloy from step (I) in the pot of the converter to form the alloy pool to start the converter operating cycle;

(2) the introduction of the converter feed into the pot with the alloy pool in step (II), wherein the converter feed may optionally further comprise recycle slag from a previous converter cycle;

(3) the injecting of the oxygen-containing gas into the alloy pool for the conversion of the iron to iron oxide and the enrichment of the PGM in the alloy pool in step (IV);

(4) the allowing of the slag comprising the iron oxide to collect in the low-density layer above the alloy pool in step (V);

(5) terminating steps (2) and (3) and tapping the low-density layer to recover the slag from the converter;

(6) repeating a sequence of steps (2), (3), (4), and (5) a plurality of times, including one or more non-final sequences and a final sequence, wherein step (5) in each sequence follows steps (3) and (4);

(7) prior to the tapping of the low-density layer in step (6) of each non-final sequence, allowing alloy entrained in the low-density layer to substantially settle into the alloy pool following termination of the oxygen-containing gas injection;

(8) promptly commencing the tapping of the low-density layer following termination of the oxygen-containing gas injection in step (6) in the final sequence wherein freezing of the alloy pool is avoided and wherein alloy is optionally entrained in the low-density layer; and (9) at an end of the converter cycle, tapping the alloy pool to recover the PGM-enriched alloy wherein freezing of the alloy pool is avoided.

B17. The process of any of embodiments B1 to B16, further comprising the steps of:

(1) smelting a catalyst material in a (preferably non-converting) primary furnace;

(2) recovering a primary furnace slag and a first collector alloy from the primary furnace;

(3) smelting the primary furnace slag in a (preferably non-converting) secondary furnace, preferably with the addition of metallurgical coke;

(4) recovering a secondary furnace slag and a second collector alloy from the secondary furnace;

(5) wherein the first and/or second collector alloys are partially pre-oxidized in step (I), and wherein the converter feed in step (II) comprises the first and/or second collector alloys and/or the partially pre-oxidized collector alloy from step (I); and (6) supplying at least a portion of the slag recovered from the converter in step (d) to the secondary furnace for smelting with the primary furnace slag in step (3).

B18. The process of any of embodiments B1 to B17, further comprising:

(A) lining the pot with a refractory;

(B) holding the molten alloy pool in the refractory-lined pot;

(C) jacketing the pot; and (D) circulating a coolant through the jacket.

B19. The process of any of embodiments B1 to B18, wherein the converter comprises a rotary converter, wherein the rotary converter comprises:

wherein the pot comprises an inclined pot mounted for rotation about a longitudinal axis;

a refractory lining in the pot for holding a molten alloy pool;

an opening in a top of the pot to introduce a converter feed into the pot with the alloy pool;

a lance for injecting oxygen-containing gas into the alloy pool;

a heat transfer jacket for the pot;

a coolant system to circulate a heat transfer medium through the jacket; and a tap to recovery the slag and the alloy from the pot.

Converter Process with Slag Recycle

C1. A process for converting platinum group metal (PGM) collector alloy, comprising a cycle of the steps of:

(a) introducing a converter feed into a pot of a converter holding a molten alloy pool, wherein the converter feed comprises:

(i) 100 parts by weight of a collector alloy comprising no less than 0.5 wt % PGM, no less than 40 wt % iron, and no less than 0.5 wt % nickel, based on the total weight of the collector alloy; and (ii) recycled converter slag in an amount of from about 5 to 100 parts by weight per 100 parts by weight of the collector alloy;

(b) injecting oxygen-containing gas into the alloy pool to convert iron from the collector alloy to iron oxide and enrich PGM in the alloy pool;

(c) allowing a slag comprising the iron oxide to collect in a low-density layer above the alloy pool;

(d) tapping the low-density layer to recover the slag from the converter;

(e) separating the slag recovered in step (d) into a slag portion for recycle to converter feed in step (a) and a slag portion for production; and (f) tapping the alloy pool to recover the PGM-enriched alloy.

C2. The process of embodiment C1, wherein the recycle slag portion from step (e) of one cycle is supplied as the recycled converter slag in step (a) in a subsequent cycle.

C3. The process of embodiment C1 or embodiment C2, wherein the converter feed comprises the recycled slag in an amount of from 10 to 50 parts by weight per 100 parts by weight of the collector alloy.

C4. The process of any of embodiments C1 to C3, further comprising combining the collector alloy and the recycle slag for concurrent introduction in the converter feed in step (a), preferably from a single feed unit.

C5. The process of any of embodiments C1 to C4, wherein the recycled slag in step (a) and/or the recycle slag portion in step (e) comprise high-grade slag having a higher PGM content than an average overall PGM content of the recovered slag from step (d).

C6. The process of embodiment C5, further comprising:

cooling, solidifying, and comminuting the recovered slag from step (d);

wherein the separation in step (e) comprises magnetically separating the comminuted slag into a magnetically susceptible fraction and a non-magnetically susceptible fraction;

wherein the recycle slag portion comprises the magnetically susceptible fraction; and wherein the recycle slag portion optionally comprises a portion of the non-magnetically susceptible fraction.

C7. The process of embodiment C6, further comprising the steps of:

(C.1) prior to steps (a) to (e), beginning a converter operation cycle by melting a partially pre-oxidized collector alloy in the pot to form the alloy pool;

(C.2) then, prior to step (e), repeating a sequence of steps (a), (b), (c), and (d) a plurality of times, wherein step (d) in each sequence follows steps (b) and (c);

wherein recycle slag portion from step (e) comprises the slag recovered from a final tapping of the low-density layer in step (d) in a last one of the sequences of step (C.2) regardless of magnetic susceptibility; and (C.3) after the final tapping of the low-density layer in step (d) in the last one of the sequences of step (C.2), tapping the alloy pool in step (e).

C8. The process of embodiment C6, further comprising the steps of:

(C.1) prior to steps (a) to (e), beginning a converter operation cycle by melting a partially pre-oxidized collector alloy in the pot to form the alloy pool;

(C.2) then, prior to step (e), repeating a sequence of steps (a), (b), (c), and (d) a plurality of times, wherein step (d) in each sequence follows steps (b) and (c);

wherein recycle slag portion from step (e) comprises all or part of the non-magnetically susceptible fraction of the slag recovered from a final tapping of the low-density layer in step (d) in a last one of the sequences of step (C.2); and (C.3) after the final tapping of the low-density layer in step (d) in the last one of the sequences of step (C.2), tapping the alloy pool in step (e).

C9. The process of embodiment C8, further comprising the steps of:

(D.1) for the tapping(s) of the low-density layer preceding the final tapping in step (C.2), allowing alloy entrained in the low-density layer to substantially settle into the alloy pool before the tapping of the respective low-density layer(s); and (D.2) commencing the final tapping in step (C.2) within 5 minutes of stopping oxygen-containing gas injection.

C10. The process of any of embodiments C5 to C9, wherein the high grade slag comprises more than 1000 ppm PGM and the production slag portion comprises less than 1000 ppm PGM.

C11. The process of any of embodiments C1 to C10, wherein the oxygen-containing gas injection in step (b) is continued until the alloy pool comprises no more than about 10 wt % iron, preferably no more than 5 wt % iron, based on the total weight of the alloy pool.

C12. The process of any of embodiments C1 to C11, wherein the collector alloy comprises:
 from 0.5 to 12 wt % PGM;
 no less than 40 wt % iron, preferably 40 to 80 wt % iron;
 no less than 0.5 wt % nickel, preferably 1 to 15 wt % nickel;
 no more than 3 wt % sulfur, preferably no less than 0.1 wt % sulfur;
 preferably no more than 3 wt % copper, more preferably 0.1 to 3 wt % copper; and preferably no more than 20 wt % silicon, more preferably 1 to 20 wt % silicon.

C13. The process of embodiment C12, wherein the PGM-enriched alloy comprises:
 no less than 25 wt % PGM, preferably from 25 to 60 wt % PGM;
 no less than 25 wt % nickel, preferably from 25 to 70 wt % nickel; and
 preferably no more than 2 wt % silicon, no more than 2 wt % phosphorus, no more than 10 wt % copper, and no more than 2 wt % sulfur.

C14. The process of any of embodiments C1 to C13, wherein the converter feed comprises:
 (i) 100 parts by weight of the collector alloy; and
 (ii) no more than 20 parts by weight of an added flux material comprising more than 10 weight percent silica and more than 10 weight percent of calcium oxide, magnesium oxide, or a combination of calcium oxide and magnesium oxide, by weight of the added flux material.

C15. The process of any of embodiments C1 to C14, further comprising:
 lining the pot with a refractory material; and
 supplying a refractory protectant to the pot holding the alloy pool at a rate up to 20 parts by weight refractory protectant per hundred parts by weight of the collector alloy in the converter feed, preferably not more than 18 parts by weight per 100 parts by weight of the collector alloy, and more preferably at a rate between 5 and 15 parts by weight refractory protectant per 100 parts by weight of the collector alloy, preferably wherein the refractory protectant comprises a component in common with the refractory material, preferably wherein the component in common comprises alumina.

C16. The process of any of embodiments C1 to C15, further comprising partially pre-oxidizing at least a portion of the collector alloy from a raw state, wherein of the 100 parts by weight of the collector alloy introduced in the converter feed to the pot, the converter feed comprises at least 20 parts by weight of the partially pre-oxidized collector alloy, preferably, wherein the partial pre-oxidizing comprises passing particles of the raw collector alloy through an oxygen-rich flame, preferably wherein the flame exhibits a flame temperature of not less than 2000° C., more preferably 2000° C. to 3500° C., and especially 2000° C. to 2800° C.

C17. The process of any of embodiments C1 to C16, wherein the converter has an operating cycle comprising the steps of:

(1) melting a charge of a partially pre-oxidized collector alloy in the pot of the converter to form the alloy pool to start the converter operating cycle;
 (2) the introduction of the converter feed into the pot with the alloy pool in step (a), wherein the converter feed may optionally further comprise recycle slag from a previous converter cycle;
 (3) the injecting of the oxygen-containing gas into the alloy pool for the conversion of the iron to iron oxide and the enrichment of the PGM in the alloy pool in step (b);
 (4) the allowing of the slag comprising the iron oxide to collect in the low-density layer above the alloy pool in step (c);
 (5) terminating steps (2) and (3) and tapping the low-density layer to recover the slag from the converter;
 (6) repeating a sequence of steps (2), (3), (4), and (5) a plurality of times, including one or more non-final sequences and a final sequence, wherein step (5) in each sequence follows steps (2) and (3);
 (7) prior to the tapping of the low-density layer in step (6) of each non-final sequence, allowing alloy entrained in the low-density layer to substantially settle into the alloy pool following termination of the oxygen-containing gas injection;
 (8) promptly commencing the tapping of the low-density layer following termination of the oxygen-containing gas injection in step (6) in the final sequence wherein freezing of the alloy pool is avoided and wherein alloy is optionally entrained in the low-density layer; and
 (9) at an end of the converter cycle, tapping the alloy pool to recover the PGM-enriched alloy wherein freezing of the alloy pool is avoided.

C18. The process of any of embodiments C1 to C17, further comprising the steps of:
 (1) smelting a catalyst material in a (preferably non-converting) primary furnace;
 (2) recovering a primary furnace slag and a first collector alloy from the primary furnace;
 (3) smelting the primary furnace slag in a (preferably non-converting) secondary furnace, preferably with the addition of metallurgical coke;
 (4) recovering a secondary furnace slag and a second collector alloy from the secondary furnace;
 (5) wherein the first and/or second collector alloys are partially pre-oxidized in step (I), and wherein the converter feed in step (II) comprises the first and/or second collector alloys and/or the partially pre-oxidized collector alloy from step (I); and
 (6) supplying at least a portion of the slag recovered from the converter in step (d) to the secondary furnace for smelting with the primary furnace slag in step (3).

C19. The process of any of embodiments C1 to C18, further comprising:
 (A) lining the pot with a refractory;
 (B) holding the molten alloy pool in the refractory-lined pot;
 (C) jacketing the pot; and
 (D) circulating a coolant through the jacket.

C20 The process of any of embodiments C1 to C19, wherein the converter comprises a rotary converter, wherein the rotary converter comprises:
 wherein the pot comprises an inclined pot mounted for rotation about a longitudinal axis;
 a refractory lining in the pot for holding a molten alloy pool;
 an opening in a top of the pot to introduce a converter feed into the pot with the alloy pool;

a lance for injecting oxygen-containing gas into the alloy pool;

a heat transfer jacket for the pot;

a coolant system to circulate a heat transfer medium through the jacket; and a tap to recovery the slag and the alloy from the pot.

Converter Process with Staged Slag Tapping

D1. A process for converting platinum group metal (PGM) collector alloy, comprising the steps of:

(I) partially pre-oxidizing at least a portion of a raw collector alloy comprising no less than 0.5 wt % PGM, no less than 40 wt % iron, and no less than 0.5 wt % nickel, based on the total weight of the raw collector alloy;

(II) melting a charge of the partially pre-oxidized collector alloy from step (I) in a pot of a converter to form an alloy pool to start a converter cycle;

(III) introducing a converter feed into the pot with the alloy pool, wherein the converter feed comprises: (i) partially pre-oxidized collector alloy product from step (I), (ii) the raw collector alloy, or (iii) a combination thereof, wherein the converter feed may optionally further comprise recycle slag from a previous converter cycle;

(IV) injecting oxygen-containing gas into the alloy pool to convert iron to iron oxide and enrich PGM in the alloy pool;

(V) allowing a slag comprising the iron oxide to collect in a low-density layer above the alloy pool;

(VI) terminating steps (III) and (IV) and tapping the low-density layer to recover the slag from the converter;

(VII) repeating a sequence of steps (III), (IV), (V), and (VI) a plurality of times, including one or more non-final sequences and a final sequence, wherein step (VI) in each sequence follows steps (IV) and (V);

(VIII) prior to the tapping of the low-density layer in step (VI) of each non-final sequence, allowing alloy entrained in the low-density layer to substantially settle into the alloy pool following termination of the oxygen-containing gas injection;

(IX) promptly commencing the tapping of the low-density layer following termination of the oxygen-containing gas injection in step (VI) in the final sequence wherein freezing of the alloy pool is avoided; and (X) at an end of the converter cycle, tapping the alloy pool to recover the PGM-enriched alloy wherein freezing of the alloy pool is avoided.

D2. The process of embodiment D1, wherein an elapsed time between termination of the oxygen-containing gas injection and commencement of the low-density layer tapping in step (VIII) is no less than 5 minutes.

D3. The process of embodiment D1 or embodiment D2, wherein an elapsed time between termination of the oxygen-containing gas injection and commencement of the low-density layer tapping in step (IX) is no more than 5 minutes.

D4. The process of any of embodiments D1 to D3, further comprising entraining alloy in the low-density layer tapped in step (IX).

D5. The process of any of embodiments D1 to D4, further comprising the steps of:

(XI) cooling, solidifying, and comminuting the recovered slag from step (VI); and (XII) separating the recovered slag from step (VI) into a slag portion for recycle to converter feed in step (III) of a subsequent converter cycle, and a slag portion for production.

D6. The process of embodiment D5, wherein the converter feed in step (III) comprises the recycled slag in an amount of from 10 to 50 parts by weight per 100 parts by weight of the collector alloy.

D7. The process of embodiment D5 or embodiment D6, wherein the recycle slag in step (III) and/or the recycle slag portion in step (XII) comprise high-grade slag having a higher PGM content than an average overall PGM content of the recovered slag from step (VI), preferably wherein the high-grade slag comprises more than 1000 ppm PGM and the production slag portion comprises less than 1000 ppm PGM.

D8. The process of any of embodiments D5 to D7, further comprising:

wherein the separation in step (XII) comprises magnetically separating the comminuted slag into a magnetically susceptible fraction and a non-magnetically susceptible fraction;

wherein the recycle slag portion comprises the magnetically susceptible fraction; and wherein the recycle slag portion optionally further comprises a portion of the non-magnetically susceptible fraction.

D9. The process of embodiment D8, wherein the recycle slag portion further comprises the non-magnetically susceptible fraction from the slag recovered from step (IX) in the final sequence.

D10. The process of any of embodiments D5 to D9, wherein the recycle slag portion comprises the slag recovered from step (IX) in the final sequence regardless of magnetic susceptibility.

D11. The process of any of embodiments D1 to D10, wherein the oxygen-containing gas injection in step (IV) is continued until the alloy pool comprises no more than about 10 wt % iron, preferably no more than 5 wt % iron, based on the total weight of the alloy pool.

D12. The process of any of embodiments D1 to D11, wherein the collector alloy comprises:

from 0.5 to 12 wt % PGM;

no less than 40 wt % iron, preferably 40 to 80 wt % iron;

no less than 0.5 wt % nickel, preferably 1 to 15 wt % nickel;

no more than 3 wt % sulfur, preferably no less than 0.1 wt % sulfur;

preferably no more than 3 wt % copper, more preferably 0.1 to 3 wt % copper; and preferably no more than 20 wt % silicon, more preferably 1 to 20 wt % silicon.

D13. The process of embodiment D12, wherein the PGM-enriched alloy comprises:

no less than 25 wt % PGM, preferably from 25 to 60 wt % PGM;

no less than 25 wt % nickel, preferably from 25 to 70 wt % nickel; and preferably no more than 2 wt % silicon, no more than 2 wt % phosphorus, no more than 10 wt % copper, and no more than 2 wt % sulfur.

D14. The process of any of embodiments D1 to D13, wherein the converter feed comprises:

(i) 100 parts by weight total of the raw collector alloy and partially pre-oxidized collector alloy; and (ii) no more than 20 parts by weight of an added flux material comprising more than 10 weight percent silica and more than 10 weight percent of calcium oxide, magnesium oxide, or a combination of calcium oxide and magnesium oxide, by weight of the added flux material.

D15. The process of any of embodiments D1 to D14, further comprising:

lining the pot with a refractory material; and supplying a refractory protectant to the pot holding the alloy pool at a rate up to 20 parts by weight refractory protectant per hundred parts by weight total of the raw collector alloy and partially pre-oxidized collector alloy in the converter feed, preferably not more than 18 parts by weight per 100 parts by weight total of the raw collector alloy and partially pre-oxidized collector alloy, and more preferably at a rate between 5 and 15 parts by weight refractory protectant per 100 parts by weight total of the raw collector alloy and partially pre-oxidized collector alloy, preferably wherein the refractory protectant comprises a component in common with the refractory material, preferably wherein the component in common comprises alumina.

D16. The process of any of embodiments D1 to D15, further comprising partially pre-oxidizing at least a portion of the collector alloy from a raw state, wherein of the 100 parts by weight of the collector alloy introduced in the converter feed to the pot, the converter feed comprises at least 20 parts by weight of the partially pre-oxidized collector alloy, preferably, wherein the partial pre-oxidizing comprises passing particles of the raw collector alloy through an oxygen-rich flame, preferably wherein the flame exhibits a flame temperature of not less than 2000° C., more preferably 2000° C. to 3500° C., and especially 2000° C. to 2800° C.

D17. The process of any of embodiments D1 to D16, wherein the converter feed further comprises the recycle slag in an amount of from about 5 to 100 parts by weight per 100 parts by weight total of the raw collector alloy and the partially pre-oxidized collector alloy product of step (I) in the converter feed.

D18. The process of any of embodiments D1 to D17, further comprising the steps of:
 (1) smelting a catalyst material in a (preferably non-converting) primary furnace;
 (2) recovering a primary furnace slag and a first collector alloy from the primary furnace;
 (3) smelting the primary furnace slag in a (preferably non-converting) secondary furnace, preferably with the addition of metallurgical coke;
 (4) recovering a secondary furnace slag and a second collector alloy from the secondary furnace;
 (5) wherein the first and/or second collector alloys are partially pre-oxidized in step (I), and wherein the converter feed in step (II) comprises the first and/or second collector alloys and/or the partially pre-oxidized collector alloy from step (I); and
 (6) supplying at least a portion of the slag recovered from the converter in step (d) to the secondary furnace for smelting with the primary furnace slag in step (3).

D19. The process of any of embodiments D1 to D18, further comprising:
 (A) lining the pot with a refractory;
 (B) holding the molten alloy pool in the refractory-lined pot;
 (C) jacketing the pot; and
 (D) circulating a coolant through the jacket.

D20. The process of any of embodiments D1 to D19, wherein the converter comprises a rotary converter, wherein the rotary converter comprises:
 wherein the pot comprises an inclined pot mounted for rotation about a longitudinal axis;
 a refractory lining in the pot for holding a molten alloy pool;
 an opening in a top of the pot to introduce a converter feed into the pot with the alloy pool;
 a lance for injecting oxygen-containing gas into the alloy pool;
 a heat transfer jacket for the pot;
 a coolant system to circulate a heat transfer medium through the jacket; and
 a tap to recovery the slag and the alloy from the pot.

Integrated Converter Process for PGM Recovery and Enrichment

E1. A process for recovering and enriching PGM, comprising the steps of:
 (1) smelting a catalyst material in a (preferably non-converting) primary furnace;
 (2) recovering a primary furnace slag and a first collector alloy from the primary furnace;
 (3) smelting the primary furnace slag in a (preferably non-converting) secondary furnace;
 (4) recovering a secondary furnace slag and a second collector alloy from the secondary furnace;
 (5) converting the first and second collector alloys in a converter to recover PGM enriched alloy and slag; and
 (6) supplying at least a portion of the slag recovered from the converter in step (5) to the secondary furnace for smelting with the primary furnace slag in step (3).

E2. The process of embodiment E1, wherein a pot of the converter is lined with a refractory material, and further comprising supplying a portion of the primary furnace slag from step (2) to the pot as a refractory protectant.

E3. The process of embodiment E2 wherein the refractory protectant comprises no more than 20 parts by weight of the primary furnace slag per 100 parts by weight of the total first and second collector alloys supplied to the converter, preferably 18 parts by weight of the primary furnace slag per 100 parts by weight of the total first and second collector alloys supplied to the converter, more preferably between 5 and 15 parts by weight of the primary furnace slag per 100 parts by weight of the total first and second collector alloys supplied to the converter.

E4. The process of any of embodiments E1 to E3, wherein the converting in step (5) is continued until an alloy pool in the pot of the converter comprises no more than about 10 wt % iron, preferably no more than 5 wt % iron, based on the total weight of the alloy pool.

E5. The process of embodiment E4, wherein the first and second collector alloys supplied to the converter comprise:
 from 0.5 to 12 wt % PGM;
 no less than 40 wt % iron, preferably 40 to 80 wt % iron;
 no less than 0.5 wt % nickel, preferably 1 to 15 wt % nickel;
 no more than 3 wt % sulfur, preferably no less than 0.1 wt % sulfur;
 preferably no more than 3 wt % copper, more preferably 0.1 to 3 wt % copper; and preferably no more than 20 wt % silicon, more preferably 1 to 20 wt % silicon.

E6. The process of Embodiment E5, wherein the PGM-enriched alloy recovered from step (5) comprises:
 no less than 25 wt % PGM, preferably from 25 to 60 wt % PGM;
 no less than 25 wt % nickel, preferably from 25 to 70 wt % nickel; and
 preferably no more than 2 wt % silicon, no more than 5 wt % phosphorus, no more than 10 wt % copper, and no more than 2 wt % sulfur.

E7. The process of any of embodiments E1 to E6, wherein a feed to the converter comprises:
 (i) 100 parts by weight total of the first and second collector alloys; and
 (ii) no more than 20 parts by weight of an added flux material comprising more than 10 weight percent silica and more than 10 weight percent of calcium oxide, magnesium oxide, or a combination of calcium oxide and magnesium oxide, by weight of the added flux material.

E8. The process of any of embodiments E1 to E7, further comprising:
  lining the pot with a refractory material; and
  supplying a refractory protectant to the pot holding the alloy pool at a rate up to 20 parts by weight refractory protectant per hundred parts by weight of the first and second collector alloys in the converter feed, preferably not more than 18 parts by weight per 100 parts by weight of the first and second collector alloys, and more preferably at a rate between 5 and 15 parts by weight refractory protectant per 100 parts by weight of the first and second collector alloys.

E9. The process of embodiment E8, wherein the refractory protectant comprises a component in common with the refractory material, preferably wherein the component in common comprises alumina.

E10. The process of any of embodiments E1 to E9, further comprising partially pre-oxidizing at least a portion of the first and/or second collector alloys from a raw state, wherein a feed to the converter comprises at least 20 parts by weight of the partially pre-oxidized collector alloy per 100 parts by weight total converter feed, preferably, wherein the partial pre-oxidizing comprises passing particles of the collector alloy through an oxygen-rich flame, preferably wherein the flame exhibits a flame temperature of not less than 2000° C., more preferably 2000° C. to 3500° C., and especially 2000° C. to 2800° C.

E11. The process of any of embodiments E1 to E10, wherein a feed to the converter comprises the first and second collector alloys and further comprises a recycled portion of the converter slag from step (6) in an amount of from about 5 to 100 parts by weight per 100 parts by weight total of the first and second collector alloys.

E12. The process of any of embodiments E1 to E11, wherein the converter has an operating cycle comprising the steps of:
  (I) partially pre-oxidizing at least a portion of the first and/or second collector alloys;
  (II) melting a charge of the partially pre-oxidized collector alloy from step (I) in the pot of the converter to form an alloy pool to start the converter operating cycle;
  (III) introducing a converter feed into the pot with the alloy pool, wherein the converter feed comprises: (i) partially pre-oxidized collector alloy product from step (I), (ii) the first and/or second collector alloys without pre-oxidation, or (iii) a combination thereof, wherein the converter feed may optionally further comprise recycle slag from step (5) of a previous converter cycle;
  (IV) injecting oxygen-containing gas into the alloy pool for the conversion of the iron to iron oxide and the enrichment of the PGM in the alloy pool;
  (V) allowing the slag comprising the iron oxide to collect in the low-density layer above the alloy pool;
  (VI) terminating steps (III) and (IV) and tapping the low-density layer to recover the slag from the converter;
  (VII) repeating a sequence of steps (III), (IV), (V), and (VI) a plurality of times, including one or more non-final sequences and a final sequence, wherein step (VI) in each sequence follows steps (IV) and (V);
  (VIII) prior to the tapping of the low-density layer in step (VI) of each non-final sequence, allowing alloy entrained in the low-density layer to substantially settle into the alloy pool following termination of the oxygen-containing gas injection;
  (IX) promptly commencing the tapping of the low-density layer following termination of the oxygen-containing gas injection in step (VI) in the final sequence wherein freezing of the alloy pool is avoided; and
  (X) at an end of the converter cycle, tapping the alloy pool to recover the PGM-enriched alloy wherein freezing of the alloy pool is avoided.

E13. The process of any of embodiments E1 to E12, further comprising:
  (A) lining a pot of the converter with a refractory;
  (B) holding a molten alloy pool in the refractory-lined pot;
  (C) jacketing the pot; and
  (D) circulating a coolant through the jacket.

E14. The process of any of embodiments E1 to E13, wherein the converter comprises a rotary converter, wherein the rotary converter comprises:
  an inclined pot mounted for rotation about a longitudinal axis;
  a refractory lining in the pot for holding a molten alloy pool;
  an opening in a top of the pot to introduce a converter feed into the pot with the alloy pool;
  a lance for injecting oxygen-containing gas into the alloy pool;
  a heat transfer jacket for the pot;
  a coolant system to circulate a heat transfer medium through the jacket; and
  a tap to recovery the slag and the alloy from the pot.

Jacketed PGM Enrichment Converter

F1. A converting process, comprising:
  (a) lining a pot of a rotary converter with a refractory;
  (b) holding a molten alloy pool in the pot;
  (c) introducing a converter feed into the pot with the alloy pool, wherein the converter feed comprises a collector alloy comprising iron (preferably comprising no less than 0.5 wt % PGM, no less than 40 wt % iron, and no less than 0.5 wt % nickel, based on the total weight of the collector alloy;
  (d) injecting oxygen-containing gas into the alloy pool to convert iron from the collector alloy to iron oxide and enrich PGM in the alloy pool;
  (e) jacketing the pot;
  (f) circulating a coolant through the jacket;
  (g) allowing a slag comprising the iron oxide to collect in a low-density layer above the alloy pool;
  (h) tapping the low-density layer to recover the slag from the converter; and
  (i) tapping the alloy pool to recover the PGM-enriched alloy.

F2. The process of embodiment F1, further comprising monitoring a temperature of the refractory lining.

F3. The process of embodiment F2, further comprising sensing the temperature in the refractory lining with one or more sensors mounted in the refractory lining, communicating temperature sensing information from the one or more sensors to one or more transmitters, and transmitting signals containing the temperature sensing information from the one or more transmitters to a receiver.

F4. The process of embodiment F3 wherein the one or more transmitters are mounted externally on the pot and wirelessly transmit the signals to the receiver.

F5. A rotary converter for PGM enrichment of a collector alloy, comprising:
  an inclined converter pot mounted for rotation about a longitudinal axis;
  a refractory lining in the pot for holding a molten alloy pool;
  an opening in a top of the pot to introduce a converter feed into the pot with the alloy pool;
  a lance for injecting oxygen-containing gas into the alloy pool;

a heat transfer jacket for the pot;
a coolant system to circulate a heat transfer medium through the jacket; and
a tap to recovery slag and alloy from the pot.

F6. The rotary converter of embodiment F5, further comprising a control system to adjust the coolant supply and oxygen injection rate for maintaining a temperature in the alloy pool between 1250° C. and 1700° C., preferably 1450° C. to 1700° C.

F7. The rotary converter of embodiment F5 or embodiment F6, further comprising a shaft and a motor to drive the rotation of the pot.

F8. The rotary converter of embodiment F7, further comprising a rotary coupling to supply and return the heat transfer medium through the shaft to and from the jacket.

F9. The rotary converter of any of embodiments F5 to F8, further comprising radially spaced temperature sensors mounted in the refractory lining in communication with one or more transmitters to transmit signals containing temperature sensing information to a receiver.

F10. The rotary converter of embodiment F9, wherein the temperature sensors are mounted adjacent a metal wall of the pot.

F11. The rotary converter of embodiment F10, wherein the one or more transmitters are mounted externally on the pot and wirelessly transmit the signals to the receiver.

F12. The rotary converter of any of embodiments F5 to F11, further comprising a fume hood adjacent the opening of the pot.

F13. The rotary converter of any of embodiments F5 to F12, further comprising a burner to heat the pot, preferably wherein the burner is a water cooled oxy-fuel burner.

F14. The rotary converter of any of embodiments F5 to F13, wherein the burner comprises a chute to introduce converter feed into a flame of the burner.

F15. The rotary converter of any of embodiments F5 to F14, further comprising a water cooled heat shield adjacent the opening in the pot.

F16. The rotary converter of any of embodiments F5 to F15, wherein the refractory lining comprises an alumina based ramming refractory.

F17. The rotary converter of any of embodiments F5 to F16, further comprising a feed system, preferably comprising a hopper and a vibrating feeder, to supply the converter feed through the opening into the pot.

F18. The rotary converter of embodiment F17, further comprising a charge of the converter feed in the feed system.

F19. The rotary converter of embodiment F18, wherein the converter feed comprises a collector alloy comprising no less than 0.5 wt % PGM, no less than 40 wt % iron, and no less than 0.5 wt % nickel, based on the total weight of the collector alloy.

F20. The rotary converter of embodiment F19, wherein the converter feed further comprises recycle converter slag.

EXAMPLES

In the following examples, process 200 according to FIG. 8 was used. Catalyst material 202 was smelted in electric arc furnace 204 having a nominal capacity of 907 kg/h (1 tph), a transformer rated at 1.2 MVA, with a secondary voltage of 180 V and a secondary current of 2700 A. Slag 205, comprising mainly aluminosilicate, was recovered from the furnace 204, granulated in water in granulator 206, dried in rotary kiln 208, and repackaged in bag-filling station 210. The PGM collector alloy 211 was cast into molds 212, solidified, and crushed in crusher 214 to −4 mesh (−3/16 in.).

The dried slag 210 from the primary furnace 204 was smelted in second, finishing electric arc furnace 218 having a nominal capacity of 907 kg/h (1 tph), a transformer rated at 1.2 MVA, with a secondary voltage of 180 V and a secondary current of 2700 A. Slag 219 recovered from the furnace 218 was granulated in granulator 220 and recycled in step 222 for an appropriate use, e.g., as aggregate. The PGM collector alloy 223 from the secondary furnace 218 was cast into molds 224, solidified, and crushed in crusher 214 to −1.9 cm (3/4 in.).

A charge of partially pre-oxidized PGM collector alloy 184 was prepared from collector alloy 211 and/or 223 as described in the example. The pre-oxidized alloy 184 was placed in the pot 232 of a water-cooled TBRC 227 lined with an alumina-based ramming refractory, and melted with a gas burner 228 to a temperature of at least 1450° C. The pre-oxidized alloy pool was sufficient to inject oxygen below the surface of the alloy pool, generally filling about 10-20% of the available volume of the pot 232. A portion of the aluminosilicate slag 210 from the primary furnace 204 was placed on top of the alloy pool as refractory protectant 233 at the start of each oxygen injection cycle. Unless otherwise stated, the total amount of protectant 233 used for each TBRC operating cycle was 60-80 kg (132-176 lbs), apportioned between oxygen injection cycles, e.g., following the initial alloy pool melt and each non-final slag tapping.

While the pot 232 was rotated, the burner 228 was shut off and oxygen 234 was injected into the alloy pool using lance 229 at a rate to maintain a temperature sufficient to avoid solidification of the alloy pool but at a sufficient rate to maintain the temperature in the alloy pool no higher than 1700° C., e.g., 1450° C. to 1700° C., while circulating cooling water through the TBRC jacket. Unless otherwise noted the oxygen injection rate was 58 Nm$^3$/h (36 SCFM). The PGM collector alloy 211, 223 from the furnaces 204, 218 (966 kg unless otherwise noted) and recycle slag 254, 258 (359 kg unless otherwise noted) that had been placed in hopper 225 was fed into the pot 232 via vibrating feeder 226 at a generally steady rate of 210 kg/h, except when stopped during slag tappings, unless otherwise noted. The pot 232 filled as slag was formed and the alloy pool grown by the feed into the pot 232. When the volume of the pot 232 was filled sufficiently, the pot rotation, oxygen injection, and alloy feed were stopped. After waiting several minutes to allow phase separation and alloy disentrainment from the slag layer, slag 242 was tapped into molds 244 by tipping the pot 232, taking care to avoid tapping any of the alloy phase, erring on the side of leaving some slag on the top of the alloy phase.

The oxygen injection and alloy feed into the remaining alloy pool were then resumed until the pot 232 was again filled, and slag 242 tapped as described above. The cycle was repeated several times until the alloy pool had grown to a desired volume for tapping. The final slag tapping just before tapping the alloy was performed promptly after stopping the oxygen injection and collector alloy feed, taking care that substantially all of the slag 242 was tapped, erring on the side of alloy entrainment in the slag. The PGM-enriched alloy 245 was then tapped into ingot molds 246, cooled, and solidified.

After the slag molds 244 were cooled, the solidified slag 248 was fed through slag crusher 250 and magnetic separator 252. The non-magnetic fractions from the final slag tapping and the earlier tappings were sorted into containers 254 and 256, respectively. The non-magnetic fraction 256 was smelted in the secondary furnace 218 with the slag 210 from the primary furnace. The magnetic fractions 258 from all of the converter slag and the non-magnetic fraction 254 from the final slag tapping were placed in the feed hopper 225 with collector alloy 211 and/or 223 for a subsequent TBRC batch. The same result would have obtained if the entirety of the final slag tapping were placed directly in the hopper 238, bypassing the magnetic separator 252. Assays reported below were determined using a combination of inductively coupled plasma spectroscopy (ICP) and desktop X-ray fluorescence (XRF). Unless otherwise noted, typical assays are reported below.

Example 1: Smelting Catalyst Material in Primary Furnace

In this example, catalyst material from automotive catalytic converters is smelted in the electric arc furnace 204. Iron oxide is added as needed to provide a minimum iron content in the feed of at least 1 wt %, based on the total weight of the feed to the furnace 204. Lime (CaO) is added in an amount of 2.5 wt %. After smelting, 72.5 tonne slag and 2500 kg collector alloy are typically recovered, cooled, and solidified. The collector alloy and slag have the following typical assays set out in Tables 1 and 2.

Example 2: Smelting Slags in Secondary Furnace

In this example, 99.79 tonne (110 t) of the Example 1 slag from the primary furnace 204 and 9979 kg (11 t) of non-magnetic converter slag 256 from Example 5 (Table 13 below) are smelted in the furnace 218. Metallurgical grade coke is added in an amount of 0.5 wt %. After smelting, 104.33 tonne (115 t) slag and 3000 kg collector alloy are recovered, cooled, and solidified. The collector alloy and slag have the typical assays set out in Tables 3 and 4.

Example 3: Pre-Oxidation of Collector Alloy—Starter Alloy

In this example, 150 kg of a starter alloy from a previous starter alloy preparation cycle were loaded into the TBRC and melted after 30 min using the burner 228. The beginning starter alloy has the typical assay shown in Table 5. The collector alloy (1250 kg) from Example 1 (Table 1), recycle slag (200 kg, or [200/(150+1250)]*100=14.2 parts recycle slag per hundred collector alloy), and refractory protectant (100 kg, or [100/(150+1250)]*100=7.1 parts protectant per hundred collector alloy) were supplied to the TBRC. The refractory protectant was the furnace slag from Example 1 (Table 2). The recycle slag has the typical assay as shown in Table 6.

The oxygen injection rate during the converting was 37 Nm³/h 23 SCFM), and the slag was tapped several times, after waiting for several minutes to allow alloy disentrainment. The final slag tapping was done in the same way, which it is noted is different from the usual converter cycle to produce PGM-enriched alloy product where slag contamination of the alloy is minimized. After 6 h of oxygen injection, corresponding to 44% oxidation, the alloy was tapped, solidified, and crushed for use as the starter alloy in subsequent TBRC converting cycles. The product starter alloy has the typical assay as shown in Table 7.

Example 4: Converting with Starter Alloy

In this example, 158 kg of the starter alloy produced from Example 3 (Table 7) were loaded into the TBRC and melted after 30 min using the burner 228. The converter feed was made up of collector alloy (966 kg) from Example 1 (Table 1), and the recycle slag (358 kg, or [358/(158+966)]*100=32 parts recycle slag per hundred collector alloy) used in Example 3 (Table 6). Refractory protectant (60 kg) supplied to the TBRC was the furnace slag from Example 1 (Table 1), or [60/(158+966)]*100=5.3 parts protectant per hundred collector alloy. The oxygen injection rate during the converting was 37 Nm³/h (23 SCFM), and the slag was tapped several times as needed, after waiting for several minutes each time to allow alloy disentrainment. The final slag tapping was started within 5 minutes of stopping oxygen injection without waiting for complete alloy disentrainment. After 10 h of oxygen injection, corresponding to 99% iron conversion, the alloy was tapped and formed into ingots. The PGM-enriched alloy (247.45 kg) has the typical assay as shown in Table 8.

The slag tappings were cooled, solidified, crushed, milled, and magnetically separated. The magnetically susceptible fraction was collected and combined with the non-magnetic fraction of the final slag tapping (354 kg total) for use as recycle slag in a subsequent converting cycle. The non-magnetic fraction of the non-final slag tappings were collected (1963 kg total) for smelting in the secondary furnace similarly to example 2. The recycle slag and smelting slag have the typical assays shown in Tables 9 and 10:

This example shows that PGM collector alloy can be enriched with a high oxygen injection rate without a large amount of added flux materials, using only recycle converter slag from a previous cycle and primary furnace slag as a refractory protectant. This example demonstrates the use of partially pre-oxidized starter alloy to reduce the TBRC cycle operation time and improve PGM enrichment. This example also demonstrates the feasibility of converting PGM collector alloy using a water-cooled, jacketed TBRC.

Example 5: Converting with Flame Pre-Oxidized Collector Alloy

In this example, 590 kg of collector alloy were flame pre-oxidized using the burner 228. The collector alloy was loaded into the hopper for pre-oxidation during a night shift. The two-burner assembly 228 was set at 0.48 MMBtu/h each (0.96 MMBtu/h total) with 20% excess oxygen to produce a flame temperature greater than 2000° C. The collector alloy was fed into the TBRC using an apparatus similar to that shown in FIG. 2C so that the particles passed through the flame and fell into the TBRC, forming a coating on the refractory. The next morning, the pre-oxidized collector alloy was melted after 30 min by increasing the firing rate of the burners to 1.1 MMBtu/h total.

Next, the converter feed was made up of collector alloy (700 kg) from Example 1 (Table 1), and recycle slag (416 kg, or [416/(590+700)]*100=32 parts recycle slag per hundred collector alloy) produced from Example 4 (Table 9). The refractory protectant (80 kg) was furnace slag from Example 1 (Table 2), or [80/(590+700)]*100=6.2 parts protectant per hundred collector alloy. The oxygen injection rate during the converting was 46 Nm³/h (29 SCFM), and the slag was tapped several times as needed, after waiting each time for several minutes to allow alloy disentrainment. The final slag tapping was started within 5 minutes of stopping oxygen injection without waiting for complete alloy disentrainment. After 9 h of oxygen injection, corresponding to 99% iron conversion, the alloy was tapped and formed into ingots. The PGM-enriched alloy (218.71 kg) has the typical assay as shown in Table 11.

The slag tappings were cooled, solidified, crushed, milled, and magnetically separated. The magnetically susceptible fraction was collected and combined with the non-magnetic fraction of the final slag tapping (588 kg total) for use as recycle slag in a subsequent converting cycle. The non-magnetic fraction of the non-final slag tappings was collected (1772 kg total) for smelting in the secondary furnace (see Example 2). The recycle slag and smelting slag have the typical assays shown in Tables 12 and 13.

This example shows that partial pre-oxidation by flame oxidation of collector alloy, relative to Example 4, allows a larger quantity of the collector alloy to be processed in the TBRC with higher oxygen injection rates and a shorter cycle time to obtain a higher purity of enriched PGM alloy.

Although only a few example embodiments have been described in detail above, those skilled in the art will readily appreciate that many modifications are possible in the example embodiments without materially departing from this invention. Accordingly, all such modifications are intended to be included within the scope of this invention as defined in the following claims. It is the express intention of the applicant not to invoke 35 U.S.C. § 112(f) for any limitations of any of the claims herein, except for those in which the claim expressly uses the words 'means for' together with an associated function and without any recitation of structure. The priority document is incorporated herein by reference.

TABLE 1

Primary furnace collector alloy composition (Example 1)

| Component | Wt % |
|---|---|
| Fe | 55 |
| PGM | 8 |
| Ni | 10 |
| Si | 10 |
| P | 10 |
| Cu | 1.0 |
| S | 0.4 |
| Cr | 1.5 |
| Ti | 1.5 |
| Other | 2.6 |
| TOTAL | 100 |

TABLE 2

Primary furnace slag assay (Example 1)

| Component | Wt % |
|---|---|
| MgO | 8 |
| CaO | 2.5 |
| $Al_2O_3$ | 36 |
| $SiO_2$ | 36 |
| S | 0.5 |
| FeO | 3 |
| NiO | 0.1 |
| $P_2O_5$ | 0.7 |
| $Cr_2O_3$ | 0.15 |
| $TiO_2$ | 0.6 |
| PGM | 0.08 |
| $Ce_2O_3$ | 4 |
| $ZrO_2$ | 4 |
| Other | 4.5 |
| TOTAL | 100 |

TABLE 3

Secondary furnace collector alloy assay (Example 2)

| Component | Wt % |
|---|---|
| Fe | 75 |
| PGM | 0.8 |
| Ni | 3 |
| Si | 5 |
| P | 10 |
| Cu | 0.5 |
| S | 0.5 |
| Cr | 0.6 |
| Ti | 0.15 |
| Other | 4.5 |
| TOTAL | 100 |

TABLE 4

Secondary furnace slag assay (Example 2)

| Component | Wt % |
|---|---|
| MgO | 8 |
| CaO | 2.5 |
| $Al_2O_3$ | 38 |
| $SiO_2$ | 38 |
| S | 0.1 |
| FeO | 1.9 |
| NiO | 0.1 |
| $P_2O_5$ | 0.7 |
| $Cr_2O_3$ | 0.1 |
| $TiO_2$ | 0.4 |
| PGM | 0.003 |
| $Ce_2O_3$ | 4 |
| $ZrO_2$ | 4 |
| Other | 2.2 |
| TOTAL | 100 |

TABLE 5

Previous starter alloy assay (Example 3)

| Component | Wt % |
|---|---|
| Fe | 60.7 |
| PGM | 12 |
| Ni | 15.0 |
| Si | 0.05 |
| P | 9.6 |
| Cu | 0.4 |
| S | 0.5 |
| Cr | 0.01 |
| Ti | 0.01 |
| Other | 1.7 |
| TOTAL | 100 |

TABLE 6

Converter recycle slag feed composition (Example 3)

| Component | Wt % |
|---|---|
| MgO | 0.5 |
| CaO | 0.6 |
| $SiO_2$ | 12.2 |
| $Co_2O_3$ | 0.3 |
| $Al_2O_3$ | 12.5 |
| FeO | 55.4 |
| NiO | 9.4 |
| $P_2O_5$ | 5.8 |

TABLE 6-continued

Converter recycle slag feed composition (Example 3)

| Component | Wt % |
|---|---|
| $Cr_2O_3$ | 0.06 |
| $TiO_2$ | 0.05 |
| PGM | 0.2 |
| Other | 3.0 |
| TOTAL | 100 |

TABLE 7

Product starter alloy assay (Example 3)

| Component | Wt % |
|---|---|
| Fe | 52.3 |
| PGM | 10.1 |
| Ni | 24.7 |
| Si | 0.5 |
| P | 7.3 |
| Cu | 2.1 |
| S | 0.4 |
| Cr | 0.01 |
| Ti | 0.01 |
| Other | 2.5 |
| TOTAL | 100 |

TABLE 8

PGM enriched alloy assay (Example 4)

| Component | Wt % |
|---|---|
| Fe | 2.6 |
| PGM | 34 |
| Ni | 56.1 |
| Si | 0.01 |
| P | 1.2 |
| Cu | 3.5 |
| S | 0.2 |
| Other | 2.4 |
| TOTAL | 100 |

TABLE 9

High grade converter slag product assay (Example 4)

| Component | Wt % |
|---|---|
| MgO | 0.1 |
| CaO | 0.1 |
| $SiO_2$ | 10.0 |
| $Co_2O_3$ | 0.4 |
| $Al_2O_3$ | 10.5 |
| FeO | 57.4 |
| NiO | 12.6 |
| $P_2O_5$ | 7.4 |
| $Cr_2O_3$ | 0.06 |
| $TiO_2$ | 0.05 |
| PGM | 0.21 |
| Other | 1.2 |
| TOTAL | 100 |

TABLE 10

Low grade converter slag product assay (Example 4)

| Component | Wt % |
|---|---|
| MgO | 0.5 |
| CaO | 0.6 |
| $SiO_2$ | 27.2 |
| $Co_2O_3$ | 0.01 |
| $Al_2O_3$ | 10.5 |
| FeO | 39.4 |
| NiO | 0.4 |
| $P_2O_5$ | 15.8 |
| $Cr_2O_3$ | 1.6 |
| $TiO_2$ | 1.5 |
| PGM | 0.08 |
| Other | 2.4 |
| TOTAL | 100 |

TABLE 11

PGM enriched alloy assay (Example 5)

| Component | Wt % |
|---|---|
| Fe | 3.2 |
| PGM | 41.2 |
| Ni | 48.7 |
| Si | 0.01 |
| P | 0.9 |
| Cu | 5.2 |
| S | 0.3 |
| Other | 0.5 |
| TOTAL | 100 |

TABLE 12

High grade converter slag product composition (Example 5)

| Component | Wt % |
|---|---|
| MgO | 0.1 |
| CaO | 0.1 |
| $SiO_2$ | 9.6 |
| $Co_2O_3$ | 0.6 |
| $Al_2O_3$ | 9.5 |
| FeO | 57.4 |
| NiO | 14.2 |
| $P_2O_5$ | 5.4 |
| $Cr_2O_3$ | 0.01 |
| $TiO_2$ | 0.01 |
| PGM | 0.2 |
| Other | 2.9 |
| TOTAL | 100 |

TABLE 13

Low grade converter slag product composition (Example 5)

| Component | Wt % |
|---|---|
| MgO | 0.5 |
| CaO | 0.6 |
| $SiO_2$ | 32.2 |
| $Co_2O_3$ | 0.01 |
| $Al_2O_3$ | 9.5 |
| FeO | 39.4 |
| NiO | 0.5 |
| $P_2O_5$ | 9.8 |
| $Cr_2O_3$ | 2.5 |
| $TiO_2$ | 1.8 |

TABLE 13-continued

Low grade converter slag product composition (Example 5)

| Component | Wt % |
|---|---|
| PGM | 0.08 |
| Other | 3.1 |
| TOTAL | 100 |

What is claimed is:

1. A process for converting platinum group metal (PGM) collector alloy, comprising the steps of:
   (a) introducing a converter feed into a pot of a converter holding a molten alloy pool, wherein the converter feed comprises:
      (i) 100 parts by weight of a collector alloy comprising no less than 0.5 wt % PGM, no less than 40 wt % iron, and no less than 0.5 wt % nickel, based on the total weight of the collector alloy; and
      (ii) if an added flux material comprises more than 10 weight percent silica and more than 10 weight percent of calcium oxide, magnesium oxide, or a combination of calcium oxide and magnesium oxide, by weight of the added flux material, less than 20 parts by weight of the added flux material;
   (b) injecting oxygen-containing gas into the alloy pool to convert iron and one or more other oxidizable elements from the collector alloy to the corresponding oxides and enrich PGM in the alloy pool;
   (c) allowing a slag comprising the iron oxide to collect in a low-density layer above the alloy pool;
   (d) tapping the low-density layer to recover the slag from the converter;
   (e) tapping the alloy pool to recover the PGM-enriched alloy;
   (f) lining the pot with a refractory material; and
   (g) supplying a refractory protectant to the pot holding the alloy pool at a rate up to 20 parts by weight refractory protectant per hundred parts by weight of the collector alloy in the convertor feed.

2. The process of claim 1, wherein the refractory protectant is supplied to the pot (i) after initially melting the alloy pool and prior to commencing step (b), (ii) during one or both of steps (a) and (b), and/or (iii) after stopping one or both of steps (a) and (b) to tap the low-density layer in step (d), prior to resuming said one or both of steps (a) and (b).

3. The process of claim 1, wherein the refractory protectant is supplied to the pot together with the collector alloy introduced in step (a).

4. The process of claim 1, wherein the refractory protectant is supplied to the pot separately from the collector alloy introduced in step (a).

5. The process of claim 1, wherein the refractory protectant comprises a component in common with the refractory material.

6. The process of claim 5, further comprising injecting the oxygen-containing gas into the alloy pool in step (b) through a lance extended into the alloy pool, wherein the lance comprises a consumable refractory material and is advanced into the pool as a tip of the lance is consumed, wherein the consumable refractory material comprises a component in common with the lining.

7. The process of claim 1, wherein the refractory material of the lining comprises a ramming refractory comprising alumina.

8. The process of claim 1, further comprising:
   sensing temperature in the refractory lining with radially spaced sensors mounted in the refractory lining;
   communicating temperature sensing information from the sensors to one or more transmitters; and
   transmitting signals containing the temperature sensing information from the one or more transmitters to a receiver.

9. The process of claim 1, further comprising jacketing the pot and circulating a coolant through the jacket during step (b).

10. The process of claim 1, wherein the oxygen-containing gas is injected into the converter alloy pool at a sufficient rate to maintain the alloy pool in a molten state at a temperature no higher than 1800° C.

11. The process of claim 1, further comprising the steps of:
   (1) prior to steps (a) to (e), beginning a converter operation cycle by melting a partially pre-oxidized collector alloy in the pot to form the alloy pool for step (a);
   (2) then, prior to step (e), repeating a sequence of steps (a), (b), (c), and (d) a plurality of times, wherein step (d) in each sequence follows steps (b) and (c);
   (3) for the tapping(s) of the low-density layer in step (d) in each sequence of step (2) preceding a final tapping of the low-density layer in step (d) in a final sequence of step (2), allowing alloy entrained in the low-density layer to substantially settle into the alloy pool before the tapping of the respective low-density layer(s) following termination of the oxygen-containing gas injection in the respective step (b) of the respective sequence of step (2);
   (4) for the final tapping of the low-density layer in the step (d) of the final sequence of step (2), starting the final tapping of the low-density layer in step (d) within a period of no more than 5 minutes following termination of the oxygen-containing gas injection in step (b) of the final sequence of step (2), optionally entraining alloy in the low-density layer of the final tapping in step (d) of the final sequence of step (2); and
   (5) after the final tapping of the low-density layer in step (d) in the last one of the sequences of step (2), tapping the alloy pool in step (e).

12. The process of claim 11, further comprising the steps of:
   (6) cooling, solidifying, and comminuting the recovered slag from step (d) in each sequence of step (2); and
   (7) recycling the slag recovered from the final tapping of the low-density layer in step (d) in the final sequences of step (2) to the converter feed in step (a).

13. The process of claim 1, further comprising the steps of:
   (E.1) smelting a catalyst material in a primary furnace;
   (E.2) recovering a primary furnace slag and a first collector alloy from the primary furnace;
   (E.3) smelting the primary furnace slag in a secondary furnace;
   (E.4) recovering a secondary furnace slag and a second collector alloy from the secondary furnace;
   (E.5) supplying the first and second collector alloys to converter feed in step (a); and
   (E.6) supplying at least a portion of the slag recovered from the converter in step (d) to the secondary furnace for smelting with the primary furnace slag in step (E.3).

14. The process of claim 13, wherein the pot of the converter is lined with a refractory material, and further comprising supplying a portion of the primary furnace slag from step (E.2) to the pot as a refractory protectant for steps (a) and (b).

15. The process of claim 1, wherein the oxygen-containing gas injection in step (b) is continued until the alloy pool comprises no more than about 10 wt % iron.

16. The process of claim 15, wherein the collector alloy comprises: from 0.5 to 12 wt % PGM; from 40 to 80 wt % iron; from 1 to 15 wt % nickel; and no more than 3 wt % sulfur; and wherein the PGM-enriched alloy comprises: no less than 25 wt % PGM; and no less than 25 wt % nickel.

17. A process for converting platinum group metal (PGM) collector alloy, comprising the steps of:
   (a) introducing a converter feed into a pot of a converter holding a molten alloy pool, wherein the converter feed comprises:
      (i) 100 parts by weight of a collector alloy comprising no less than 0.5 wt % PGM, no less than 40 wt % iron, and no less than 0.5 wt % nickel, based on the total weight of the collector alloy; and
      (ii) if an added flux material comprises more than 10 weight percent silica and more than 10 weight percent of calcium oxide, magnesium oxide, or a combination of calcium oxide and magnesium oxide, by weight of the added flux material, less than 20 parts by weight of the added flux material;
   (b) injecting oxygen-containing gas into the alloy pool to convert iron and one or more other oxidizable elements from the collector alloy to the corresponding oxides and enrich PGM in the alloy pool;
   (c) allowing a slag comprising the iron oxide to collect in a low-density layer above the alloy pool;
   (d) tapping the low-density layer to recover the slag from the converter, and
   (e) tapping the alloy pool to recover the PGM-enriched alloy; and
   prior to step (a), the step of (I) partially pre-oxidizing at least a portion of the collector alloy from a raw state.

18. The process of claim 17, wherein the pre-oxidizing in step (I) comprises (I.A) passing particles of the raw collector alloy through an oxygen-rich flame.

19. The process of claim 18, wherein the oxygen rich flame is produced by a burner for heating the pot, and further comprising (I.B) depositing at least partially melted and/or pre-oxidized collector alloy particles from the flame into the pot.

20. The process of claim 19, further comprising the steps of:
   (I.C) cooling and solidifying the particles to form a coating of the pre-oxidized collector alloy on an interior surface of a refractory lining of the pot;
   (II) melting the coating in the pot to form a sufficient volume of the alloy pool for the injection of the oxygen-containing gas in step (b); and
   (III) then commencing the converter feed introduction into the pot in step (a) and the oxygen-containing gas injection into the alloy pool in step (b).

21. The process of claim 17, further comprising the steps of:
   (II) melting the partially pre-oxidized collector alloy in the pot to form a sufficient volume of the alloy pool for the injection of the oxygen-containing gas in step (b); and
   (III) then commencing the converter feed introduction into the pot in step (a) and the oxygen-containing gas injection into the alloy pool in step (b).

22. The process of claim 21, wherein the pre-oxidizing in step (I) comprises operating the converter through a cycle of steps (II), (III), (a), (b), (c), (d), and (e) to prepare a partially oxidized starter alloy, wherein the starter alloy preparation cycle comprises:
   melting a previously prepared charge of the partially oxidized starter alloy in the pot to form the alloy pool;
   periodically or continuously supplying the converter feed to the alloy pool in step (a) concurrently with the injection of the oxygen-containing gas in step (b);
   continuing the injection of the oxygen-containing gas to partially oxidize the alloy pool;
   tapping the slag from the converter pot; and
   then recovering and solidifying the partially oxidized alloy pool.

23. The process of claim 17, wherein the pre-oxidizing in step (I) comprises contacting particles of the raw collector alloy with an oxygen-containing gas at a temperature above 800° C.

24. A process, further comprising the steps of:
   (a) introducing a converter feed into a pot of a converter holding a molten alloy pool, wherein the converter feed comprises,
      (i) 100 parts by weight of a collector alloy comprising no less than 0.5 wt % PGM, no less than 40 wt % iron, and no less than 0.5 wt % nickel, based on the total weight of the collector alloy; and
      (ii) if an added flux material comprises more than 10 weight percent silica and more than 10 weight percent of calcium oxide, magnesium oxide, or a combination of calcium oxide and magnesium oxide, by weight of the added flux material, less than 20 parts by weight of the added flux material;
   (b) injecting oxygen-containing gas into the alloy pool to convert iron and one or more other oxidizable elements from the collector alloy to the corresponding oxides and enrich PGM in the alloy pool;
   (c) allowing a slag comprising the iron oxide to collect in a low-density layer above the alloy pool;
   (d) tapping the low-density layer to recover the slag from the converter; and
   (e) tapping the alloy pool to recover the PGM-enriched alloy;
   (A.1) separating the slag recovered in step (d) into a plurality of portions; and
   (A.2) recycling a first one of the recovered slag portions from step (A.1) to the converter feed introduced to the pot in step (a), wherein the converter feed comprises the recycled slag in an amount of from about 5 to 100 parts by weight per 100 parts by weight of the collector alloy.

25. The process of claim 24, further comprising (A.3) combining the collector alloy and the recycle slag for concurrent introduction in the converter feed in step (a).

26. The process of claim 24, wherein the recycled slag in step (A.2) comprises a high-grade portion of the recovered slag from step (d) having a higher PGM content than an average overall PGM content of the recovered slag from step (d) and/or a nickel content greater than about 2 percent by weight of the recycled slag.

27. The process of claim 26, further comprising the steps of:
   (B.1) cooling, solidifying, and crushing the recovered slag from step (d);
   (B.2) magnetically separating the crushed slag into a magnetically susceptible fraction and a non-magnetically susceptible fraction;

(B.3) recycling the magnetically susceptible fraction to the converter feed in step (A.2); and (B.4) optionally recycling a portion of the non-magnetically susceptible fraction to the converter feed in step (A.2).

28. The process of claim 27, further comprising the steps of:

(C.1) prior to steps (a) to (e), beginning a converter operation cycle by melting a partially pre-oxidized collector alloy in the pot to form the alloy pool;

(C.2) then, prior to step (e), repeating a sequence of steps (a), (b), (c), and (d) a plurality of times, wherein step (d) in each sequence follows steps (b) and (c);

(C.3) recycling the slag recovered from a final tapping of the low-density layer in step (d) in a last one of the sequences of step (C.2) to the converter feed in step (A.2) regardless of magnetic susceptibility, and/or recycling all or part of the non-magnetically susceptible fraction separated in step (B.2) from the final tapping in step (d) to the converter feed in step (A.2); and (C.4) after the final tapping of the low-density layer in step (d) in the last one of the sequences of step (C.2), tapping the alloy pool in step (e).

29. The process of claim 28, further comprising the steps of:

(D.1) for the tapping(s) of the low-density layer preceding the final tapping in step (C.2), allowing alloy entrained in the low-density layer to substantially settle into the alloy pool before the tapping of the respective low-density layer(s); and (D.2) for the final tapping in step (C.2), quickly commencing the tapping to avoid freezing of the alloy pool, optionally resulting in entrainment of alloy in the low-density layer for the final tapping in step (C.2).

\* \* \* \* \*

UNITED STATES PATENT AND TRADEMARK OFFICE
CERTIFICATE OF CORRECTION

PATENT NO. : 10,435,767 B2
APPLICATION NO. : 16/397441
DATED : October 8, 2019
INVENTOR(S) : Albrecht et al.

Page 1 of 1

It is certified that error appears in the above-identified patent and that said Letters Patent is hereby corrected as shown below:

In the Claims

Column 56, Line 20, the preamble of Claim 24 is changed from:
"24. A process, further comprising the steps of:"

To read as follows:
--24. A process for converting platinum group metal (PGM) collector alloy, comprising the steps of:--

Signed and Sealed this
Third Day of December, 2019

Andrei Iancu
*Director of the United States Patent and Trademark Office*